United States Patent
Sasaki et al.

(10) Patent No.: US 10,607,417 B2
(45) Date of Patent: Mar. 31, 2020

(54) IMAGE GENERATING APPARATUS AND IMAGE GENERATING METHOD

(71) Applicant: Sony Interactive Entertainment Inc., Tokyo (JP)

(72) Inventors: Nobuo Sasaki, Kanagawa (JP); Atsushi Takizawa, Saitama (JP)

(73) Assignee: Sony Interactive Entertainment inc., Tokyo (JP)

( * ) Notice: Subject to any disclaimer, the term of this patent is extended or adjusted under 35 U.S.C. 154(b) by 9 days.

(21) Appl. No.: 16/301,809

(22) PCT Filed: Jan. 26, 2017

(86) PCT No.: PCT/JP2017/002835
§ 371 (c)(1),
(2) Date: Nov. 15, 2018

(87) PCT Pub. No.: WO2017/212679
PCT Pub. Date: Dec. 14, 2017

(65) Prior Publication Data
US 2019/0164354 A1    May 30, 2019

(30) Foreign Application Priority Data
Jun. 8, 2016 (JP) ................... 2016-114753

(51) Int. Cl.
*G06T 19/00* (2011.01)
*H04N 13/30* (2018.01)
(Continued)

(52) U.S. Cl.
CPC ........ *G06T 19/006* (2013.01); *G02B 27/0101* (2013.01); *G02B 27/017* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,872,590 A | 2/1999 | Aritake | |
| 7,583,275 B2* | 9/2009 | Neumann | ............... G06T 17/00 345/419 |
| 2019/0158809 A1* | 5/2019 | Sasaki | .................. H04N 13/111 |

FOREIGN PATENT DOCUMENTS

| | | |
|---|---|---|
| JP | 04184683 A | 7/1992 |
| JP | 1013860 A | 1/1998 |

(Continued)

OTHER PUBLICATIONS

Chen et al., View Interpolation for Image Synthesis, 1993, ACM, pp. 279-288 (Year: 1993).*

(Continued)

*Primary Examiner* — Motilewa Good Johnson
(74) *Attorney, Agent, or Firm* — Matthew B. Dernier, Esq.

(57) ABSTRACT

A position/posture acquiring unit of image generating apparatus acquires information on the position and posture of the head of a user. A view screen control unit sets a view screen according to the point of view of a user. An original image operating unit disposes an original image in a virtual space and moves the position thereof in response to movement of the point of view of the user. In addition, the original image operating unit calculates the amount of displacement of pixels in such a manner that an object looks fixed. Thereby, the original image operating unit sets a reference vector for each pixel of the image plane. The original image operating unit decides the reference vector by interpolation regarding a pixel for which the reference vector is not set. A displayed image generating unit carries out mapping of the original image onto the view screen by using the obtained reference (Continued)

vectors to generate a displayed image. An output unit outputs the displayed image.

11 Claims, 35 Drawing Sheets

(51) Int. Cl.
*H04N 13/00* (2018.01)
*H04N 13/363* (2018.01)
*G02B 27/01* (2006.01)
*G06F 3/01* (2006.01)
*G06T 19/20* (2011.01)

(52) U.S. Cl.
CPC .............. *G06F 3/014* (2013.01); *G06T 19/00* (2013.01); *G06T 19/20* (2013.01); *H04N 13/00* (2013.01); *H04N 13/30* (2018.05); *H04N 13/363* (2018.05); *G02B 2027/014* (2013.01)

(56) References Cited

FOREIGN PATENT DOCUMENTS

| JP | 10142556 A | 5/1998 |
| JP | 2006197036 A | 7/2006 |
| JP | 2013143702 A | 7/2013 |

OTHER PUBLICATIONS

Wang et al., An Asymmetric Edge Adaptive Filter for Depth Generation and Hole Filling in 3D TV, Sep. 2010, IEEE Transcations on Broadcasting, vol. 56, No. 3 (Year: 2010).*
International Search Report for corresponding PCT Application No. PCT/JP2017/002835, 4 pages, dated Apr. 18, 2017.
Katayama A.' et al., "A Viewpoint Dependent Stereoscopic Display Using Interpolation of Multi-Viewpoint Images", Proceedings of SPIE, vol. 2409, p. 11-20, ISBN:0-8194-1756-4, <DOI:10.1117/12.205854>. Especially, equation (3) (Mar. 30, 1995).
International Preliminary Report on Patentability and Written Opinion for corresponding PCT Application No. PCT/JP2017/002835, 12 pages, dated Oct. 11, 2018.

* cited by examiner

FIG.3
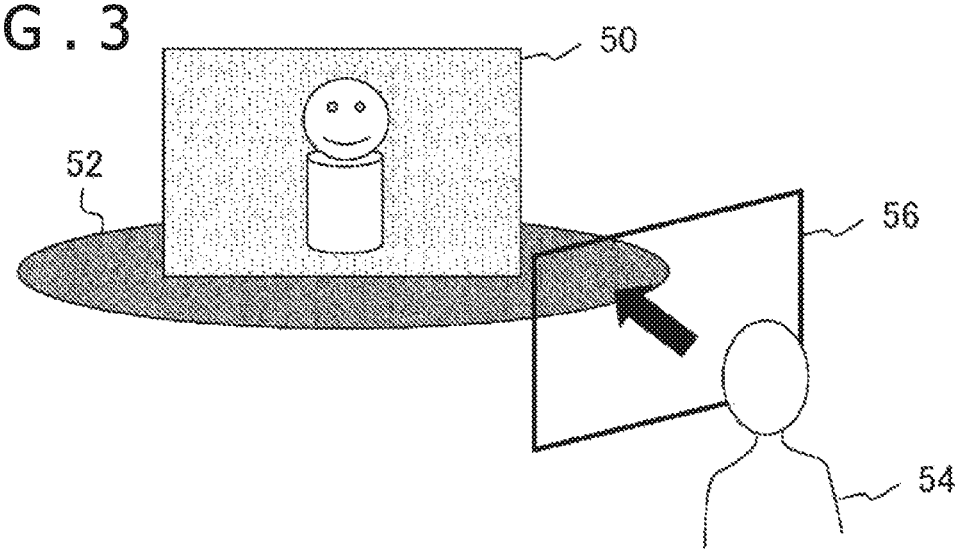
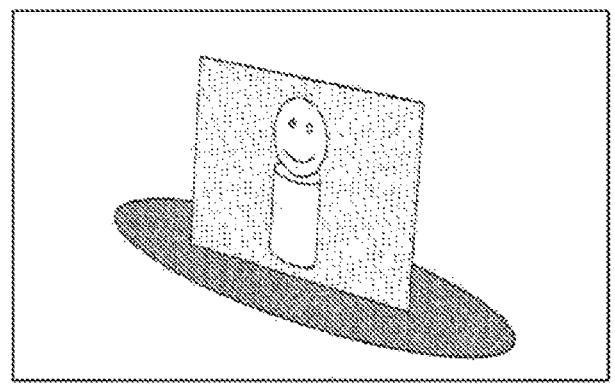

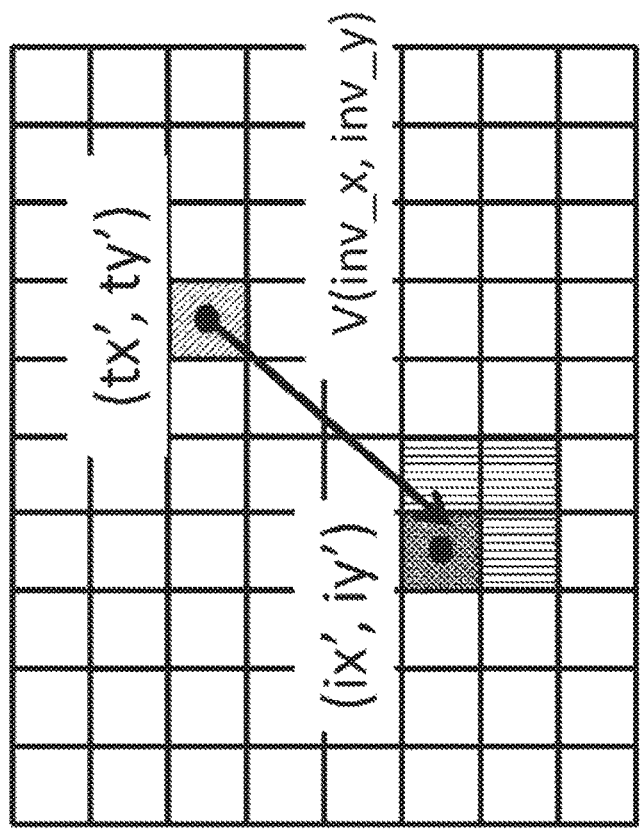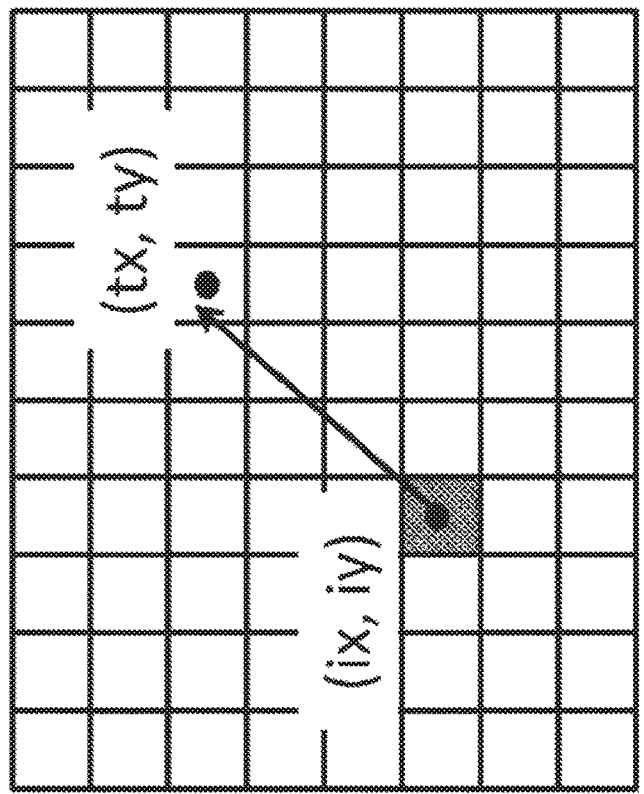
FIG. 17

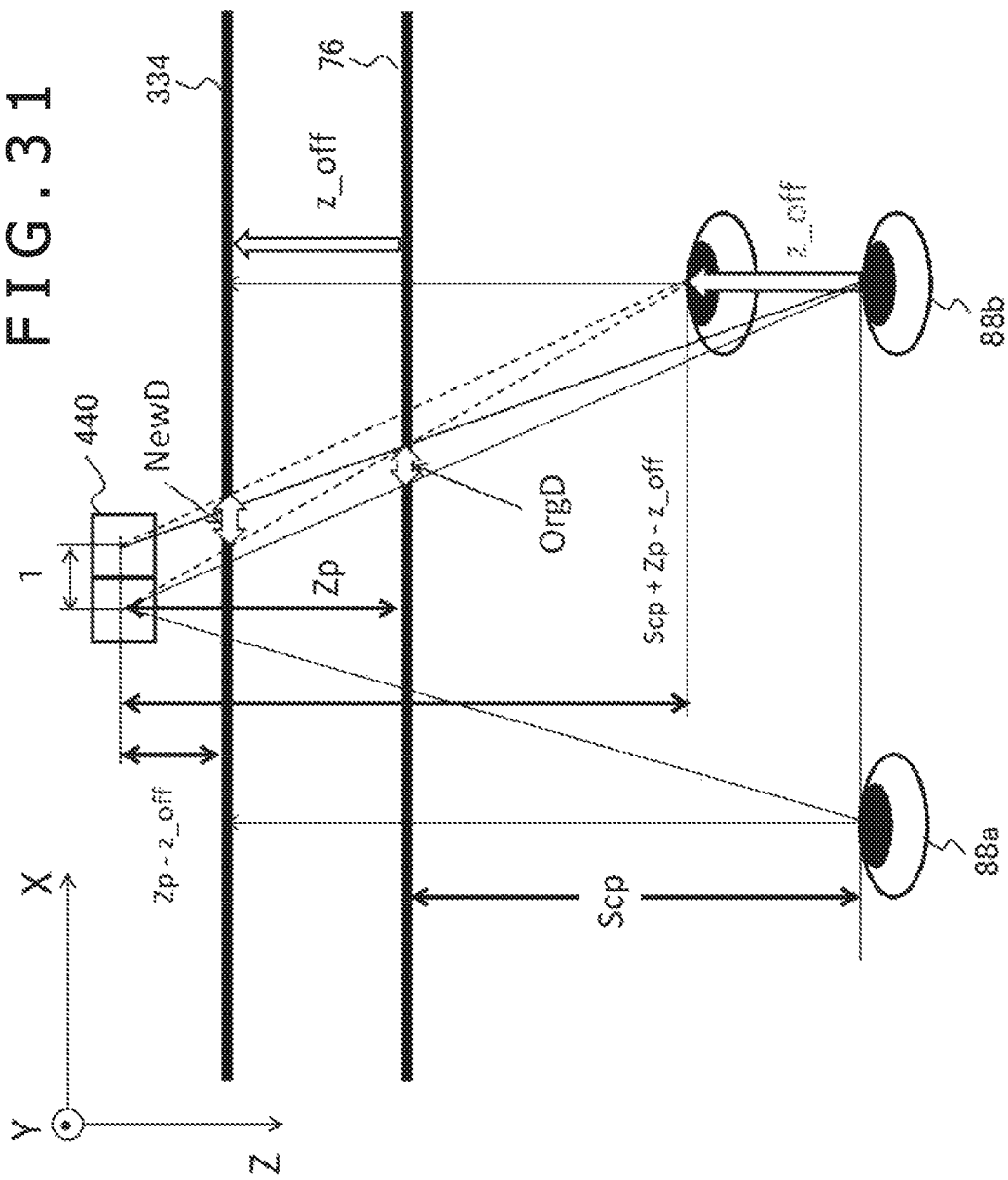
F I G. 31

FIG. 33
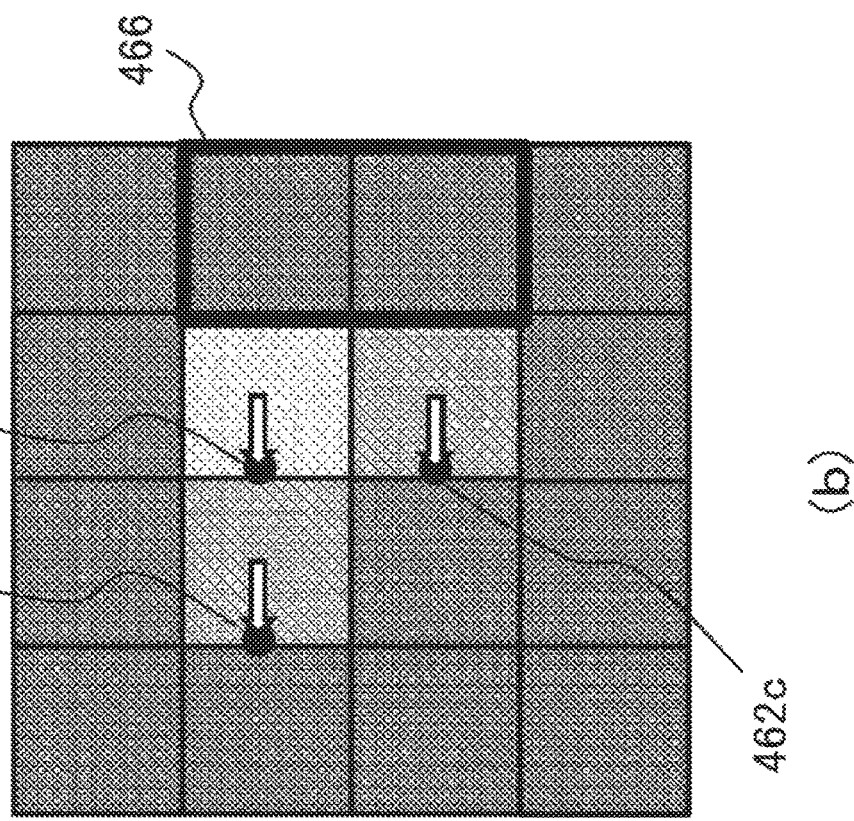
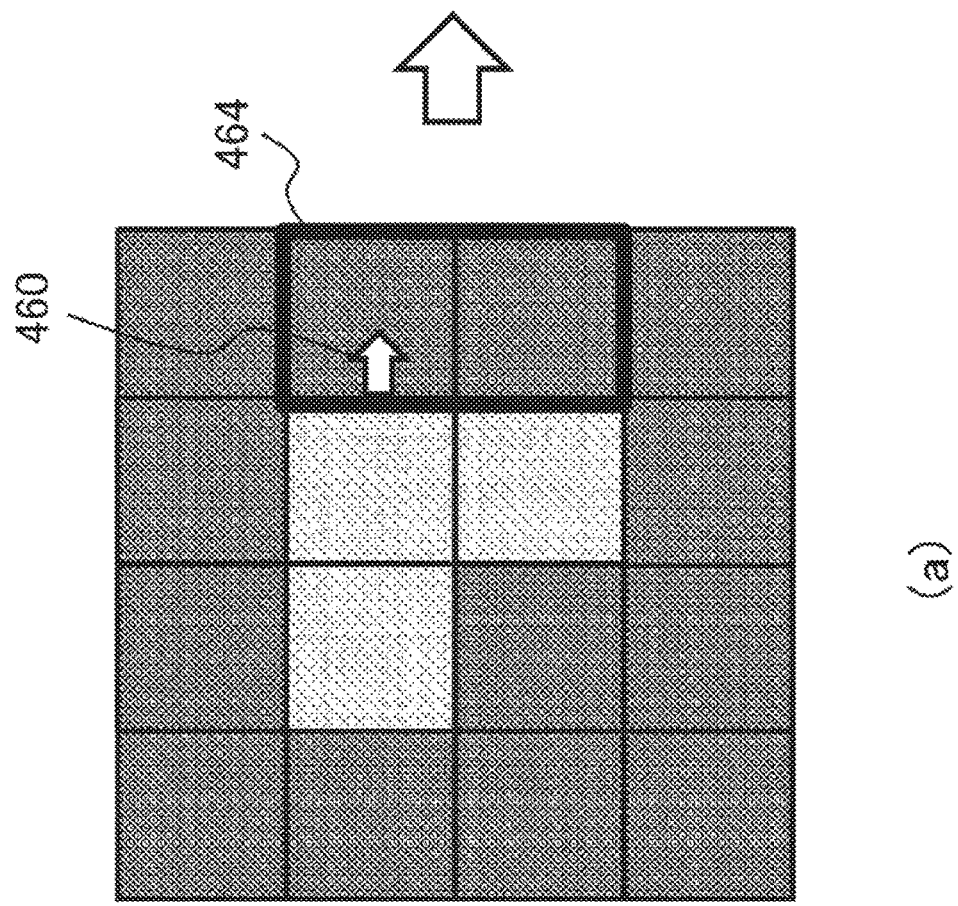

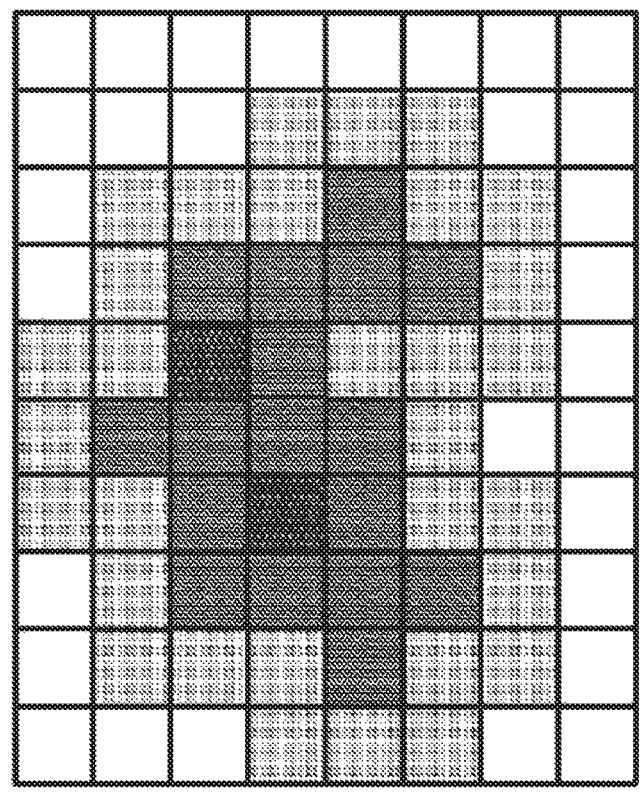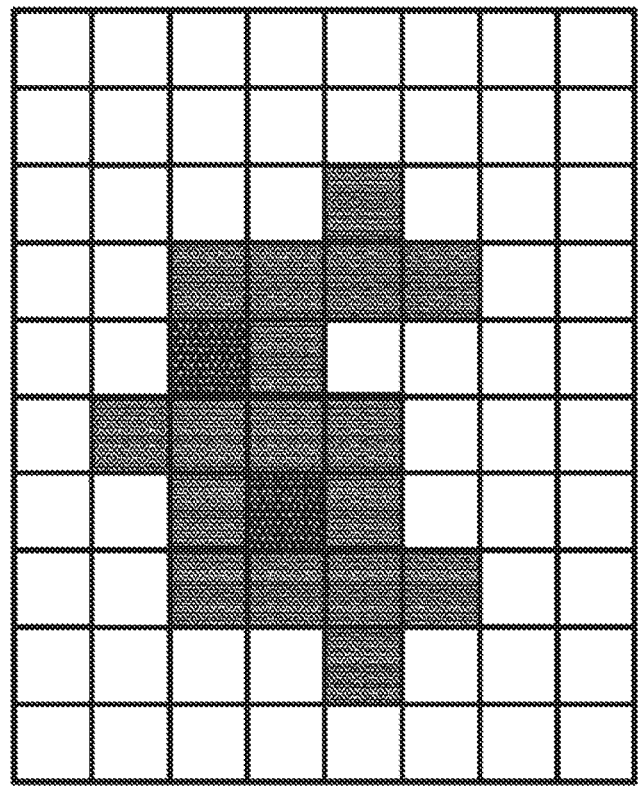
FIG. 34

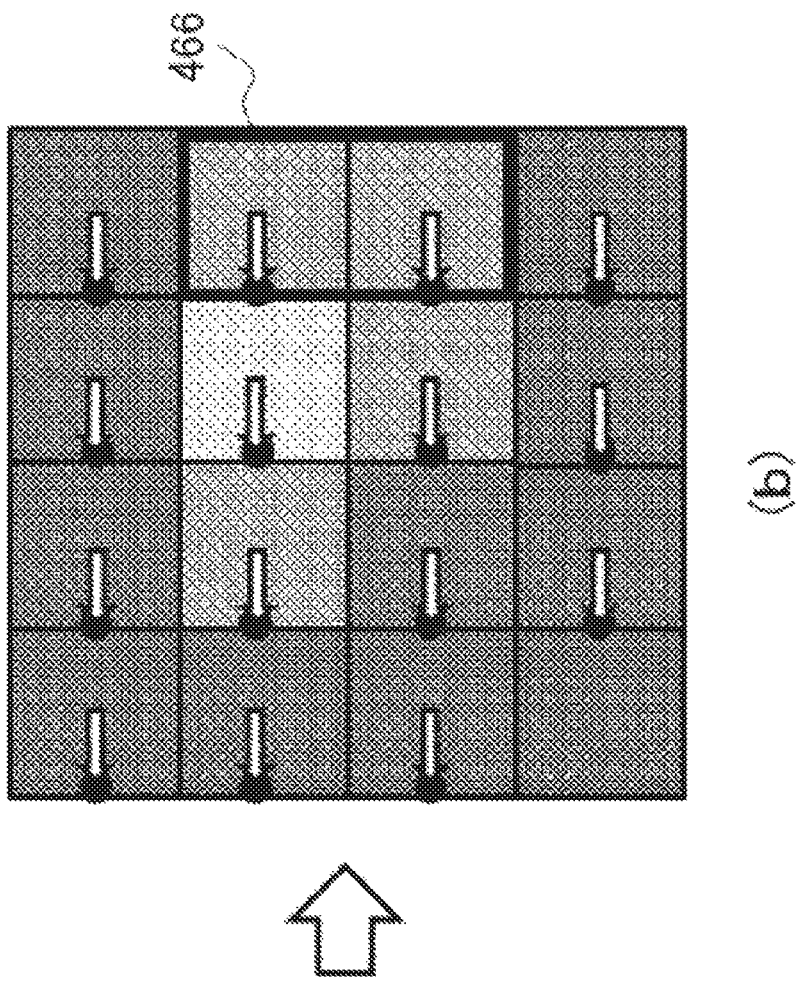
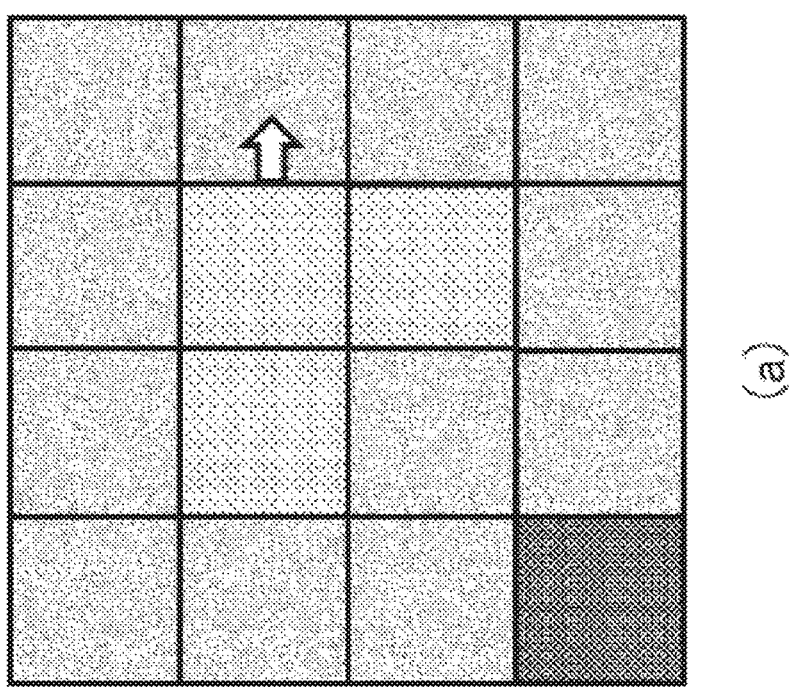
FIG. 35

IMAGE GENERATING APPARATUS AND IMAGE GENERATING METHOD

TECHNICAL FIELD

The present invention relates to image generating apparatus and an image generating method that generate stereoscopic video.

BACKGROUND ART

Three-dimensional display devices such as three-dimensional televisions and head-mounted displays that can stereoscopically present video have been used. Devices that can stereoscopically present video in portable terminals such as mobile phones and portable game machines have also been developed and opportunities for general users to view stereoscopic video have been increasing.

The three-dimensional display devices that display stereoscopic video enable the user to stereoscopically view images by causing the right and left eyes of the user to see images with a parallax. There are a system in which special optical glasses are used for causing right and left eyes to see images with a parallax, a system in which a parallax barrier or lenticular lens is used without using optical glasses, and so forth.

SUMMARY

Technical Problems

To display stereoscopic video without distortion, accurate parallax images based on the point of view of the user need to be generated. Therefore, to present stereoscopic video with permission of the motion of the point of view, generally processing of disposing an object in a virtual three-dimensional space and projecting the object with change in a camera coordinate system, or the like, is necessary. However, when the quality and accuracy of the image is pursued at a higher degree, the time necessary for such processing increases more and it becomes more difficult for display to follow the motion of the point of view. Furthermore, due to addition of many operations to data of the original parallax images, the possibility of the deterioration of the image quality becomes higher.

The present invention is made in view of such problems and an object thereof is to provide a technique that can generate high-quality stereoscopic images with small delay even when the point of view is displaced.

Solution to Problems

A certain aspect of the present invention relates to image generating apparatus. This image generating apparatus is image generating apparatus that generates an image enabling stereoscopic viewing of an object by using a pair of original images acquired from different points of view on right and left sides, and that includes an original image operating unit that generates a vector map in which a reference vector with which reference to a position before displacement in the original image from a position after the displacement is carried out is represented on an image plane regarding each pixel by calculating the displacement of each pixel of the original image according to movement of a point of view of a user in such a manner that the object is fixed in a virtual space with respect to the movement of the point of view, and decides the reference vector by interpolation regarding a pixel for which the reference vector is not set due to the displacement, a displayed image generating unit that decides, based on the reference vector at a position on the vector map corresponding to a respective one of pixels of a displayed image, a pixel value of the pixel by referring to a pixel value at a corresponding position on the original image, and an output unit that outputs data of the displayed image.

Another aspect of the present invention relates to an image generating method. The image generating method is an image generating method that generates an image enabling stereoscopic viewing of an object by using a pair of original images acquired from different points of view on right and left sides, and that includes a step of acquiring information relating to a point of view of a user, a step of generating a vector map in which a reference vector with which reference to a position before displacement in the original image from a position after the displacement is carried out is represented on an image plane regarding each pixel by calculating the displacement of each pixel of the original image according to movement of the point of view in such a manner that the object is fixed in a virtual space with respect to the movement of the point of view, and deciding the reference vector by interpolation regarding a pixel for which the reference vector is not set due to the displacement, a step of deciding, based on the reference vector at a position on the vector map corresponding to a respective one of pixels of a displayed image, a pixel value of the pixel by referring to a pixel value at a corresponding position on the original image, and a step of outputting data of the displayed image.

What are obtained by translating arbitrary combinations of the above constituent elements and expressions of the present invention among method, device, and so forth are also effective as aspects of the present invention.

Effect of the Invention

According to the present invention, high-quality stereoscopic images can be presented with small delay even when the point of view is displaced.

BRIEF DESCRIPTION OF DRAWINGS

FIG. 3 is a diagram for explaining the form of display implemented by the image display system of the present embodiment.

FIG. 17 is a diagram schematically depicting the correspondence relationship between the grid and position of pixels in an original image and an image reference vector map in the present embodiment.

FIG. 31 is a diagram for explaining a method for calculating LOD (Level of Detail) at the time of conversion from an image screen to a map screen in the present embodiment.

FIG. 33 is a diagram schematically depicting change in an image when an image is moved at a sub-pixel level due to movement of the point of view in the present embodiment.

FIG. 34 is a diagram schematically depicting image reference vector maps before and after extension of a parallax value image in the present embodiment.

FIG. 35 is a diagram schematically depicting change in an image in association with movement at a sub-pixel level when a parallax value image is extended in the present embodiment.

DESCRIPTION OF EMBODIMENT

The present embodiment relates to a three-dimensional image display system that allows stereoscopic viewing by causing an image for the right eye in parallax images to reach a right eye and causing an image for the left eye to reach a left eye. Insofar as such a three-dimensional image display system is configured, the display form of images and the viewing form of the user are not limited. For example, a form in which parallax images are simultaneously or alternately displayed on a flat-plate-shaped display or screen and are viewed by polarized glasses or shutter glasses is conceivable. Alternatively, it is also conceivable that a head-mounted display that can present images to right and left eyes independently is used. Here, mainly description will be made by taking the latter as an example.

Figure 1:
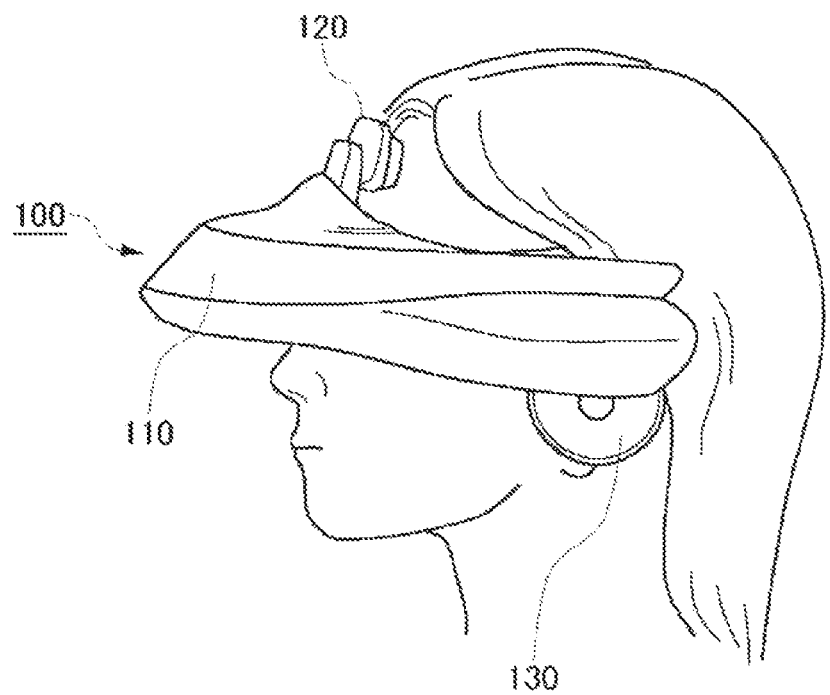
FIG. 1 is an appearance diagram of a head-mounted display 100 in the present embodiment.

FIG. 1 is an appearance diagram of a head-mounted display 100. The head-mounted display 100 includes a main unit 110, a frontal-region contact part 120, and temporal-region contact parts 130. The head-mounted display 100 is display apparatus for being mounted on the head of a user to view still images, moving images, and so forth displayed on a display and listen to voice, music, and so forth output from a headphone. Posture information such as the rotation angle and the tilt about the head of the user who wears the head-mounted display 100 can be measured by a motion sensor incorporated in or externally attached to the head-mounted display 100.

Figure 2:
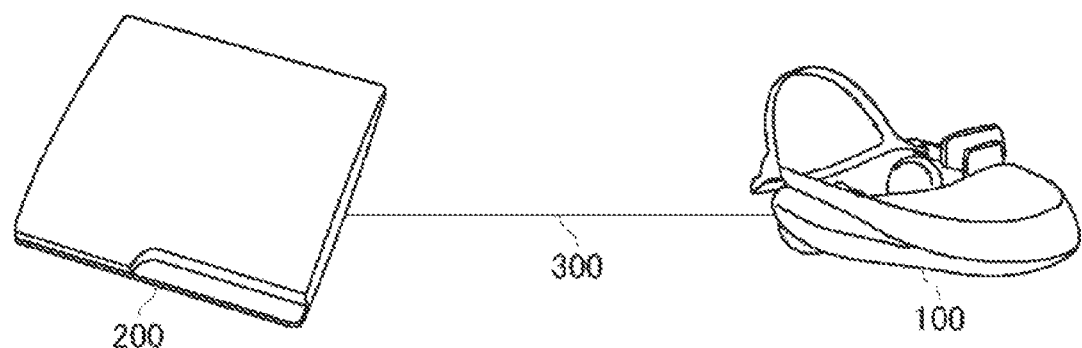
FIG. 2 is a configuration diagram of an image display system in the present embodiment.

FIG. 2 is a configuration diagram of an image display system in the present embodiment. The head-mounted display 100 is connected to image generating apparatus 200 by wireless communication or an interface 300 to connect peripheral equipment of USB (Universal Serial Bus) or the like. The image generating apparatus 200 may be further connected to a server via a network. In this case, the server may offer the image generating apparatus 200 an online application of a game or the like in which plural users can participate via the network. The image generating apparatus 200 may be any of game apparatus, personal computer, portable terminal, and so forth. Furthermore, the image generating apparatus 200 and the head-mounted display 100 may be integrally configured.

FIG. 3 is a diagram for explaining the form of display implemented by the image display system. In the present embodiment, the state in which a plane that represents an image is further disposed in a virtual space is made. Specifically, conceptually, as depicted in (a), a screen 50 caused to display an image is disposed on a field 52 in the virtual space to allow a user 54 view it through a view screen 56. Here, the view screen 56 corresponds to the field of view of an image displayed on the head-mounted display 100.

When the user 54 moves while seeing the virtual space, how the screen 50 looks also changes according to change in the position relative to the virtual world. For example, if the user 54 is present on the right side relative to the screen 50 as depicted in (a), the image generating apparatus 200 generates an image like one of (b) corresponding to the line of sight like one depicted by an arrow and causes the head-mounted display 100 to display the image. The field 52 in the virtual space merely represents the coordinate system of the virtual space and does not intend to limit the shape and so forth. Furthermore, the field 52 does not necessarily have to be displayed.

Figure 4:
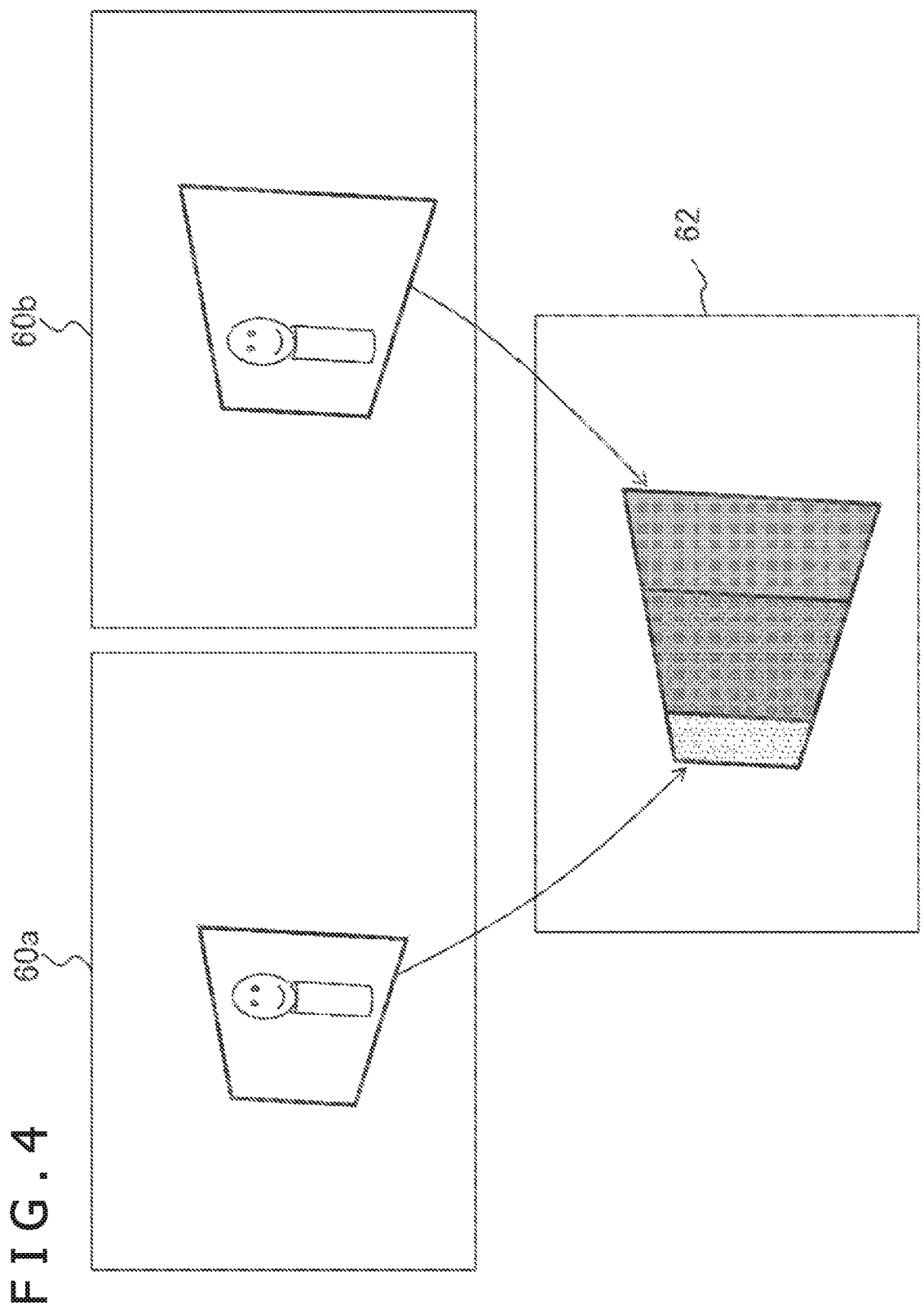
FIG. 4 is a diagram schematically depicting images generated by image generating apparatus of the present embodiment.

FIG. 4 schematically depicts images generated by the image generating apparatus 200 for implementing the form of FIG. 3. The image displayed on the image screen 50 in the present embodiment is composed of a pair of parallax images for stereoscopic viewing, i.e. an image 60*a* for the left eye and an image 60*b* for the right eye. In order for the image like that depicted in FIG. 3 to be stereoscopically viewed, the same object appears closer to the right side in the image 60*a* for the left eye and appears closer to the left side in the image 60*b* for the right eye.

Furthermore, the position of the point of view with respect to the image screen 50 differs between the right and left eyes and therefore perspective transformation needs to be carried out from the respective points of view. For example, if a user is present on the right side with respect to the image screen 50 as depicted in FIG. 3, the right eye is closer to the image screen 50 than the left eye and the angle with respect to the axis perpendicular to the plane of the image screen 50 becomes larger. As a result, the shape and position of the frame of the image screen 50 differs between the image 60*a* for the left eye and the image 60*b* for the right eye, and a positional relationship like one represented in a plane 62 is obtained when they are represented in such a manner as to be overlapped on the same plane.

Such image 60*a* for the left eye and image 60*b* for the right eye are generated, and the former is displayed on a region corresponding to the left eye in regions obtained by dividing the screen of the head-mounted display 100 into the right and left sides and the latter is displayed on a region corresponding to the right eye. Due to this, an object that appears on the image screen 50 in the state depicted in (b) of FIG. 3 looks stereoscopic. Actually, a lens is provided between the screen of the head-mounted display 100 and the eyes of the user to cause the image to appear in the whole of the field of view of the right and left eyes. For this purpose, lens distortion correction by which the original image is visually recognized when the image is seen through the lens is carried out for the image 60*a* for the left eye and the image 60*b* for the right eye.

As above, in the present embodiment, such a form that parallax images for stereoscopic viewing are prepared and they can be viewed with a free point of view is implemented. As a technique for causing a virtual space to be stereoscopically viewed, there is a technique in which a virtual world has been defined in a three-dimensional space and an object in the virtual world is projected onto a view screen according to the right and left points of view of a viewer to generate parallax images. On the other hand, in the case of causing a two-dimensional image photographed or generated in advance to be stereoscopically viewed like a three-dimensional moving image, the point of view of the viewer is restricted if the image is as it is because the image is originally given a parallax.

Figure 5:
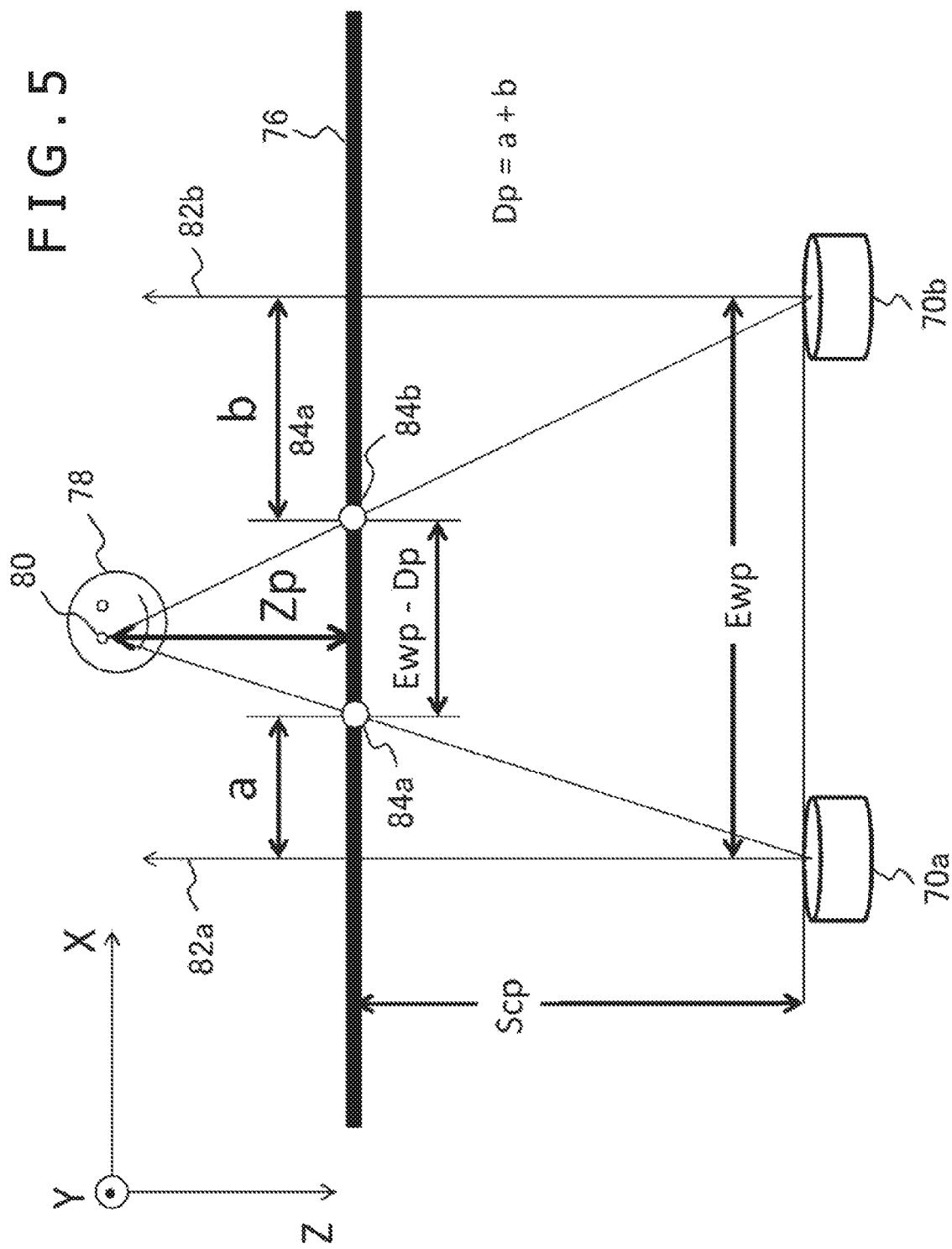
FIG. 5 is a diagram for explaining the relationship between the parallax given at the stage of acquisition of parallax images and the images in the present embodiment.

FIG. 5 is a diagram for explaining the relationship between the parallax given at the stage of acquisition of parallax images and the images. This diagram schematically depicts the state in which a virtual space including assumed right and left points of view (cameras 70*a* and 70*b*), an image screen 76 from which the parallax images are acquired, and an object 78 captured in the parallax images is viewed from above. It is also possible to employ images photographed by a stereo camera as the parallax images and the cameras 70*a* and 70*b* are equivalent to the stereo camera in this case.

Furthermore, in this diagram, the planes of the pair of parallax images are simultaneously represented by the image screen 76. Hereinafter, the parallax image originally acquired on the image screen 76 as above will be often called "original image" for discrimination from the displayed image at the stage of viewing. Moreover, in the description hereinafter, the direction perpendicular to the plane of the original image is defined as a Z-axis, and the horizontal direction and the vertical direction in the image plane are defined as X-axis and Y-axis, respectively.

An image of the object 78 appears in the original images. For example, a certain dot 80 on the surface of the object 78 appears at a position 84*a* separate from an optical axis 82*a* toward the right side by a from the left camera 70*a* and appears at a position 84*b* separate from an optical axis 82*b* toward the left side by b from the right camera 70*b*. That is, a parallax Dp with respect to the dot 80 is a+b. Actually objects may exist at various positions and images are represented in the right and left original images with a parallax according to the distance thereof in the depth direction.

A distance Zp from the image screen 76 to the dot 80 on the object 78 is obtained as follows with use of the parallax Dp based on the triangle similarity.

$$Ewp:Ewp-Dp=Scp+Zp:Zp$$

Thus $$Zp=Scp*Ewp/Dp-Scp$$

Here, Ewp is the interval between the left and right cameras 70*a* and 70*b*. Scp is the distance from the cameras 70*a* and 70*b* to the image screen 76.

Figure 6:
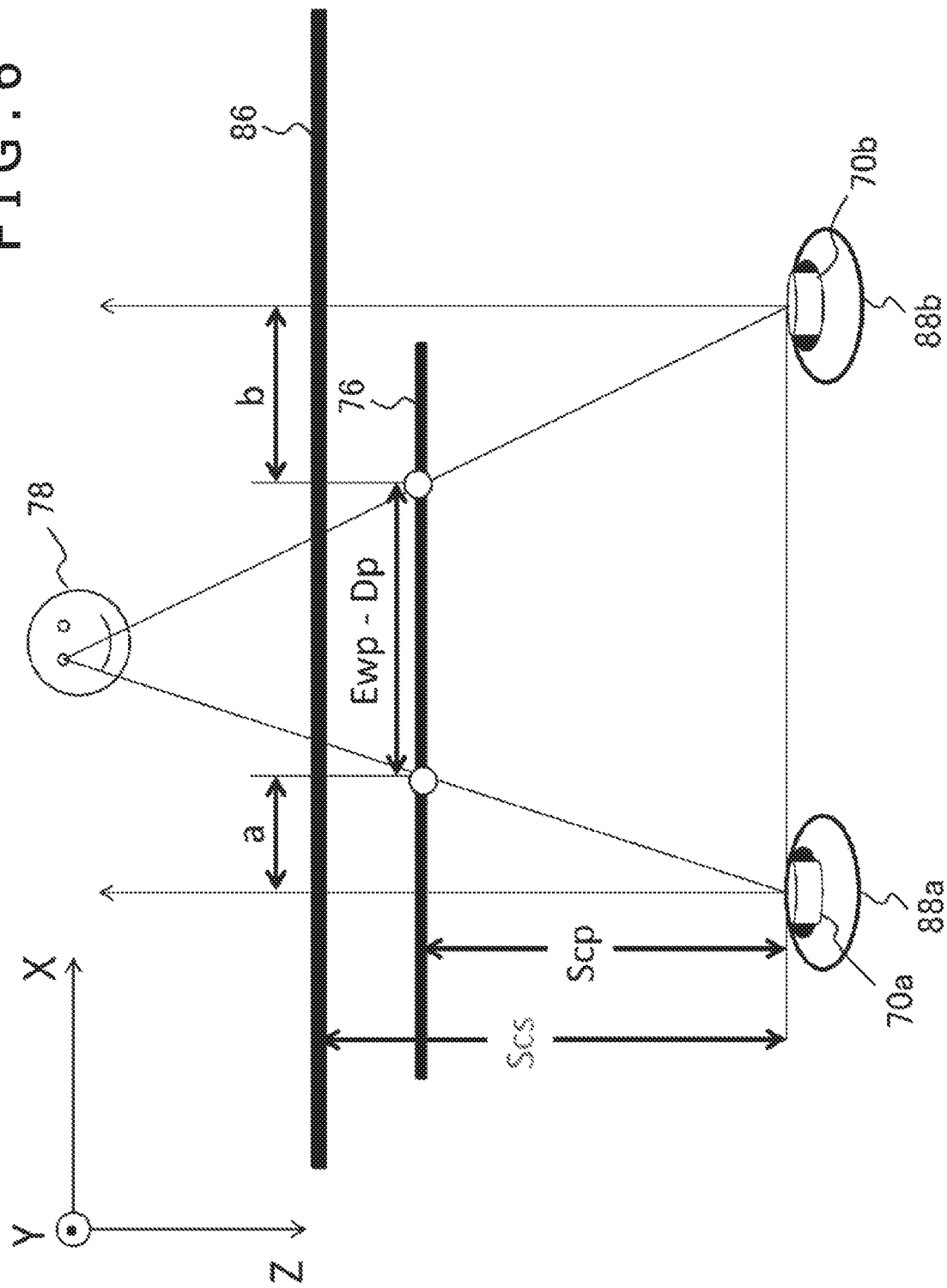
FIG. 6 is a diagram depicting the relationship between the points of view and images when parallax images are viewed from a proper position.

A consideration will be made about the case in which the parallax images obtained in this manner are viewed as described above. FIG. 6 depicts the relationship between the points of view and images when parallax images are viewed from a proper position. The format of the diagram is the same as FIG. 5. At the stage of viewing the image, points 88a and 88b of view of the viewer exist and a view screen 86 seen by the viewer exists at a position separate from them by a distance Scs. When the positional relationship at the time of acquisition of parallax images depicted in FIG. 5 is applied to such a space, the object 78 can be stereoscopically viewed without distortion if the position of the image screen 76 is decided in such a manner that the points 88a and 88b of view of the viewer are located at the same positions of the cameras 70a and 70b as depicted in the diagram and parallax images at the position are each projected onto the view screen 86.

This is equivalent to the correspondence of the view frustums of the cameras 70a and 70b when the original image is acquired with the view frustums of the points 88a and 88b of view when it is viewed. On the other hand, it is conceivable that an object looks distorted or cannot be stereoscopically viewed properly when the viewer moves and the points 88a and 88b of view depart from the positional relationship like that represented in the diagram. Depending on the case, the physical condition is adversely affected.

It is conceivable that, to permit such movement of the points of view and allow proper stereoscopic viewing, the given two-dimensional image is temporarily back-projected onto a three-dimensional virtual space and then is projected onto the view screen again. For example, either of the right and left original images is divided into small triangles whose vertices are pixel centers and the small triangles are disposed in the virtual three-dimensional space according to the distance Zp of each of them. The distance Zp is obtained based on the above-described parallax Dp. Then, the respective small triangles are projected onto the right and left view screens corresponding to the points of view of the viewer and the inside is rendered based on texture mapping.

Figure 7:
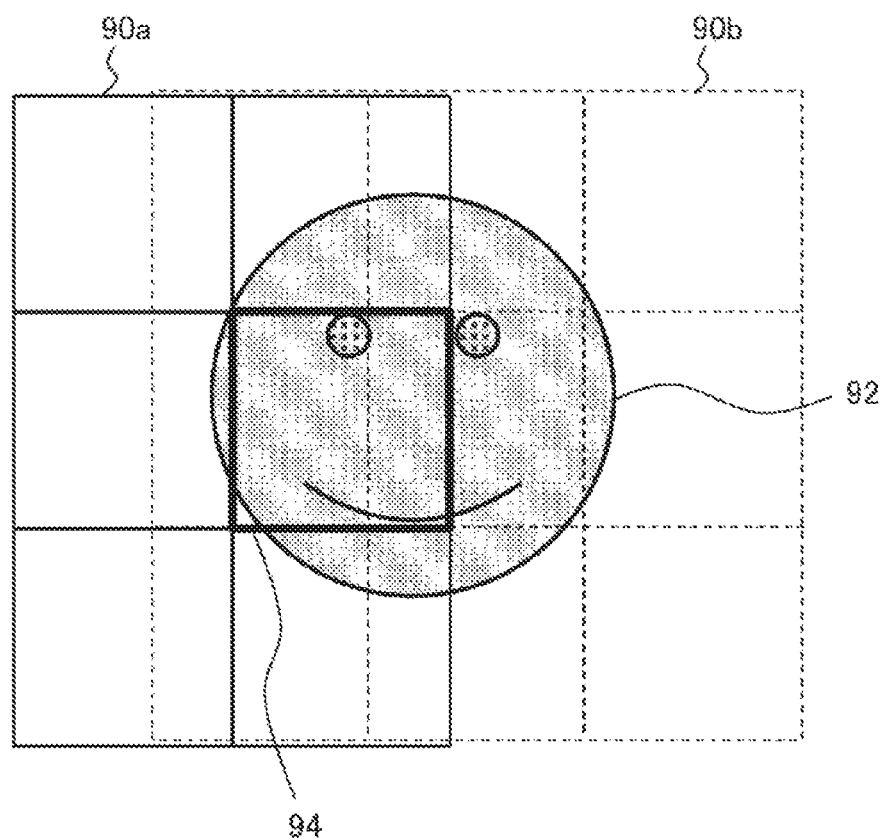
FIG. 7 is a diagram depicting images of the same object represented in right and left original images in an overlapped manner.

However, in this case, a problem to be described next occurs. FIG. 7 depicts images of the same object represented in right and left original images in an overlapped manner. The boundaries of pixel regions of an original image 90a for the left eye and an original image 90b for the right eye are illustrated by lattices of solid lines and dashed lines, respectively. As depicted in the diagram, even with pixel collections that represent an image 92 of the same object, the boundaries of pixels of both images do not necessarily correspond with each other. At this time, for example the region corresponding to a certain pixel (for example pixel 94 with a heavy-line frame) in the original image 90a for the left eye straddles two pixels in the original image 90b for the right eye.

In this case, a parallax value obtained regarding the pixel 94 of the original image 90a for the left eye is in units of sub-pixel smaller than the pixel. That is, even with a pixel that represents substantially the same image, a small difference is generated in the position on the represented object depending on which of the right and left original images is employed as the basis, and it yields a difference in the parallax value in units of sub-pixel. As a result, pieces of data that represents the parallax value regarding each pixel do not correspond with each other between the right and left original images in many cases. In other words, by generating a "parallax value image" that holds the value of the parallax in units of pixel for each of the right and left original images, parallax image in units of sub-pixel and hence depth information can be reflected in the images.

On the other hand, in the case of dividing the original images into small triangles and disposing the small triangles in a virtual three-dimensional space as described above, there is no choice but to select either of the right and left original images and the depth information is only information on the basis of the selected image. As a result, detailed image expression in units of sub-pixel becomes difficult. Furthermore, generally it is usual that the component of specular reflection of light and the component of refracted light are different between images acquired from different points of view. If an object is expressed by a single dot group or a collection of small triangles, these kinds of information are omitted and the texture of the object is impaired as a result. Moreover, the quality of the final displayed image deteriorates readily due to processing of two stages, processing of back-projecting divided small regions onto a three-dimensional space and processing of projecting the small regions in the three-dimensional space onto the view screen. Even when the points of view of the viewer exist at proper positions like those depicted in FIG. 6 and originally there is no need for conversion of images, the image quality unnecessarily deteriorates due to intervention of such processing.

For example, in the conventional processing, for example even if a large amount of memory is prepared and information back-projected onto a three-dimensional virtual space is saved as a dot group or a collection of small triangles, perspective transformation of each dot to the view screen needs to be carried out again and the load of the processing is large. For this reason, latency that cannot be overlooked is generated particularly when the original image is turned to a moving image or the movement of a user is early. Hence, in the present embodiment, the deterioration of the image quality and the latency are suppressed to the minimum by directly associating the original image with the displayed image. Specifically, how an image in the original image moves in response to change in the view screen according to the movement of the point of view is calculated regarding each pixel on the view screen and rendering is carried out.

In this calculation, a corrected image obtained by correcting the original image in such a manner that, even when the point of view moves, the position of an object in the virtual space is kept from changing or distorting in response to the movement is generated on the same plane as the original image or a plane parallel to the original image. Due to this, perspective transformation processing of each dot with use of a 4*4 perspective transformation matrix is simplified and it becomes possible to calculate the displacement of each pixel with a small amount of arithmetic operation. Furthermore, finally perspective transformation of the corrected image to the view screen is necessary. However, it suffices that this be executed regarding one triangle that covers the whole of the corrected image. Therefore, it is possible to execute the processing at very high efficiency by using conventional graphics hardware. In the description hereinafter, the positions of the points of view in the state depicted in FIG. 6 in which the view frustums of the cameras and the viewer correspond with each other are employed as the basic points and focus will be put on the movement of the points of view therefrom and change in the image due to the movement.

Figure 8:
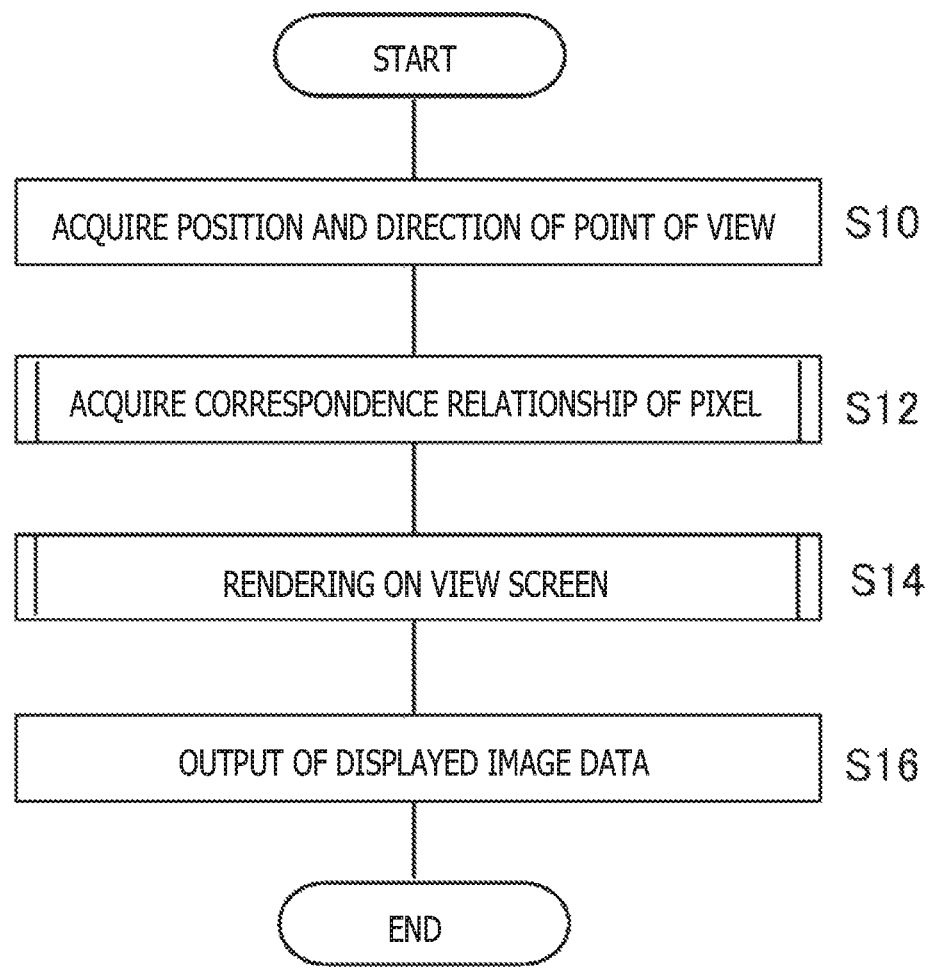
FIG. 8 is a flowchart depicting the outline of processing procedure in which the image generating apparatus in the present embodiment generates a displayed image from an original image.

FIG. 8 is a flowchart depicting the outline of processing procedure in which the image generating apparatus 200 in the present embodiment generates a displayed image from an original image. First, the image generating apparatus 200 acquires the position of the point of view and the direction of the line of sight regarding a user (S10). For example, the posture of the head of the user can be acquired by a motion sensor incorporated in the head-mounted display 100. Furthermore, the user is photographed by imaging apparatus, which is not depicted in the diagram, and the position and posture of the head of the user can be acquired based on an image of a light emitting marker provided on the surface of the head-mounted display 100, or the like.

Alternatively, imaging apparatus, which is not depicted in the diagram, that photographs an image corresponding to the field of view of the user may be provided on the side of the head-mounted display 100 and the position and posture of the head may be acquired by a technique such as SLAM (Simultaneous Localization and Mapping). If the position and posture of the head can be acquired as above, the position of the point of view and the direction of the line of sight regarding the user can be substantially identified. It is understood by those skilled in the art that the method for acquiring the point of view and the line of sight of the user is not limited to the case of using the head-mounted display 100 and various methods are conceivable.

Next, the image generating apparatus 200 sets a view screen corresponding to the position of the point of view and the direction of the line of sight and calculates which position on the original image the pixel on the view screen corresponds to (S12). More specifically, first, the amount of movement and the movement direction of each pixel configuring the image are obtained and a corrected image obtained by changing the original image is generated in such a manner that an object represented in the image is kept from changing according to the motion of the point of view, i.e. the position of the object looks fixed in the virtual space. At this time, the plane (image screen) on which the corrected image is generated may be at the same position as the original image or may be moved in parallel in the Z-axis direction according to the motion of the point of view.

In addition to this, perspective transformation is applied to the whole of the corrected image according to the direction of the line of sight. Qualitatively, the corresponding position of the original image can be obtained regarding each pixel of the view screen by reversely tracing such a series of action. Then, the displayed image is rendered by reflecting the color value of the relevant position in the original image in the pixel of the view screen (S14). The parallax images that should be displayed can be generated by executing these kinds of processing regarding the right and left points of view. Data of these parallax images is subjected to lens distortion correction as appropriate and is output to the head-mounted display 100 (S16). Thereby, without intervention of back projection onto the virtual three-dimensional space, a stereoscopic image free from distortion can be caused to be visually recognized in a field of view corresponding to the movement of the points of view.

Figure 9:
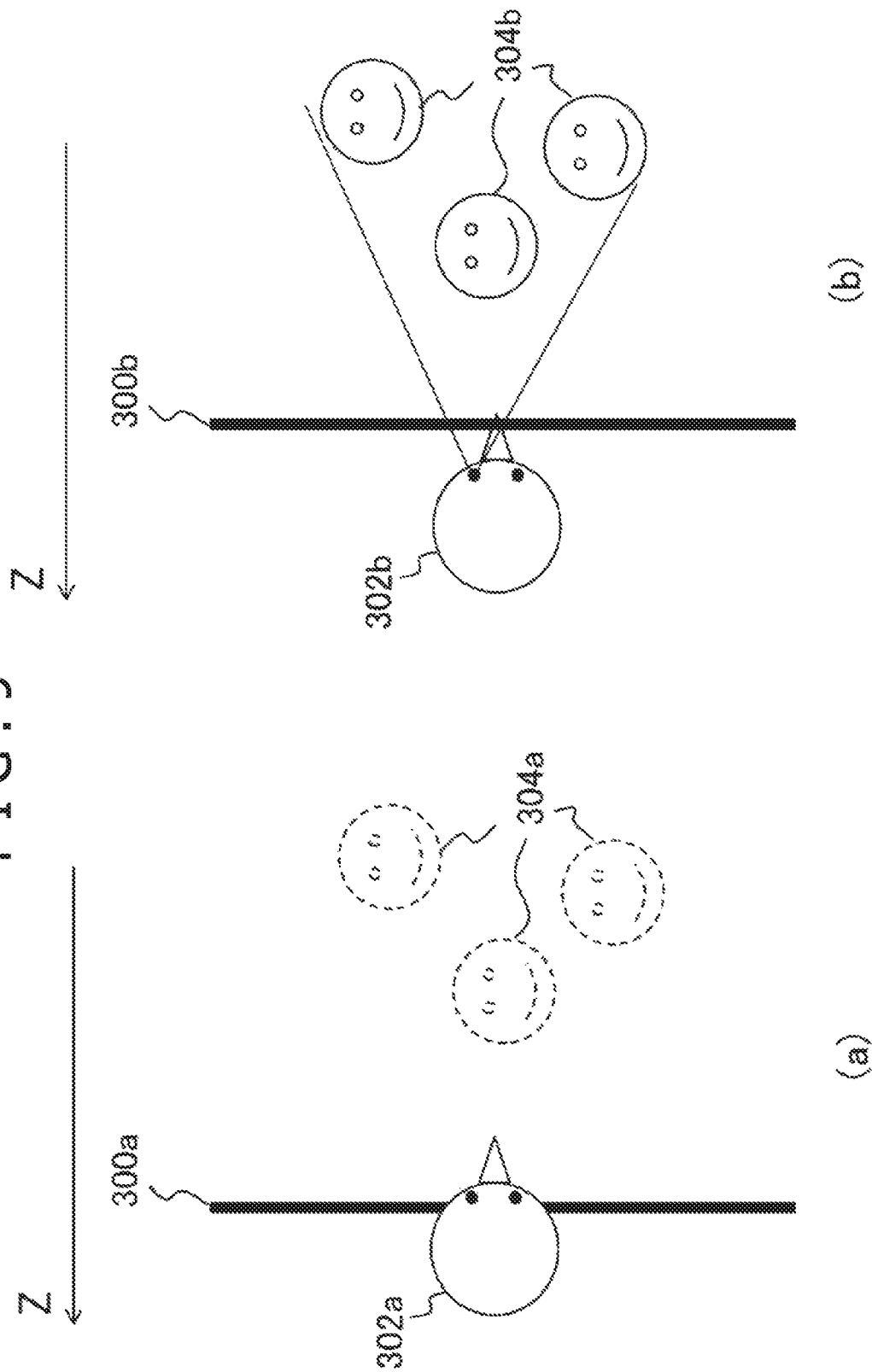
FIG. 9 is a diagram schematically depicting how an image looks when the position of an image screen is fixed in a virtual space and a user moves toward the image side in the present embodiment.

Next, the effect of moving the image screen according to the movement of the point of view in S12 will be described. FIG. 9 schematically depicts how an image looks when the position of the image screen is fixed in a virtual space like that of FIG. 6 and a user moves toward the image side. The arrangement of the cameras 70a and 70b and the image screen 76 like that depicted in FIG. 6 is arrangement on an assumption when the original image is acquired and the user who views the image is not aware of the arrangement.

Therefore, it is conceivable that, when the user comes closer to the image screen, a user 302a gets ahead of an image screen 300a as depicted in (a) in due course. In this case, the perspective transformation fails and the original image including objects 304a becomes invisible from the user 302a. Furthermore, as depicted in (b), even when a user 302b does not get ahead of an image screen 300b, the magnification rate of the original image due to the perspective transformation becomes higher as the user 302b gets closer to the image screen 300b, so that the resolution of the objects in the displayed image decreases. This is particularly significant in the case of the head-mounted display 100, with which the movement range of the user is wide.

Figure 10:
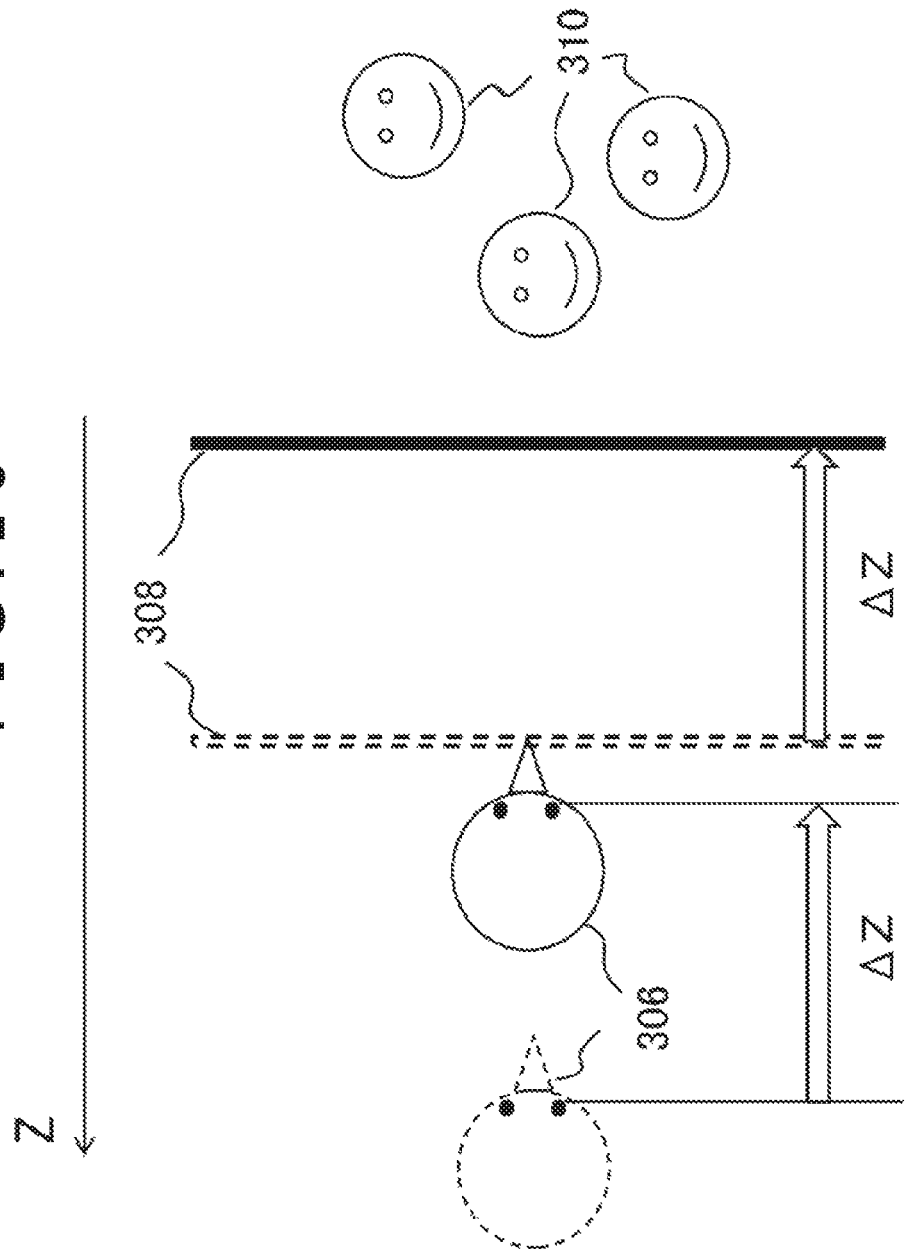
FIG. 10 is a diagram for explaining a method for changing an original image according to the position of the point of view in the present embodiment.

FIG. 10 is a diagram for explaining a method of moving the image screen according to the position of the point of view. In one embodiment, in order to avoid the above-described inconvenience, when a user 306 moves by AZ in the reverse direction of the Z-axis as depicted in the diagram, an image screen 308 is also moved by AZ in the same direction. That is, in response to the amount of movement of the Z component of the point of view, the image screen is moved in parallel by the same amount in the same direction. Thereby, the distance between the user 306 and the image screen 308 is kept constant.

Simultaneously, pixels configuring an image in the original image are moved in such a manner that objects 310 look fixed in the virtual space. Due to this, the movement of the image screen 308 is not recognized by the user 306. As a result, the situation like that depicted in FIG. 9 can be avoided without affecting the apparent situation. Although the above description is motion in the reverse direction of the Z-axis, the image screen may be moved in parallel in the same direction also when the point of view moves in the Z-axis direction.

Figure 11:
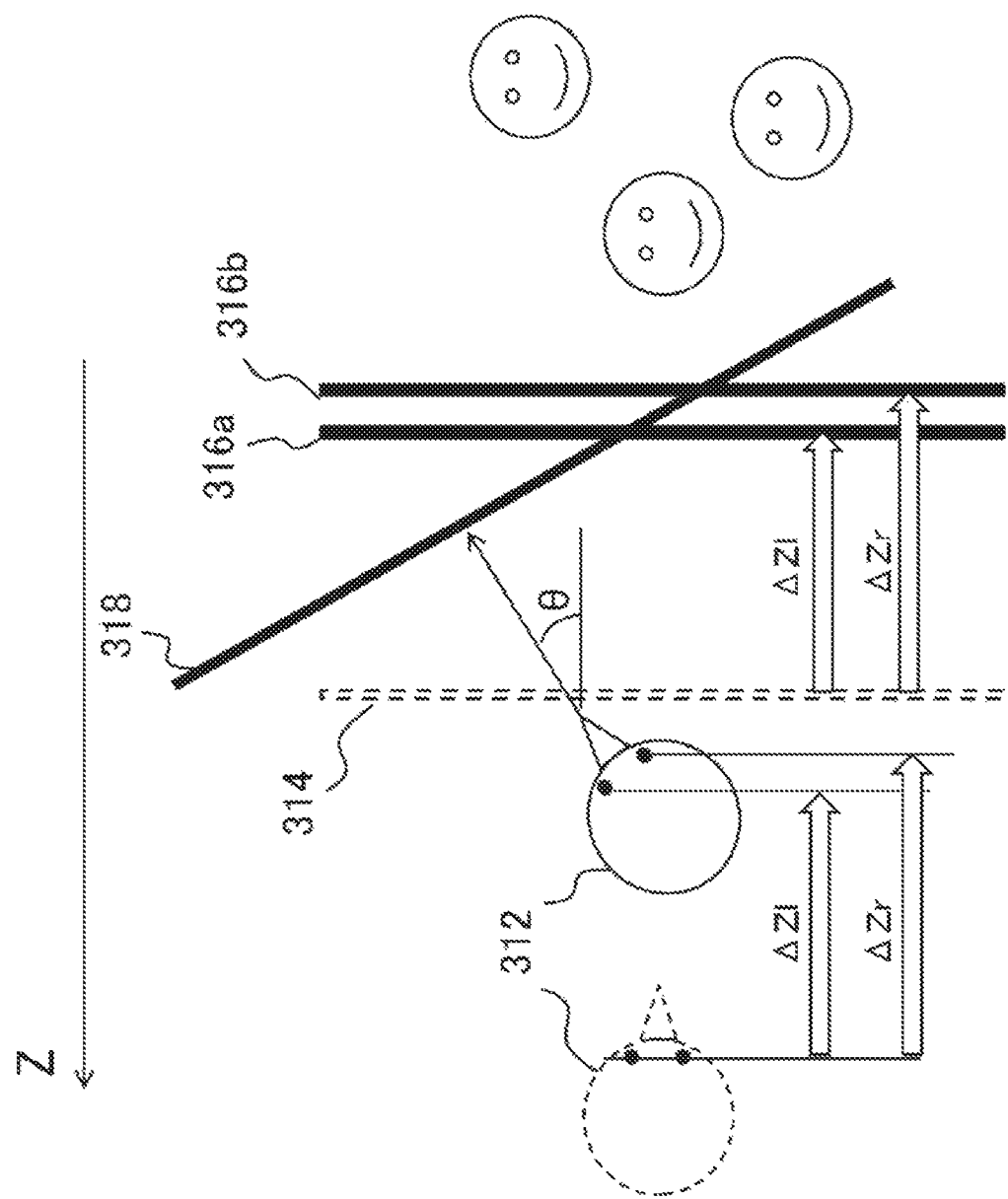
FIG. 11 is a diagram depicting how an original image is rendered on a view screen also in consideration of the direction of the line of sight in the present embodiment.

FIG. 11 depicts how an original image is rendered on a view screen also in consideration of the direction of the line of sight. Also in this case, similarly to the description with FIG. 10, the image screen is moved in parallel in the same direction by the same distance as the Z component of the amount of movement of a user 312. However, as depicted in the diagram, if the line of sight after the movement has an angle θ to the Z-axis, the amount ΔZl of movement of the point of view of the left eye is different from the amount ΔZr of movement of the point of view of the right eye.

Therefore, the image screens after the movement are located at different positions between an image screen 316a for the left eye and an image screen 316b for the right eye. In the example depicted in the diagram, because the user is oriented toward the front left side, the image screen 316a for the left eye is located at a position closer to the user. Furthermore, the left and right original images are changed according to the respective image screens 316a and 316b. Moreover, projection is carried out onto a view screen 318 set to correspond to the positions of the points of view and the direction of the line of sight of the user 312 after the movement.

The movement of the image screen like that depicted in FIG. 10 and FIG. 11 is processing that is necessary when the points of view of the user greatly move. On the other hand, if the main purpose of display is viewing of objects or a moving image and the movement of the points of view will not be large, the movement of the image screen may be omitted and a corrected image may be generated on the image screen at the same position as the original image. However, in the following description, the form in which the image screen is moved in parallel, in which the amount of calculation is larger, will be mainly exemplified. Even when this is employed, the amount of displacement of each pixel can be calculated with a smaller amount of arithmetic operation compared with general three-dimensional perspective transformation.

It is also possible to implement the processing of two stages of S12 and S16 in FIG. 8 through sequentially changing the original image itself. That is, the displayed image can be rendered by generating a corrected image arising from change in the original image based on the movement of the point of view and carrying out perspective transformation of it on a view screen. However, in this case, two times of transformation processing are executed for the original image all the same and therefore there is a possibility that the quality of the displayed image is not kept. Hence, instead of generating the above-described second original image, an image map that represents which position in the original image each pixel in the corrected image according to the movement of the point of view originally existed is generated.

Then, after this image map is projected onto a view screen and the positional relationship between the view screen and the map is identified, which position in the original image the pixel on the view screen corresponds to is checked and the color value is acquired from the original image. Due to this, it suffices that one time of operation for the original image be carried out and the image quality can be kept at the original image level.

Here, the information that represents which position in the original image each pixel in the corrected image corresponds to is a vector value whose start point and end point are defined on the image plane and therefore will be referred to as "image reference vector" hereinafter. Furthermore, the map that holds information on a movement reference vector regarding each pixel on the corrected image and corresponds to the image plane will be referred to as "image reference vector map" or simply as "map."

Figure 12:
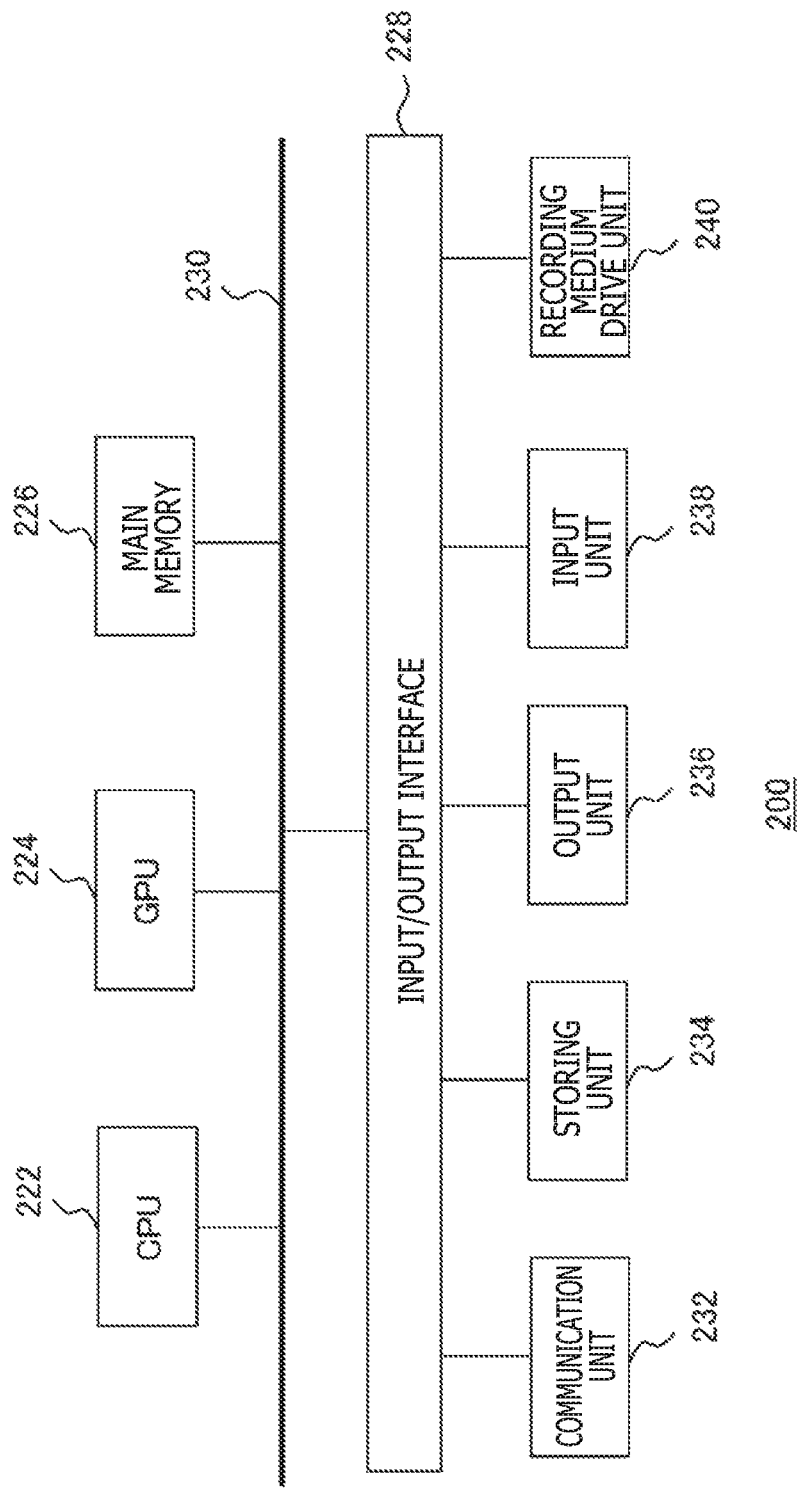
FIG. 12 is a diagram depicting the internal circuit configuration of the image generating apparatus in the present embodiment.

FIG. 12 depicts the internal circuit configuration of the image generating apparatus 200. The image generating apparatus 200 includes a CPU (Central Processing Unit) 222, a GPU (Graphics Processing Unit) 224, and a main memory 226. These respective units are mutually connected via a bus 230. An input/output interface 228 is further connected to the bus 230.

The following respective units are connected to the input/output interface 228: a communication unit 232 formed of peripheral equipment interfaces of USB, IEEE1394 (The Institute of Electrical and Electronics Engineers 1394), and so forth and a network interface of a wired or wireless LAN (Local Area Network); a storing unit 234 such as a hard disk drive and a non-volatile memory; an output unit 236 that outputs data to display apparatus such as the head-mounted display 100; an input unit 238 to which data is input from the head-mounted display 100; and a recording medium drive unit 240 that drives a removable recording medium such as a magnetic disc, optical disc, or semiconductor memory.

The CPU 222 controls the whole of the image generating apparatus 200 by executing an operating system stored in the storing unit 234. Furthermore, the CPU 222 executes various kinds of programs that are read out from a removable recording medium and are loaded into the main memory 226 or are downloaded via the communication unit 232. The GPU 224 has functions of a geometry engine and functions of a rendering processor and executes rendering processing in accordance with a rendering command from the CPU 222 to store a displayed image in a frame buffer, which is not depicted in the diagram. Then, the GPU 224 converts the displayed image stored in the frame buffer to a video signal and outputs the video signal to the output unit 236. The main memory 226 is formed of a RAM (Random Access Memory) and stores program and data necessary for processing.

Figure 13:
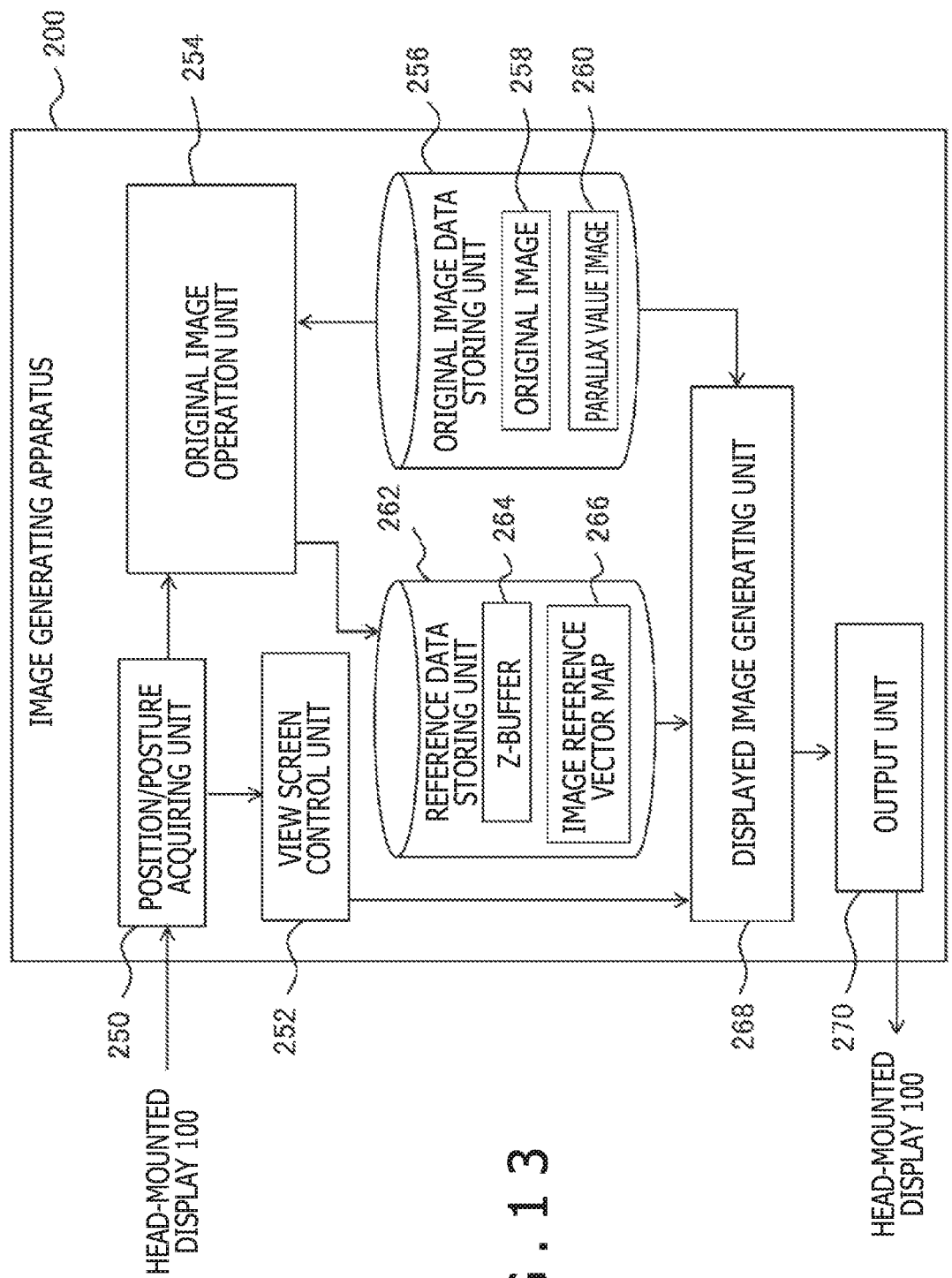
FIG. 13 is a diagram depicting functional blocks of the image generating apparatus in the present embodiment.

FIG. 13 depicts functional blocks of the image generating apparatus 200 in the present embodiment. At least part of the functions of the image generating apparatus 200 depicted in FIG. 13 may be implemented in the head-mounted display 100. Alternatively, at least part of the functions of the image generating apparatus 200 may be implemented in a server connected to the image generating apparatus 200 via a network. Furthermore, the image generating apparatus 200 may be employed as part of information processing apparatus such as a game machine or personal computer.

This diagram represents a block diagram in which attention is paid mainly to a function of generating a displayed image in functions possessed by the image generating apparatus 200. In terms of hardware, these functional blocks can be implemented by the configuration of CPU, GPU, and various kinds of memories depicted in FIG. 12. In terms of software, the functional blocks are implemented by a program that is loaded from a recording medium or the like into a memory and exerts functions such as data input function, data holding function, image processing function, and communication function. Therefore, it is understood by those skilled in the art that these functional blocks can be implemented in various forms by only hardware or only software or a combination thereof, and the functional blocks are not limited to any.

The image generating apparatus 200 includes a position/posture acquiring unit 250 that acquires the position and posture of the head-mounted display 100, a view screen control unit 252 that controls a view screen based on the position of the point of view and the direction of the line of sight, an original image operating unit 254 that generates an image reference vector map based on the position of the point of view, an original image data storing unit 256 that stores data of an original image, a reference data storing unit 262 that stores intermediate data such as the image reference vector map, a displayed image generating unit 268 that renders a displayed image on the view screen by using the image reference vector map, and an output unit 270 that outputs generated data of the displayed image.

The position/posture acquiring unit 250 acquires the position and posture of the head of the user by any of the above-described measures. The view screen control unit 252 decides the position of the point of view and the direction of the line of sight regarding the user based on the position and posture of the head acquired by the position/posture acquiring unit 250 and sets the view screen according to them. The displayed images rendered on the view screen are the image 60a for the left eye and the image 60b for the right eye depicted in FIG. 4 for example. Also regarding the view screen, a view screen for the left eye and a view screen for the right eye are set.

The original image operating unit 254 moves an image screen in parallel according to need and calculates the amount of movement and the direction of the pixels configuring an image of an object according to the position of the point of view. Furthermore, the original image operating unit 254 generates image reference vectors that represent which position in an original image the respective pixels in the screen after the movement correspond to. Moreover, the original image operating unit 254 generates the image reference vector map that associates these vectors with the respective pixels in the image plane on the screen after the movement regarding each of right and left eyes. If the line of sight has an angle to the Z-axis, the position of the screen after the movement is different between right and left eyes as depicted in FIG. 11. However, in the description hereinafter, they are comprehensively represented as one screen.

To decide the image reference vector as described later, the distance Zp in the virtual space regarding the object represented on the image is necessary in addition to the amount of movement and the movement direction of the point of view. The distance Zp is obtained as described above from the parallax Dp of right and left original images. In the original image data storing unit 256, right and left original image data 258 and right and left parallax value image data 260 that hold a parallax value regarding each pixel of the respective images are stored. The purpose of preparing right and left images separately as the parallax value images is to utilize information with sub-pixel accuracy as described above. Instead of the parallax value image data 260, distance value image data that holds the distance Zp regarding each pixel of right and left images may be prepared.

Depending on the point of view, the original image operating unit 254 may set a pixel about which reference to the original image for the right eye is carried out in the image reference vector map for the left eye or set a pixel about which reference to the original image for the left eye is carried out in the image reference vector map for the right eye. This is because a place that exists in a blind area and does not appear as an image in one of right and left original images appears in the other in some cases. If the need to display such a blind-area part arises due to the movement of the point of view, such details can also be replicated with high accuracy by acquiring data from the other image. Moreover, the original image operating unit 254 may extend the parallax value held by the parallax value image to the outside of an image and thereby prepare also the image reference vector of the extension. Details will be described later.

The reference data storing unit 262 stores right and left image reference vector maps 266 generated by the original image operating unit 254. In addition, the reference data storing unit 262 includes a Z-buffer 264 that stores information on the Z-value for determining whether or not writing of an image reference vector is possible at the stage of creation of the image reference vector maps 266. The displayed image generating unit 268 renders the displayed image on the view screen set by the view screen control unit 252 by referring to the pixel value of the original image corresponding to each pixel.

Specifically, the image reference vector map is mapped on the view screen by perspective transformation. Thereafter, by acquiring the color value of the original image based on the image reference vector acquired at the position on the map corresponding to the pixel on the view screen, the pixel value of this pixel is decided. By carrying out this for each of right and left eyes, displayed images for the right eye and for the left eye can be generated. Data of plural resolutions may be employed as the original image data 258 stored in the original image data storing unit 256 and the resolution used for rendering may be switched according to the degree of reduction ratio based on perspective transformation.

A method of suppressing flickering of an image by switching the resolution of the original image and carrying out texture mapping is known as mipmapping. However, in the present embodiment, LOD (Level of Detail) is calculated and the proper resolution is selected based on not the reduction ratio of small regions obtained by dividing the image but the amount of movement of the point of view undergone until the pixel on the screen makes a transition from the original image. Due to this, however small regions of the original image are deformed by perspective transformation, the proper resolution for the pixel can be obtained independently of it.

The output unit 270 outputs data of right and left displayed images generated by the displayed image generating unit 268 to the head-mounted display 100 at a predetermined rate. At this time, the output unit 270 may output the displayed images after carrying out lens distortion correction for the displayed images. The output unit 170 may further output acoustic data such as music for a menu screen and sounds included in various kinds of content.

Figure 14:
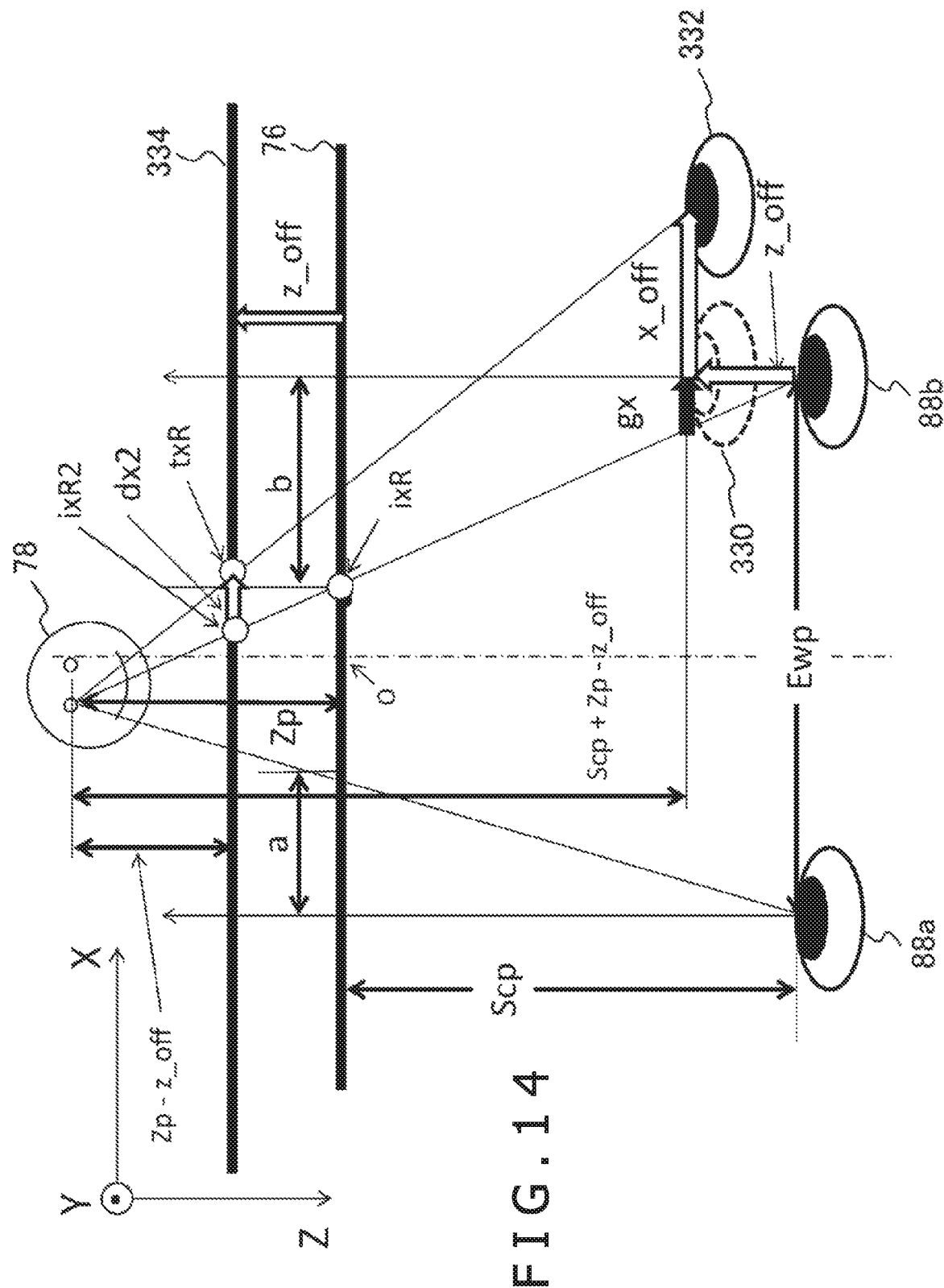
FIG. 14 is a diagram for explaining the relationship between components of the amount of movement in a Z-axis direction and an X-axis direction in the amount of movement of the point of view and the amount of movement of a pixel in an original image according to the components in the present embodiment.

Next, a method for calculating the image reference vector by the original image operating unit 254 will be described. FIG. 14 is a diagram for explaining the relationship between components of the amount of movement in the Z-axis direction and the X-axis direction in the amount of movement of the point of view and the amount of movement of a pixel in an original image according to the components. In this diagram, the points of view after movement from the points 88a and 88b of view in the state depicted in FIG. 6 by $-z\_off$ in the Z-axis direction and by $x\_off$ in the X-axis direction are illustrated, with a point 332 of view of the right eye employed as the representative.

In response to this movement, the image screen 76 is moved in the Z-axis direction by $-z\_off$ as described above and the image reference vector is generated regarding each pixel on the plane. Hereinafter, the image screen after the movement will be referred to as "map screen" 334. The image reference vector is information that represents the correspondence relationship of the pixel when the object 78 existing in the virtual space looks fixed both when the original image is viewed from the point 88b of view and when the map screen 334 is viewed from the point 332 of view after movement. For example, the object 78 looks fixed if an image visible at a position ixR in the X-axis direction on the original image for the right eye from the point 88b of view is moved to a position txR on the map screen 334 and is seen from the point 332 of view.

The intersection of a line in the Z-axis direction passing through the midpoint of the line segment coupling the points 88a and 88b of view as the basic points and the image screen 76 is defined as an origin O of the image irrespective of whether the image is the image for the left eye or the image for the right eye. First, a consideration will be made with extraction of the motion of the point 88b of view in the Z-axis direction. At this time, while the relationship between the original point 88b of view and the image screen 76 is kept, both are moved in parallel by $z\_off$ in the negative direction of the Z-axis. Thereby, a point 330 of view after the movement and the map screen 334 are obtained. On the other hand, the object 78 is fixed. Thus, due to the movement of the point of view in the Z-axis direction, the line of sight along which it is seen moves in the X-axis direction. The amount of movement at the time is defined as gx.

Based on triangle similarity, $$b:gx=Scp:z\_off$$

is satisfied. Therefore, the amount gx of movement is obtained as follows.

$$gx=b*z\_off/Scp$$

Meanwhile, a position ixR2 on the map screen 334 corresponding to the position ixR on the image screen 76 due to the movement of the screen by $z\_off$ is obtained as follows.

$$ixR-ixR2:z\_off=b:Scp$$

Thus, $$ixR2=ixR-b*z\_off/Scp=ixR-gx$$

When the amount x_off of final movement to the point 332 of view in the X-axis direction is further considered besides the above-described gx, an amount dx2 of movement from the position ixR2 on the map screen 334 is obtained as follows.

$$dx2{:}x\_off+gx=Zp-z\_off{:}Scp+Zp-z\_off$$

Thus $$dx2=(x\_off+gx)*(Zp-z\_off)/(Scp+Zp-z\_off)$$

When the position txR on the map screen 334 corresponding to the position ixR on the image screen 76 due to the movement of the point of view by z_off and x_off is represented by using the above-described dx2, the position txR becomes as follows.

$$txR=ixR2+dx2=ixR-gx+dx2$$

That is, the difference between txR and ixR depends on the position of the image of the object in the original image, the parallax value of the object given to the original image (or distance to the image screen), and the amount of movement of the point of view.

Calculation can be similarly carried out also regarding the movement of the point of view of the left eye and the following expression is obtained.

$$gx=a*z\_off/Scp$$

$$ixL2=ixL+gx$$

$$dx2=(x\_off-gx)*(Zp-z\_off)/(Scp+Zp-z\_off)$$

$$txL=ixL2+dx2=ixL+gx+dx2$$

Here, ixL, ixL2, and txL are the position in the horizontal direction in the original image for the left eye on the image screen 76, the corresponding position when the image screen is moved by z_off, and the position on the map screen 334 for keeping the object 78 from changing even when the left point of view moves by z_off and x_off.

Figure 15:
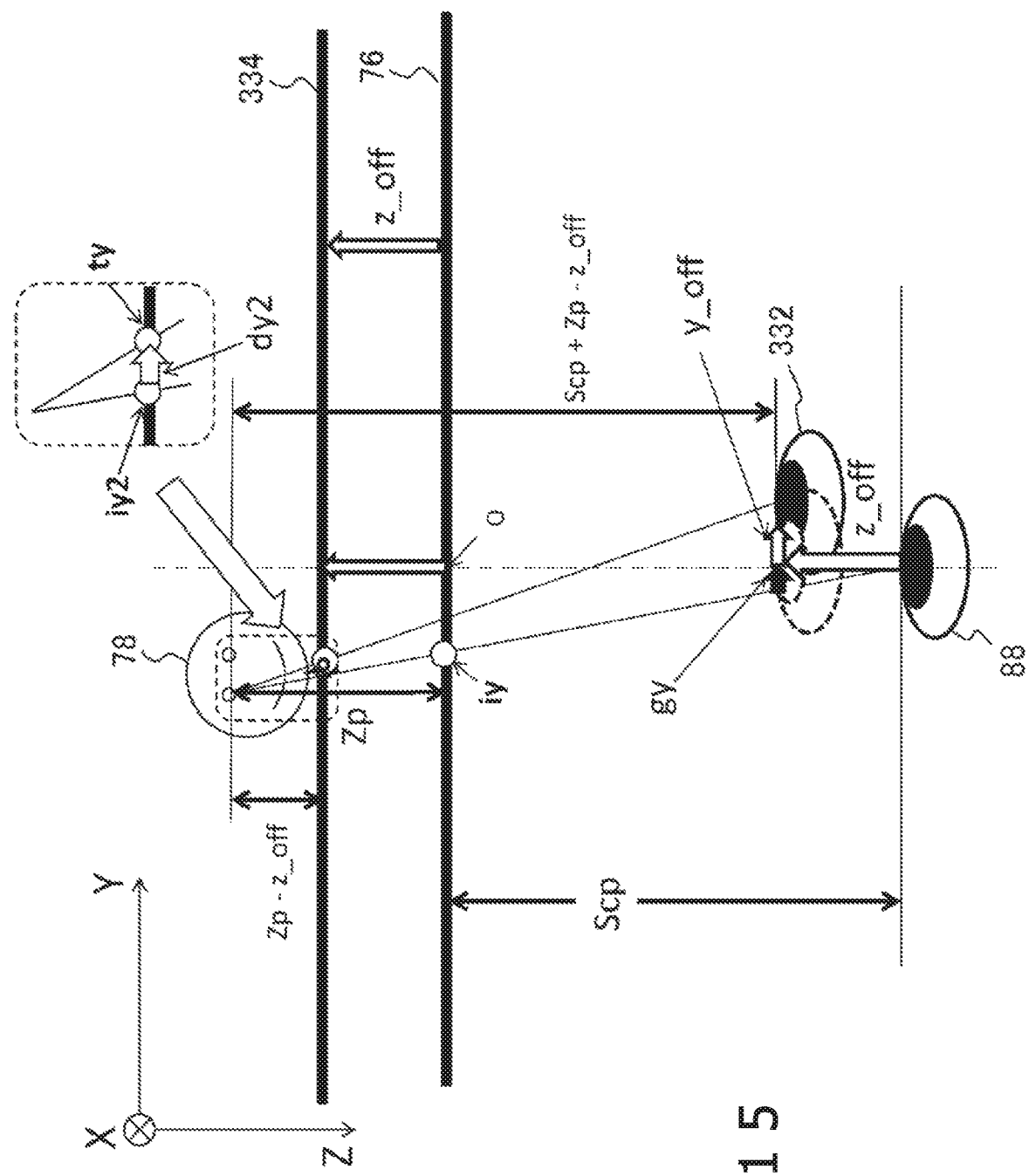
FIG. 15 is a diagram for explaining the relationship between components of the amount of movement in the Z-axis direction and a Y-axis direction in the amount of movement of the point of view and the amount of movement of a pixel in an original image according to the components in the present embodiment.

FIG. 15 is a diagram for explaining the relationship between components of the amount of movement in the Z-axis direction and the Y-axis direction in the amount of movement of the point of view and the amount of movement of a pixel in an original image according to the components. The orientation of the coordinate axes is different from FIG. 14 and the abscissa axis of the diagram is employed as the Y-axis. That is, because of the state in which the virtual space is seen from a lateral side, the points 88 of view of both eyes overlap into one. The calculation method is basically the same as that described with FIG. 14. Specifically, an image visible at a position iy in the Y-axis direction on the original image in the image screen 76 is moved to a position ty on the map screen 334 so that the object 78 may look fixed.

In this diagram, a diagram of the vicinity of ty is additionally illustrated in an enlarged manner. First, the amount gy of movement of the point of view in the Y-axis direction due to the motion of the point 88 of view in the Z-axis direction by −z_off is obtained as follows.

$$gy=-iy*z\_off/Scp$$

The reason why the negative sign is given here is because iy exists in the negative region lower than the origin O in the example depicted in the diagram. Meanwhile, a position iy2 on the map screen 334 corresponding to the position iy on the image screen 76 due to the movement of the screen by z_off is obtained as follows.

$$iy2=iy-iy*z\_off/Scp=iy+gy$$

This arithmetic operation includes division. However, because Scp is a constant, it suffices that only one time of division be executed regarding the whole processing.

When the amount y_off of final movement to the point 332 of view in the Y-axis direction is further considered besides the above-described gy, an amount dy2 of movement from the position iy2 on the map screen 334 is obtained as follows.

$$dy2=(y\_off+gy)*(Zp-z\_off)/(Scp+Zp-z\_off)$$

When the position ty on the map screen 334 corresponding to the position iy on the image screen 76 due to the movement of the point of view by z_off and y_off is represented by using the above-described dy2, the position ty becomes as follows.

$$ty=iy2+dy2=iy+gy+dy2$$

This calculation is the same about either of the right and left images. It should be noted that the division by (Scp+Zp−z_off) in the arithmetic operation of dy2 corresponds to perspective division of general perspective transformation processing.

In this manner, the correspondence relationship between the position (tx, ty) on the image reference vector map and the position (ix, iy) on the original image according to the respective components (x_off, y_off, z_off) of the amount of movement of the point of view can be derived with a small amount of arithmetic operation. The positions txR and txL in the X-axis direction in the right and left images are referred to as tx collectively and ixR and ixL are referred to as ix collectively.

Figure 16:
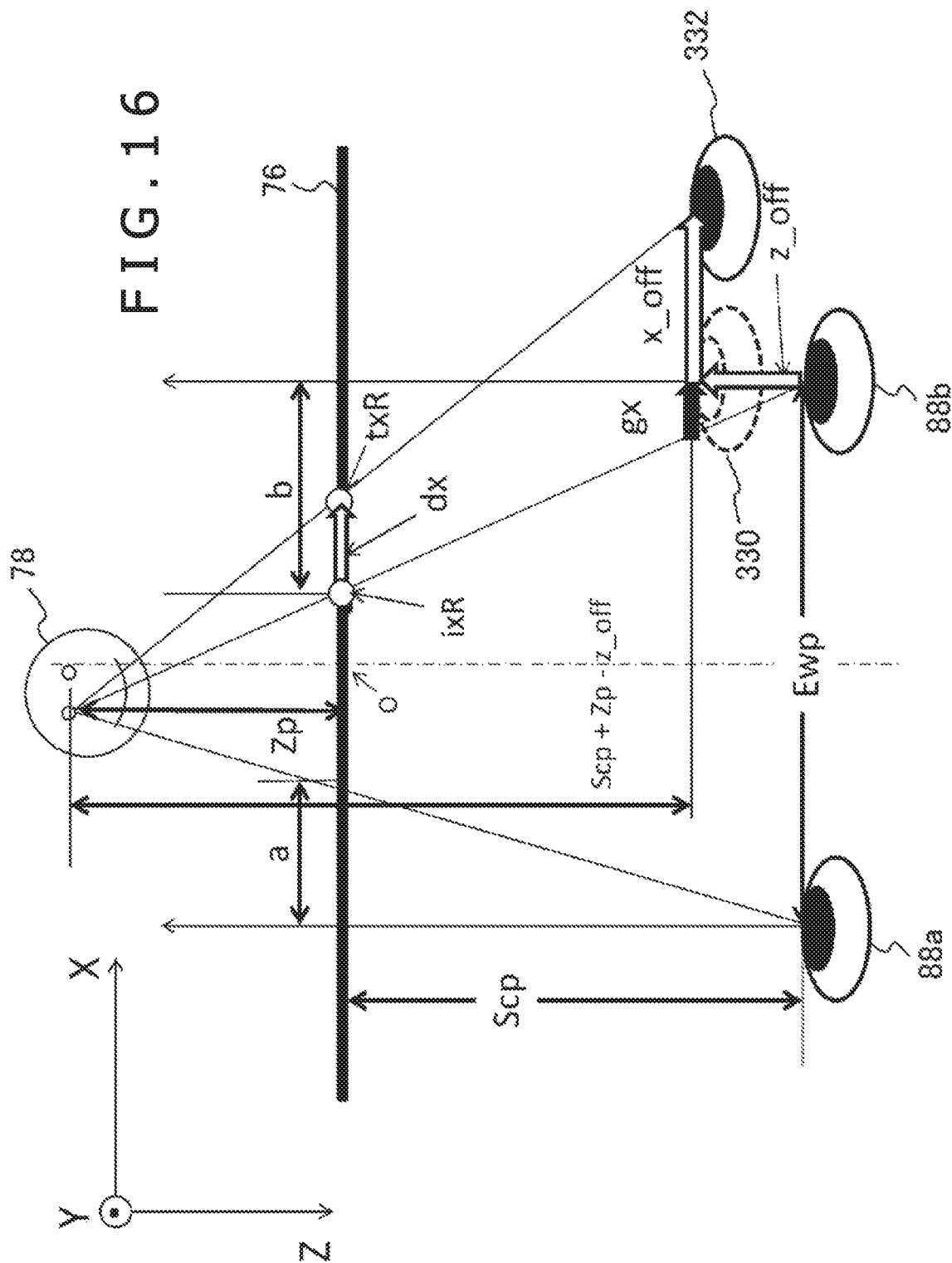
FIG. 16 is a diagram for explaining the amount of movement of a pixel when the image screen is not moved in the present embodiment.

Here, the case in which the map screen is not moved from the image screen 76 of the original image will also be exemplified. FIG. 16 is a diagram for explaining the amount of movement of a pixel when the image screen 76 is not moved in response to the same movement of the point of view as FIG. 14. That is, the point of view moves by −z_off in the Z-axis direction and by x_off in the X-axis direction. At this time, the object 78 looks fixed if an image visible at the position ixR in the X-axis direction on the original image for the right eye from the point 88b of view is moved to the position txR on the same image screen 76 and is seen from the point 332 of view for example.

The amount gx of movement of the pixel due to the motion of the point of view in the Z-axis direction is as follows similarly to FIG. 14.

$$gx=b*z\_off/Scp$$

When the amount x_off of final movement to the point 332 of view in the X-axis direction is further considered, an amount dx of movement from the position ixR on the image screen 76 is obtained as follows.

$$dx{:}x\_off+gx=Zp{:}Scp+Zp-z\_off$$

Thus $$dx=(x\_off+gx)*Zp/(Scp+Zp-z\_off)$$

When the position txR after the movement of the position ixR on the image screen 76 due to the movement of the point of view by z_off and x_off is represented by using the above-described dx, the position txR becomes as follows.

$$txR=ixR+dx$$

Also regarding the movement of the point of view of the left eye and movement in the Z-axis direction and the Y-axis direction, calculation can be easily carried out by modifying the above-described calculation method in which the image screen is moved.

To decide the image reference vector, pixel grid of both images needs to be further considered. FIG. 17 schematically depicts the correspondence relationship between the grid and position of pixels in an original image and an image reference vector map. Lattices depicted in this diagram represent the pixel grid in the original image in (a) and represent the pixel grid of the image reference vector map in (b). Suppose that the position coordinates of the center of each pixel in them are represented by integer values of (0, 0), (1, 0), (2, 0), . . . . If (ix, iy) in the original image is set to such integer values as depicted in (a), (tx, ty) calculated in the above has a value after the decimal point in many cases. That is, (tx, ty) deviates from the center of the pixel of the image reference vector map in many cases.

Hence, as depicted in (b), the position (tx, ty) of the end point thus obtained is rounded off to be turned to integer values (tx', ty') and a vector that has the position as the start point and is in the opposite direction is employed as an image reference vector V. That is, the image reference vector V (inv_x, inv_y) associated with the pixel whose pixel center is (tx', ty') is represented as follows.

$$tx'=(int)(tx+0.5)$$

$$ty'=(int)(ty+0.5)$$

$$inv\_x=(float)ix-tx$$

$$inv\_y=(float)iy-ty$$

When this is employed, the end point (ix', iy') of the image reference vector V deviates from the center of the pixel of the original image in many cases. Even when this is employed, an image of high image quality at sub-pixel accuracy can be displayed by going through processing of interpolation of the image reference vector based on a position on the map sampled at the time of displayed image rendering and interpolation of the color value based on a position on the original image indicated by the image reference vector. Processing relating to rendering with reference to the image reference vector will be described later. The vector having (ix, iy) as the start point and having (tx, ty) as the end point as in the arrow in (a) of the diagram will be referred to as "displacement vector."

Next, a calculation method of the image reference vector in the case in which, in one of right and left image reference vector maps, reference to the original image of the other is carried out will be described. As described above, in right and left original images, a part that exists in a blind area and does not appear as an image at the time of acquisition but becomes visible due to movement of the point of view possibly exists. The original image operating unit 254 generates an image reference vector through reference to the original image of the other for the pixel at which such an image should be expressed, to thereby allow the part existing in the blind area to be rendered more accurately. Such a technique is referred to as mutual reference of a parallax image.

Figure 18:
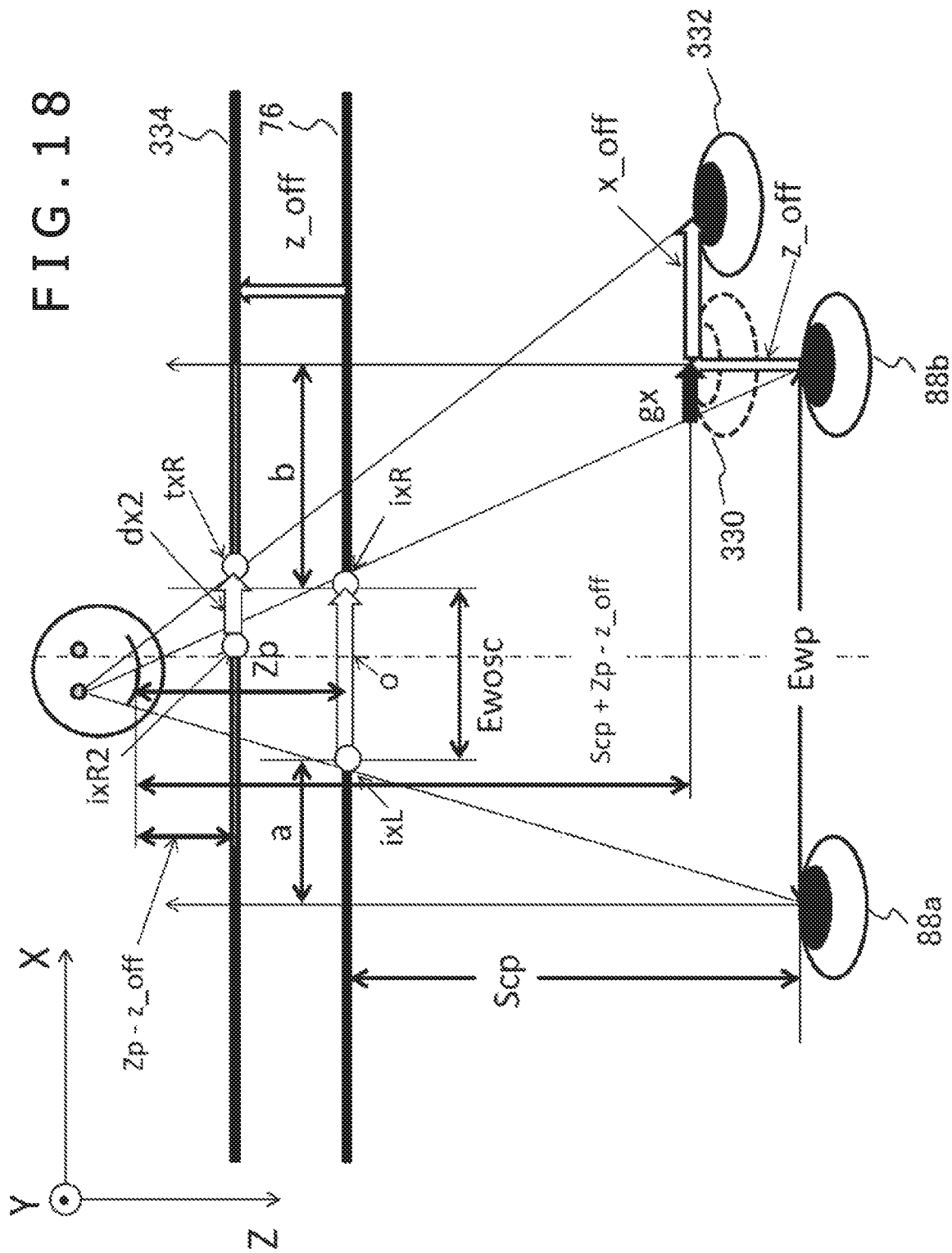
FIG. 18 is a diagram for explaining the relationship between components of the amount of movement in the Z-axis direction and the X-axis direction in the amount of movement of the point of view and the amount of movement of a pixel when reference to an original image for the left eye is carried out in an image reference vector map for the right eye in the present embodiment.

FIG. 18 is a diagram for explaining the relationship between components of the amount of movement in the Z-axis direction and the X-axis direction in the amount of movement of the point of view and the amount of movement of a pixel when reference to an original image for the left eye is carried out in an image reference vector map for the right eye. The concept for the calculation is the same as that depicted in FIG. 14 but is different in that the position ixL in the image for the left eye corresponding to ixR as the original start point is the start point.

Specifically, similarly to FIG. 14, when attention is paid to movement of the point of view of the right eye, the position txR on the map screen 334 corresponding to the position ixR on the image screen 76 due to the movement of the point of view by z_off and x_off is represented as follows, as described above.

$$txR=ixR2+dx2=ixR-gx+dx2$$

The position ixR in the original image for the right eye and the position ixL in the original image for the left eye corresponding to it are in the following relationship.

$$ixR=ixL+Ewosc$$

Here, Ewosc is given as follows from the interval Ewp between the points 88a and 88b of view and the parallax Dp=a+b in the original image.

$$Ewosc=Ewp-Dp$$

As a result, when the position ixL on the original image for the left eye is regarded as the start point, txR is obtained as follows.

$$txR=ixL+Ewosc-gx+dx2$$

The parallax Dp used for the calculation of Ewosc is a value that is given to the pixel of the original image for the left eye and is held by the parallax value image of the left eye. Calculation can be similarly carried out also regarding the movement of the point of view of the left eye. Specifically, because the position txL on the map screen 334 corresponding to the position ixL on the image screen 76 is $$txL=ixL2+dx2=ixL+gx+dx2,$$

the position txL becomes as follows when the position ixR on the original image for the right eye is regarded as the start point.

$$txL=ixR-Ewosc+gx+dx2$$

The parallax Dp used for the calculation of Ewosc is a value that is given to the pixel of the original image for the right eye and is held by the parallax value image of the right eye. The movement of the position in the Y-axis direction due to movement of the point of view is as follows similarly to the case in which mutual reference is not carried out.

$$ty=iy2+dy2=iy+gy+dy2$$

By the above calculation, the image reference vector can be set regarding each pixel of the image reference vector map similarly to the case in which mutual reference is not carried out.

Figure 19:
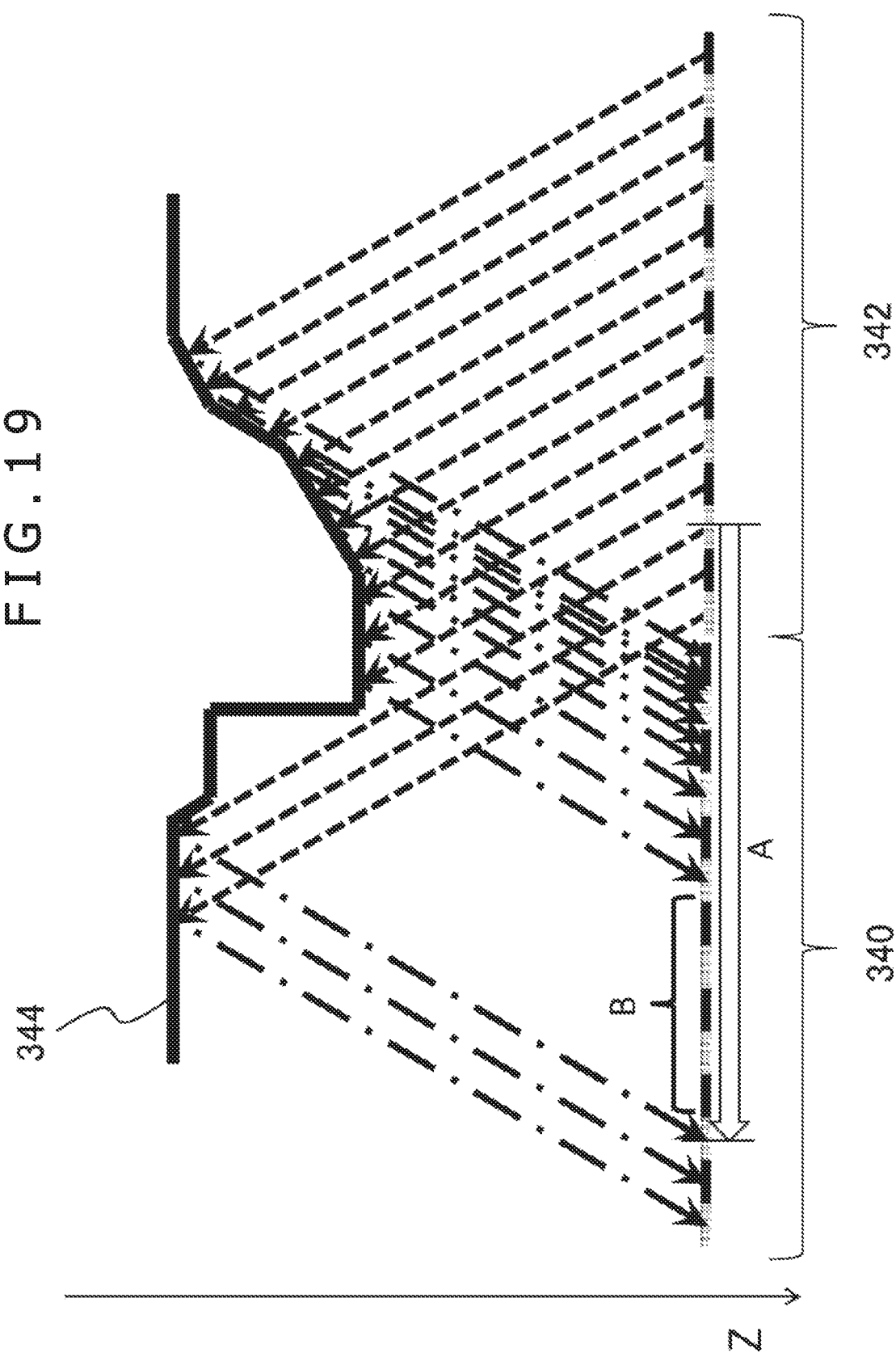
FIG. 19 is a diagram for explaining a method for identifying the pixel about which mutual reference is possible by using parallax value images in the present embodiment.

By using right and left parallax value images, pixels that exist in a blind area in one of right and left original images and about which reference to the other original image is possible may be identified in advance. FIG. 19 is a diagram for explaining a method for identifying the pixel about which mutual reference is possible by using parallax value images. This diagram schematically depicts the state in which an object 344 with a shape like one depicted in the diagram and planes of right and left original images 340 and 342 that represent it are viewed from above. The parallax value image holds the parallax value about the part visible in the original image in the object 344.

For example, each pixel of the original image 342 for the right eye represents a position on the object 344 like one indicated at the tip of a dashed arrow, and, as depicted by arrows of one-dot-chain lines, each pixel of the corresponding parallax value image represents which position in the original image 340 for the left eye a respective one of the positions on the object 344 appears by the difference on the image plane (for example arrow A). Therefore, region B of the original image for the left eye corresponding to none of the end points of the parallax held by the parallax value image of the right eye represents a part of the object that exists in a blind area from the right point of view and is visible from the left point of view.

In this case, it is possible to set the image reference vector of the right eye in such a manner that reference to the pixels of region B in the original image 340 for the left eye is carried out as depicted in FIG. 18. Hence, data indicating the existence of region B can be created in advance with respect to the image plane. This is referred to as a mutual reference flag. The mutual reference flag that represents region B in the original image 340 for the left eye can be generated as follows Specifically, in the pixel row on the same horizontal line, the position ixL on the original image 340 for the left eye corresponding to the position ixR on the original image 342 for the right eye is represented as follows, as described above.

$$ixL=ixR-Ewosc$$

The parallax Dp used for the calculation of Ewosc is a value that is given to the pixel of the original image for the right eye and is held by the parallax value image of the right eye. Here, ixR is the center of a pixel and ixL is not necessarily the center of a pixel. Hence, ixL is rounded off to obtain the nearest pixel center and identify the pixel having it as the center. The pixel obtained in this manner is the pixel as the end point of the parallax in FIG. 19 and the other pixels are pixels to which reference is possible for the displayed image for the right eye as in region B.

Therefore, information of one bit is given so that these pixels can be discriminated. By acquiring such data regarding the right and left original image planes, right and left mutual reference flags can be generated. The above is the method of the mutual reference in right and left original images. However, it is also possible to further supplement a pixel that cannot be supplemented by the mutual reference of the right and left original images by additionally acquiring an original image about which the point of view exists further outside the right and left cameras when the original images have been acquired. Here, the method in which the original image acquired from the point of view on the outside is employed as the reference destination is referred to as extension reference.

Figure 20:
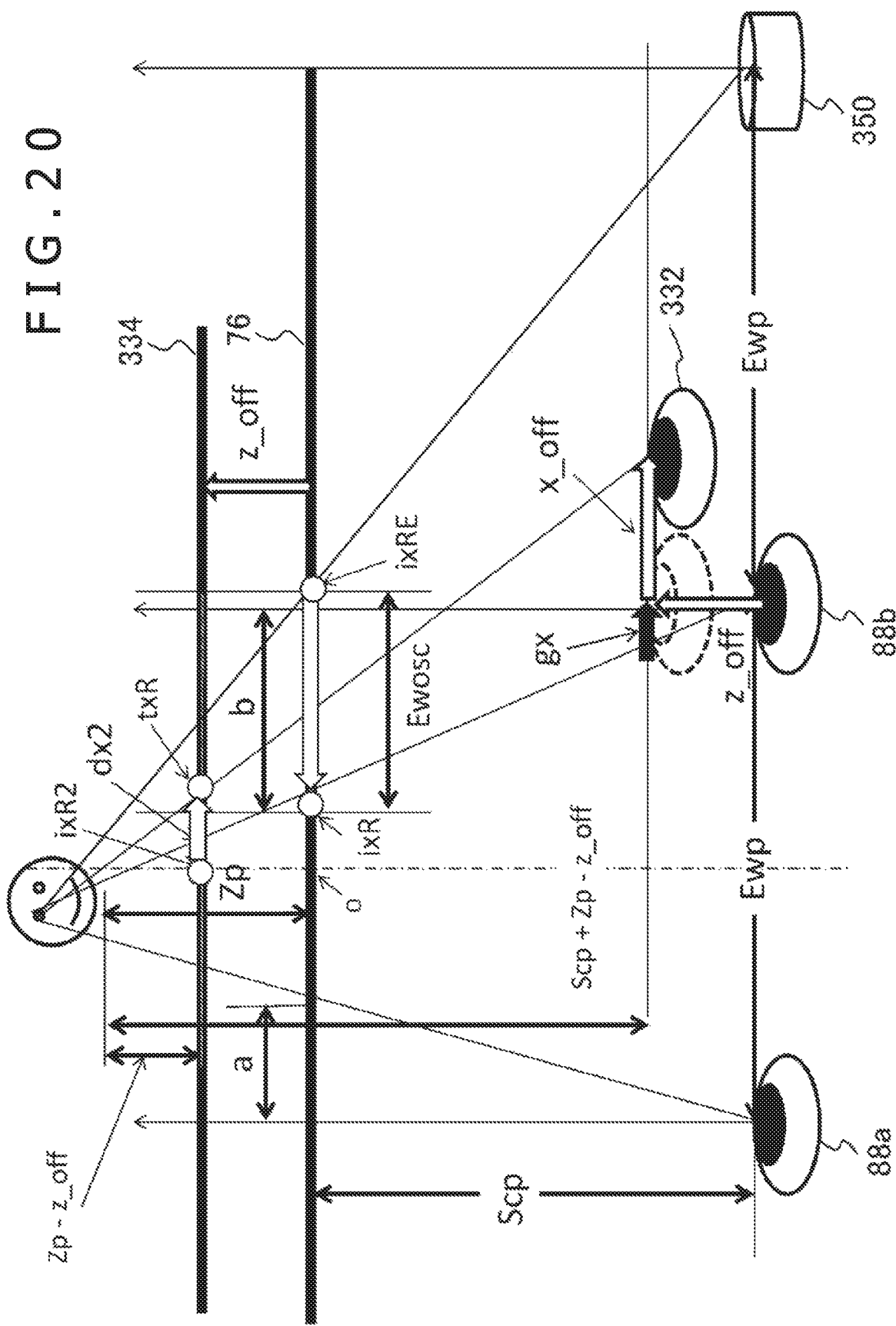
FIG. 20 is a diagram for explaining a calculation method of the image reference vector in extension reference in the present embodiment.

FIG. 20 is a diagram for explaining a calculation method of the image reference vector in the extension reference. In this example, a camera 350 is set on the further right side of the right point 88b of view in the points 88a and 88b of view assumed when right and left original images have been acquired with the intermediary of an interval Ewp and a third original image is acquired. Then, if the need to render a part that exists in a blind area with the point 88b of view and is not represented in the original image for the right eye arises due to movement of the point of view, an image reference vector is set in such a manner that reference to this third original image is carried out. The concept for the calculation is the same as the case of the mutual reference depicted in FIG. 18. However, instead of employing ixL in the original image for the left eye as the start point, a corresponding position ixRE on the third original image is employed as the start point.

Specifically, similarly to FIG. 14, when attention is paid to movement of the point of view of the right eye, the position txR on the map screen 334 corresponding to the position ixR on the image screen 76 due to the movement of the point of view by z_off and x_off is represented as follows, as described above.

$$txR=ixR2+dx2=ixR-gx+dx2$$

The position ixR in the original image for the right eye and the position ixRE in the third original image corresponding to it are in the following relationship.

$$ixR=ixRE-Ewosc$$

Here, Ewosc is given as follows from the interval Ewp of the points of view and the parallax Dp corresponding to the pixel at the position ixRE in the parallax value image generated corresponding to the third original image.

$$Ewosc=Ewp-Dp$$

As a result, when the position ixRE on the third original image is regarded as the start point, txR is obtained as follows.

$$txR=ixRE-Ewosc-gx+dx2$$

Calculation can be similarly carried out also when a fourth original image is acquired by a camera set on the further left side of the left point 88a of view and reference is carried out at the time of rendering of a displayed image for the left eye. Specifically, because the position txL on the map screen 334 corresponding to the position ixL on the image screen 76 is $$txL=ixL2+dx2=ixL+gx+dx2,$$

the position txL becomes as follows when a position ixLE on the fourth original image is regarded as the start point.

$$txL=ixLE+Ewosc+gx+dx2$$

Movement of the position in the Y-axis direction due to movement of the point of view is as follows similarly to the case in which mutual reference is not carried out.

$$ty=iy2+dy2=iy+gy+dy2$$

By the above calculation, the image reference vector can be set regarding each pixel of the image reference vector map.

When the image reference vector is acquired by the calculation described thus far, the relevant data is written to the image reference vector map. At this time, Z-buffer processing is executed by using a Z-value obtained when the image reference vector is calculated and the image reference vector having the Z-value closer to the point of view is written to the map to be saved. By this processing, only one image reference vector is stored regarding one pixel of the map.

In the conventional method in which a dot group or small triangles obtained from images of different points of view are rendered on a view screen, alpha blend rendering for hiding discontinuity of the luminance between pixels due to difference in the specularly-reflected component and transmitted component of light depending on the point of view, and so forth, is carried out. However, this causes a problem that the feeling of resolution of the image is lowered and the load of the processing increases. According to the present embodiment, alpha blending between pixels is limited to only the pixels at the boundary between the respective images as described above. This makes it possible to execute the processing at high speed while keeping the feeling of resolution of the original image.

Furthermore, as described thus far, the image reference vector is obtained by first regarding a respective one of pixels of an original image as the start point and obtaining a displacement vector having the corresponding position on a map screen defined due to movement of the point of view as the end point and causing minute movement of the inverse vector thereof according to the pixel center of the image reference vector map. According to such a procedure, it is conceivable that the end points of displacement vectors whose start points are adjacent pixels in the original image are separate and a pixel about which the image reference vector is not set (hereinafter, often referred to as "hole") is generated therebetween. This is attributed to elongation of part of the original image at the pixel level due to movement of the point of view. Thus, the original image operating unit 254 senses such a hole and supplements a proper image reference vector.

It is conceivable that an image is represented by small triangles and rasterization processing is executed for each triangle in order to prevent the occurrence of such a hole. However, the rasterization of small triangles involves a large load of processing even in present graphics hardware and becomes a bottleneck of the whole in many cases. Hence, in the present embodiment, the rasterization processing of small triangles is omitted and interpolation of the hole is implemented with a small amount of arithmetic operation.

For a similar reason, interpolation is carried out also regarding the Z-buffer. Here, the Z-buffer is necessary in the generation process of the image reference vector map. For example, if plural pixels of an original image correspond to positions in the same pixel of an image reference vector map, an image reference vector proper for this pixel is set by employing the correspondence relationship closer to the point of view by a Z-test. The Z-value is obtained for each pixel of the original image from the parallax value image corresponding to the original image. As described above, the Z-value is used also for calculation of a displacement vector when the image reference vector is obtained.

Figure 21:
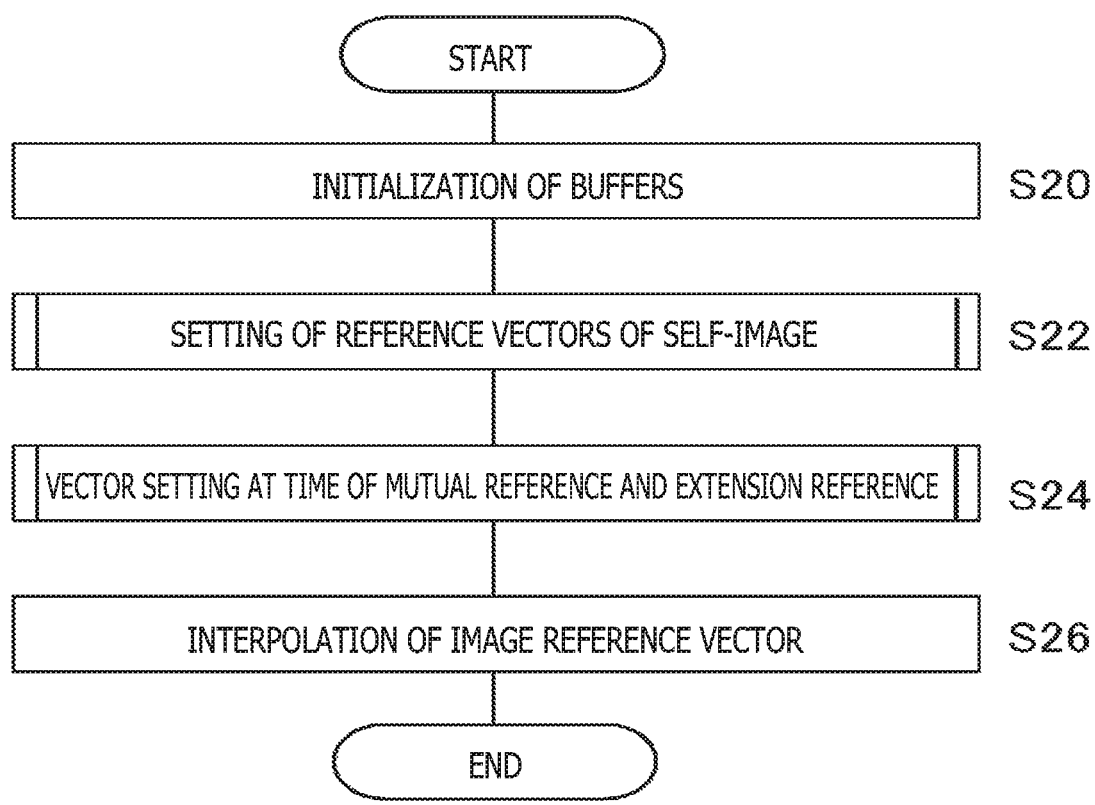
FIG. 21 is a flowchart depicting processing procedure in which an original image operating unit generates an image reference vector map in S12 in FIG. 8.

FIG. 21 is a flowchart depicting processing procedure in which the original image operating unit 254 generates an image reference vector map in S12 in FIG. 8. First, the Z-buffer and the buffer of the image reference vector map are initialized (S20). Next, image reference vectors regarding which the self-image is employed as the reference destination are set (S22). Here, the self-image refers to the original image for the right eye regarding the map for the right eye and refers to the original image for the left eye regarding the map for the left eye. Next, image reference vectors regarding which an original image other than the self-image is the reference destination are set by mutual reference and extension reference (S24).

In the processing of S22 and S24, writing to the Z-buffer and interpolation of the Z-value according to the case are concurrently carried out. In these kinds of processing, interpolation of the image reference vector is not carried out. Next, holes of the image reference vector are interpolated (S26). The processing depicted in this diagram is executed both for the left eye and for the right eye and thereby image reference vector maps are completed for both eyes. An object does not exist at a pixel about which data is not held in the parallax value image. Thus, the image reference vector that indicates such a pixel also does not exist. As a result, in the image reference vector map, a region in which the image reference vector map does not exist may be present outside an image of an object, and so forth.

Figure 22:
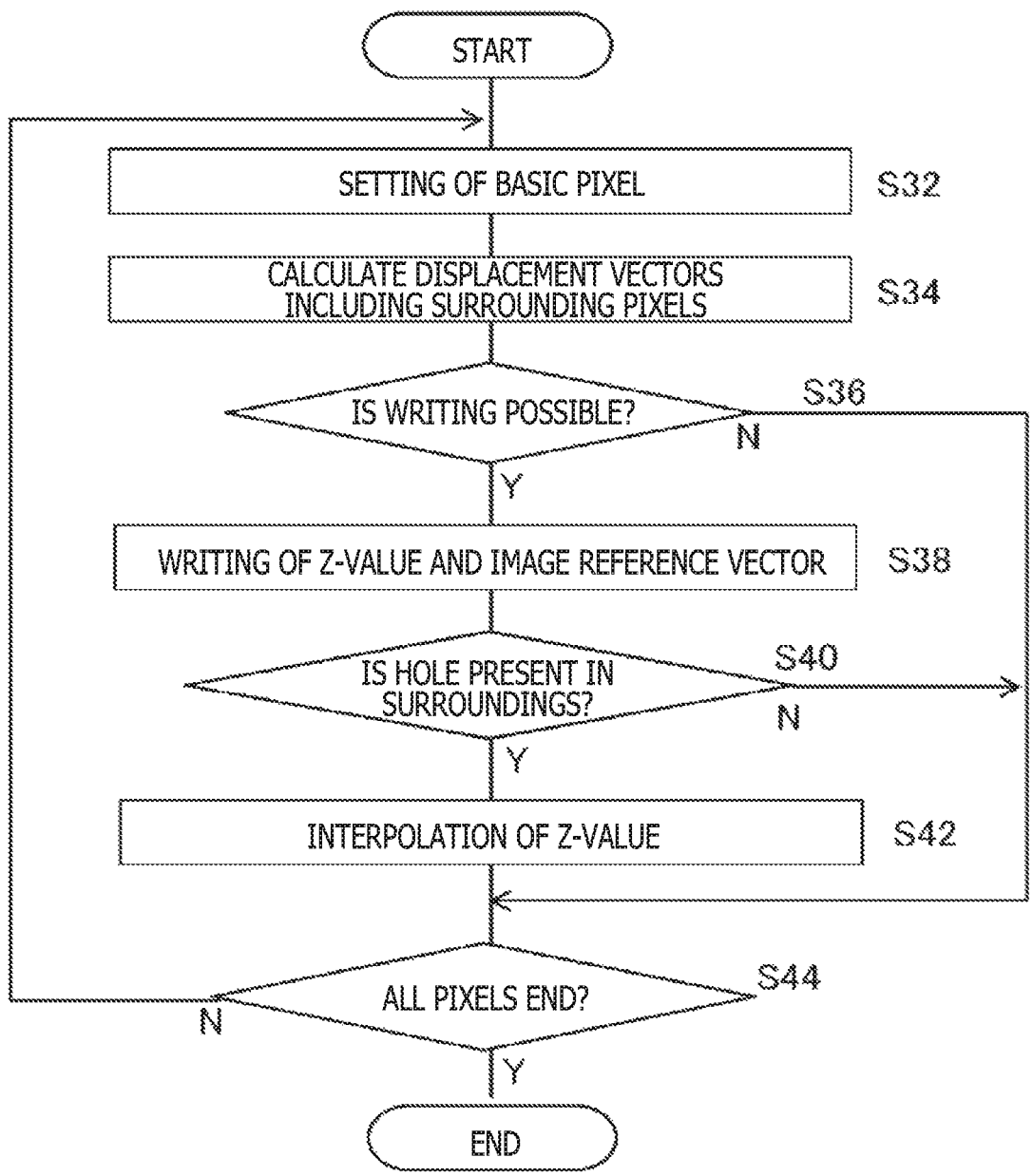
FIG. 22 is a flowchart depicting processing procedure in which the image reference vector regarding which a self-image is employed as the reference destination is set in S22 in FIG. 21.

FIG. 22 is a flowchart depicting processing procedure in which the image reference vector regarding which the self-image is employed as the reference destination is set in S22 in FIG. 21. First, one basic pixel is defined in the original image (S32). Then, displacement vectors are calculated regarding the center positions of this basic pixel and plural reference pixels adjacent to it (S34). The displacement vectors calculated about the adjacent pixels may be temporarily stored to be used when the relevant pixel will become the basic pixel later. Next, data of the pixel including the end point of the displacement vector having the basic pixel as the start point in the Z-buffer formed of the pixel arrangement of the image reference vector map is checked and whether writing of the Z-value and the image reference vector is possible is checked (S36).

It is determined that writing is possible if the Z-value has not been written to the relevant pixel previously or if, although the Z-value has been written, it can be checked that the data to be written is closer to the point of view based on the Z-value (Y of S36). Then, the Z-value of the basic pixel is written to the Z-buffer and the image reference vector obtained from the displacement vector is written to the corresponding pixel of the map (S38). If writing has been carried out to the same pixel previously, it is overwritten. Identification information of the image indicating that the reference destination is the self-image is also written to the Z-buffer to give priority over the mutual reference and the extension reference.

Next, it is checked whether the pixel adjacent to the pixel including the end point of the displacement vector of the basic pixel in the Z-buffer is a hole, and the Z-value is supplemented if the pixel is a hole (Y of S40, S42). At this time, a flag indicating that this Z-value is a supplemented value is also simultaneously written. The interpolation method of the Z-value will be described later. If it is determined in S36 that writing of data is impossible through comparison with the Z-value written previously, writing and check of a hole are not carried out (N of S36). If a hole is absent in the adjacent pixel in S40, interpolation of the Z-value is not carried out of course (N of S40). Until all pixels of the original image become the basic pixel (N of S44), the basic pixel is set in raster order for example (S32) and the processing of S34 to S42 is repeated. The processing is ended if all pixels become the basic pixel (Y of S44).

Figure 23:
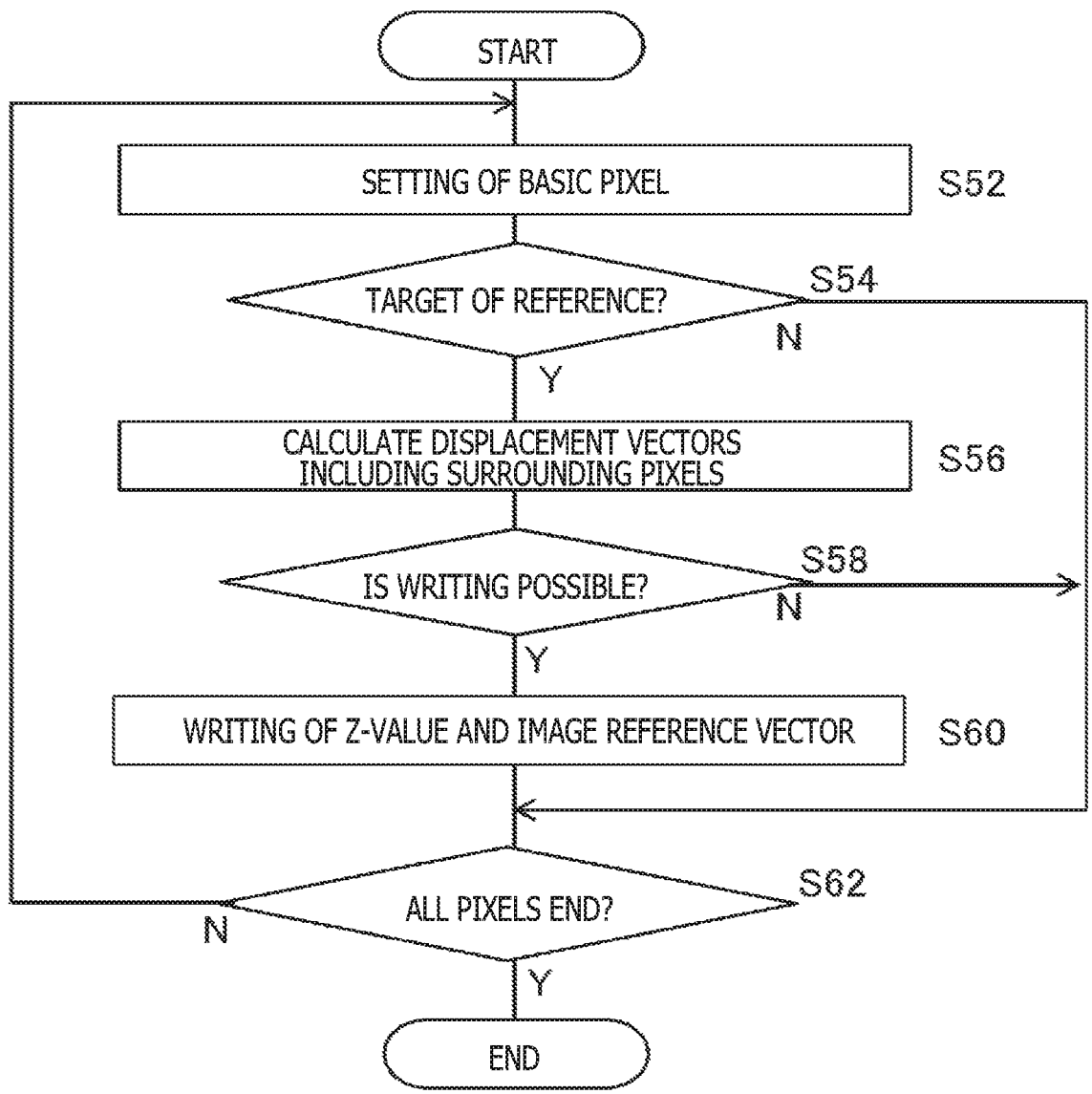
FIG. 23 is a flowchart depicting processing procedure in which the image reference vectors at the time of the mutual reference and the extension reference are set in S24 in FIG. 21.

FIG. 23 is a flowchart depicting processing procedure in which the image reference vectors at the time of the mutual reference and the extension reference are set in S24 in FIG. 21. This processing is basically similar to that in the case in which the self-image is employed as the reference destination depicted in FIG. 22. However, a main difference exists in that calculation and writing of the displacement vector are limited and interpolation of the Z-value is not carried out. This is because the mutual reference and the extension reference are auxiliary processing for compensating for the pixel that cannot be rendered with the self-image and a program does not become obvious in many cases even when they are simplified for increase in the speed. Therefore, if there is an allowance in the processing time, interpolation processing of the Z-value may be executed similarly to rendering of the self-image. First, one basic pixel is defined in the original image (S52). The original image here is the original image for the left eye or an image acquired from a point of view on the further right side of the right eye for the image reference vector map for the right eye. For the image reference vector map for the left eye, the original image is the original image for the right eye or an image acquired from a point of view on the further left side of the left eye.

Subsequently, if the mutual reference flag has been generated, it is checked whether or not this basic pixel can become the reference destination based on the flag (S54). If the basic pixel cannot become the reference destination, processing relating to the image reference vector regarding which this basic pixel is employed as the reference destination is not executed (N of S54). If the basic pixel can become the reference destination (Y of S54), displacement vectors are calculated regarding the center positions of the basic pixel and plural reference pixels adjacent to it (S56). Then, data of the pixel including the end point of the displacement vector having the basic pixel as the start point in the Z-buffer is checked and whether writing of the Z-value and the image reference vector is possible is checked (S58).

In this case, writing is regarded as impossible when the Z-value written previously is that of the self-image. Furthermore, writing is regarded as possible if the written Z-value is one set by interpolation. Due to this, if valid reference to the self-image is possible, it is given priority. If only the Z-value has been written by interpolation, priority is given to the mutual reference and the extension reference. If writing is possible (Y of S58), the Z-value of the basic pixel is written to the Z-buffer and the image reference vector obtained from the displacement vector is written to the corresponding pixel of the map (S60).

At this time, the identification information of the image is also written to the Z-buffer and the image reference vector map so that which image the original image to which reference is carried out is instead of the self-image can be understood. If it is determined that writing is impossible in S58, writing is not carried out (N of S58). Until all pixels of the original image become the basic pixel (N of S62), the basic pixel is set in raster order for example (S52) and the processing of S54 to S60 is repeated. The processing is ended if all pixels become the basic pixel (Y of S62).

Next, interpolation processing of the Z-value will be described. The interpolation processing of the Z-value and the image reference vector is based on the premise that the size of the hole is at most one pixel. In the present embodiment, it is assumed that the planes of the original image and the image reference vector map are parallel and the resolutions of both are equivalent. Therefore, no inconvenience is caused even when the above-described premise is employed. In the interpolation of the Z-value, first the hole for which the interpolation should be carried out is identified as illustrated by S40 in FIG. 22. Qualitatively, pixels adjacent in the original image are elongated on the image reference vector map and the interval widens, so that the state in which a gap of one pixel is generated when the pixel of the map is regarded as the unit is detected.

Figure 24:
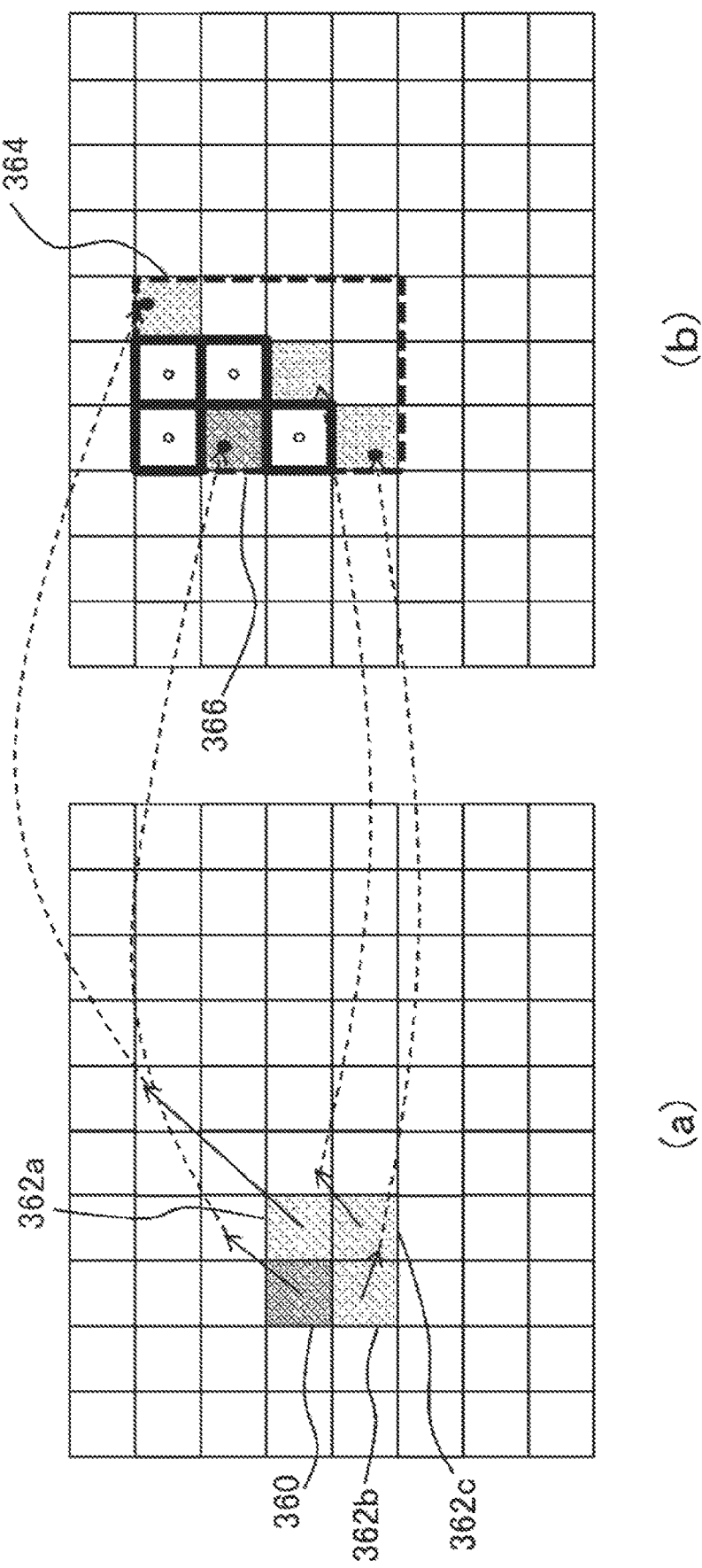
FIG. 24 is a diagram schematically depicting a relationship example between pixel centers of an original image and positions on an image reference vector map corresponding to them in the present embodiment.

FIG. 24 schematically depicts a relationship example between pixel centers of an original image and positions on an image reference vector map corresponding to them. Lattices depicted in this diagram represent pixel grid in the original image in (a) and represent pixel grid of the image reference vector map in (b). When displacement vectors are obtained by employing the centers of four pixels that are depicted in (a) and hatched as the start points, the displacement vectors are as represented by solid arrows for example. For pixels including the tips of these arrows, image reference vectors in the reverse direction of the arrows are set.

In this example, as represented by the correspondence relationship represented by dashed arrows, four pixels that are depicted in (b) and hatched include the end points of the displacement vectors and therefore the image reference vectors can be set without the need for interpolation. In such a situation, the pixel illustrated by dark hatching is set as a basic pixel 360. Moreover, pixels on the right side, lower side, and lower right side of the basic pixel 360 are regarded as reference pixels 362a, 362b, and 362c. Then, positions on the image reference vector map indicated by the displacement vectors having the pixel centers of them as the start points are identified.

A region 364 of the minimum pixel matrix including the positions of three points corresponding to the basic pixel 360 and the reference pixels 362a and 362b adjacent on the right and lower sides among them is decided. In this region 364, pixels that do not include the positions corresponding to the basic pixel 360 and the reference pixels 362a, 362b, and 362c and are adjacent to the basic pixel 360 are decided as holes for which the Z-value should be interpolated. In the case of FIG. 24, pixels surrounded by heavy lines are extracted. Such pixels have a possibility that an accurate value is written based on another basic pixel or an interpolation value cannot be written based on a Z-test, and therefore are candidates for pixels for which the interpolation should be carried out strictly.

Next, as depicted in S42 in FIG. 22, the Z-value is supplemented for the decided pixels. Most simply, it is conceivable that the interpolation is carried out by the average of the Z-value of adjacent pixels, or the like. However, a situation in which an object that originally exists behind is expressed in a visible manner possibly occurs due to the averaging. Such a risk becomes high at a place at which sudden change is caused in the Z-value, such as the contour part of an object. Therefore, the supplemented Z-value is adjusted according to the magnitude of change in the Z-value from surrounding pixels from which the Z-value has been obtained. Qualitatively, the Z-value is adjusted in such a manner that the distance from the point of view is larger when the difference from the surrounding pixel is larger.

When FIG. 24 is taken as an example, the Z-values at the basic pixel 360 and the reference pixels 362a, 362b, and 362c located on the right, lower, and lower right sides thereof are calculated at the time of calculation of the displacement vectors based on the parallax value image. Here, the Z-value of the basic pixel 360 is defined as $Zsc0$ and the Z-values of the reference pixels 362a, 362b, and 362c are defined as $Zsc1$, $Zsc2$, and $Zsc3$, respectively.

In the image reference vector map, $Zsc0$ obtained regarding the basic pixel 360 is given as a Z-value to a pixel 366 including the position corresponding to the basic pixel 360. Z-values obtained by adjusting $Zsc0$ in the above-described manner are given to the pixels of the heavy-line frames that are adjacent to this pixel 366 and are regarded as the pixels for which the Z-value should be interpolated. Zsafe that is the Z-value after the adjustment is calculated as follows for example.

$$Zsafe = Zsc0 + |Zsc1 - Zsc0| + |Zsc2 - Zsc0| + |Zsc3 - Zsc0|$$

or $$Zsafe = Zsc0 + \max(|Zsc1 - Zsc0| + |Zsc3 - Zsc0|, |Zsc2 - Zsc0| + |Zsc3 - Zsc0|)$$

The coordinate axis is defined in such a manner that the Z-value increases according to the distance from the point of view. By such calculation, for example even if the Z-value of the surrounding pixel is extremely large compared with the Z-value of the basic pixel ($Zsc0$), the Z-value used for hole filling can be made to match this surrounding pixel and the situation in which an object on the back side is visible on the front side unnaturally is eliminated. Writing of the Z-value to the Z-buffer is carried out through the above-described Z-test actually. By adjusting Zsafe in such a direction as to become larger from $Zsc0$, even when an incorrect pixel is employed as the writing destination due to a calculation error or the like, overwriting of the Z-value originally given to this pixel can also be prevented.

Figure 25:
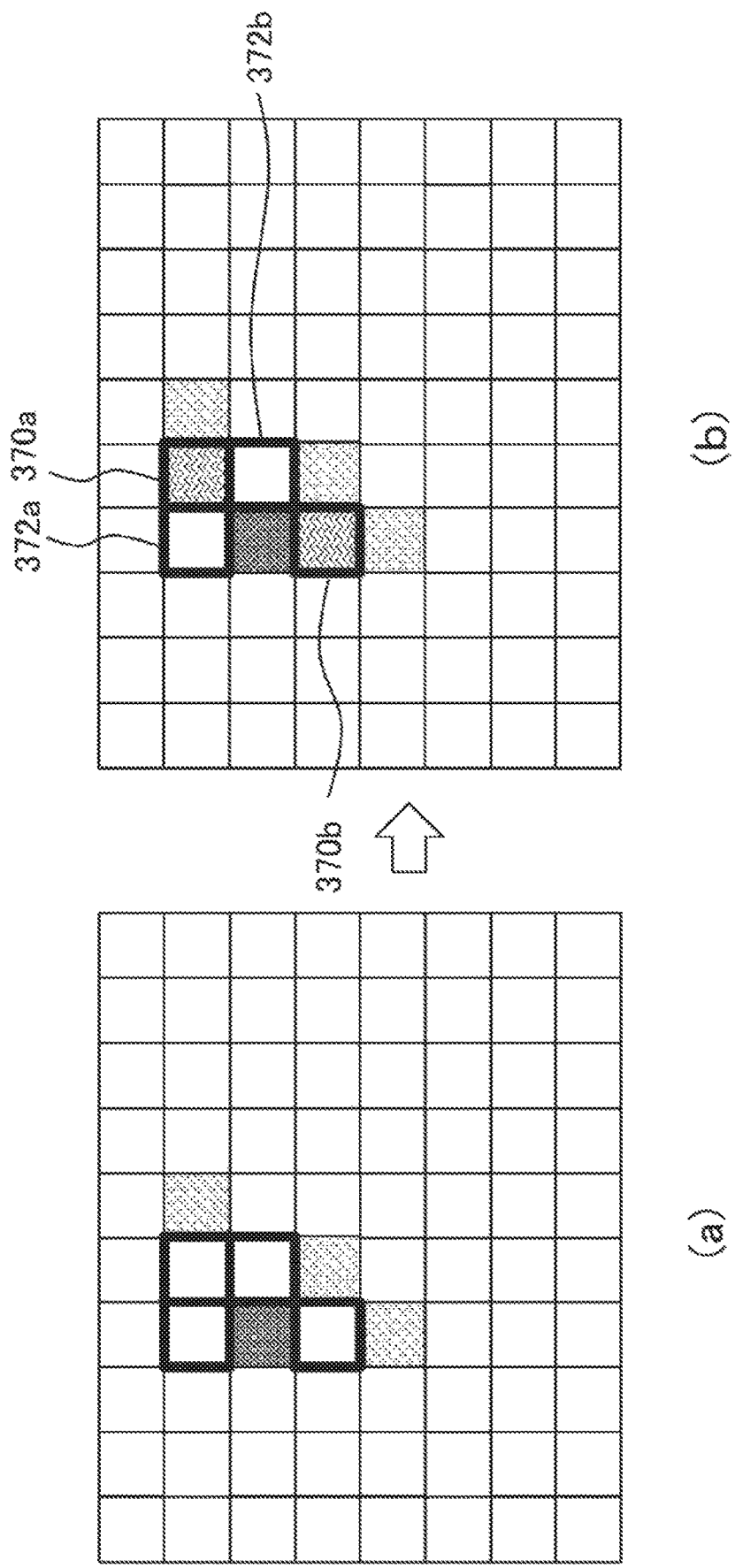
FIG. 25 is a diagram for explaining the relationship between the pixel that has become the interpolation target of the Z-value and the pixel with which the mutual reference or the extension reference is carried out in the present embodiment.

As described with reference to FIG. 21, after the hole of the Z-buffer is covered at the stage of setting of the image reference vector regarding which the self-image is employed as the reference destination, the image reference vectors with which the mutual reference and the extension reference are carried out are set. FIG. 25 is a diagram for explaining the relationship between the pixel that has become the interpolation target of the Z-value and the pixel with which the mutual reference or the extension reference is carried out. In this diagram, both (a) and (b) represent the pixel arrangement of an image reference vector map and (a) corresponds to the diagram depicted in (b) of FIG. 24. That is, the original Z-values calculated from the parallax value have been written to the hatched pixels and the interpolated Z-values have been written to the pixels of the heavy-line frames.

However, image reference vectors have not yet been set for these pixels. If the processing of FIG. 23 is started from this state, there is a possibility that an image reference vector with which the mutual reference or the extension reference is carried out is set regarding the pixel given the Z-value by interpolation. Hatched pixels 370a and 370b in the pixels of the heavy-line frames in (b) of FIG. 25 are pixels to which data has been written in this manner. By the above processing, image reference vectors are decided as much as possible including the case of the mutual reference and the extension reference and thereafter interpolation of the image reference vector is carried out about remaining pixels 372a and 372b.

Figure 26:
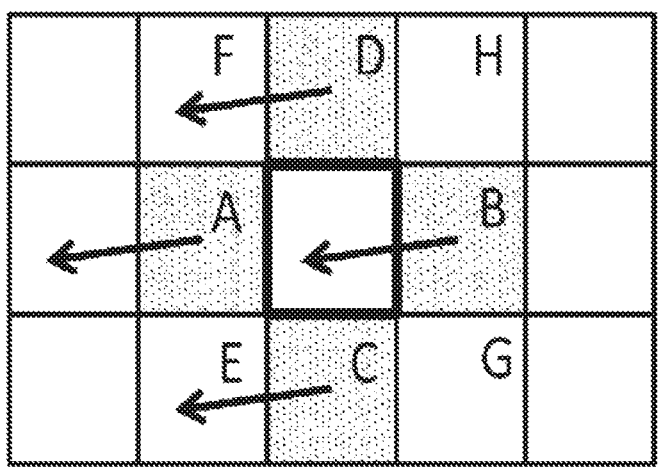
FIG. 26 is a diagram for explaining an interpolation method of the image reference vector in the present embodiment.

The supplemented image reference vector is basically set to values close to the image reference vector of a surrounding pixel. FIG. 26 is a diagram for explaining an interpolation method of the image reference vector. Suppose that a hole of the image reference vector exits in a pixel surrounded by a heavy-line frame in a pixel arrangement depicted in this diagram. In this case, most simply, it is conceivable that the interpolation is carried out by the average of image reference vectors set for surrounding pixels. However, an image reference vector obtained from a displacement vector based on the movement of the point of view is employed as the image reference vector used for the interpolation and further using a vector obtained by the interpolation for the interpolation is avoided.

For example if image reference vectors have been given to the upper, lower, left, and right pixels of the pixel of the heavy-line frame as the target (pixels D, C, D, A, B) as illustrated by arrows, the average vector of these four image reference vectors is employed as the image reference vector of the target. Alternatively, the averaging may be carried out with change in the weight according to the position relative to the pixel of the target. For example, the upper, lower, left, and right pixels (pixels D, C, D, A, B) in the surrounding eight pixels are weighted by a factor of two and the image reference vectors of the eight pixels of A to H are subjected to weighted averaging.

Alternatively, the pixel and the weight used for the interpolation may be decided according to the directionality of the image reference vector. For example, in the example depicted in the diagram, the image reference vectors of the surrounding pixels are all close to the horizontal state. From this, it is estimated that the relevant part results from elongation in the horizontal direction from the original image and the hole is generated due to it. Therefore, in this case, interpolation with high accuracy according to the situation can be implemented by carrying out linear interpolation with use of the left and right pixels A and B in the pixels around the target or carrying out averaging in such a manner that a larger weight is applied to these pixels.

For example, when the average vector of the image reference vectors of four pixels on the upper, lower, left, and right sides of the pixel of the target is obtained and an angle θ between it and the horizontal direction of the image (X-axis direction) is −30°<θ<30° or 150°<θ<210°, the image reference vectors of the left and right pixels A and B are averaged and the average vector is employed as the image reference vector of the target. When the angle θ is 60°<θ<120° or 240°<θ<300°, the image reference vectors of the upper and lower pixels D and C are averaged and the average vector is employed as the image reference vector of the target. When the angle θ is other than them, the image reference vectors of the upper, lower, left, and right pixels are averaged and the average vector is employed as the image reference vector of the target.

Combinations of forms such as the above-described threshold of the angle and whether the pixels used for interpolation are selected or the weight is changed depending on it are variously conceivable. The head of the user makes horizontal motion more frequently than vertical motion. As a result, the displacement of pixels will also be in the horizontal direction frequently. Therefore, without carrying out determination of the angle as described above, the image reference vectors of the right and left pixels may be always used for interpolation to increase the speed of the processing while keeping the accuracy.

In the present embodiment, as above, even when local elongation of an image due to movement of the point of view occurs, selection of a calculation expression based on the directionality is enabled by employing the vector as the interpolation target. Furthermore, operation to the actual color value is limited to the stage of finally rendering a displayed image and therefore adverse effects of this interpolation processing on the quality of the displayed image are suppressed. For example, if the image reference vector is not introduced and a color image is directly interpolated, such adjustment based on the directionality cannot be carried out.

For example, even with a hole caused as the result of elongation in one direction, information thereon is absent in the color image, which results in the same interpolation calculation irrespective of the direction of the elongation. As a result, unnecessary colors are mixed and possibly the quality of the displayed image is also adversely affected. Because of the characteristics that the image reference vector represents movement of pixels due to motion of the point of view, large change does not occur in units of pixel as depicted in FIG. 26. As a result, even when pixels around the target are used for interpolation irrespective of the directionality, it is hard to cause a large error and the deterioration of the image quality due to color mixing can also be prevented.

The above-described interpolation method is based on the premise that so-called valid image reference vectors derived from displacement vector calculation have been given to surrounding pixels. On the other hand, if two or more pixels are continuously holes, an image reference vector that is not an interpolated vector may be sought around them and this vector may be used for interpolation as it is. For example, in FIG. 26, a rule of priority order of the seeking is defined for the eight pixels around the target. As one example, order of pixels A, B, C, D, E, F, G, and H is conceivable. Furthermore, seeking is carried out in that order and the image reference vector detected first as a vector that is not an interpolated vector is employed as the vector of the target. In either interpolation method, the color value is not settled at the stage of generation of the image reference vector and therefore finally the color value can be decided with positional accuracy of sub-pixel.

Figure 27:
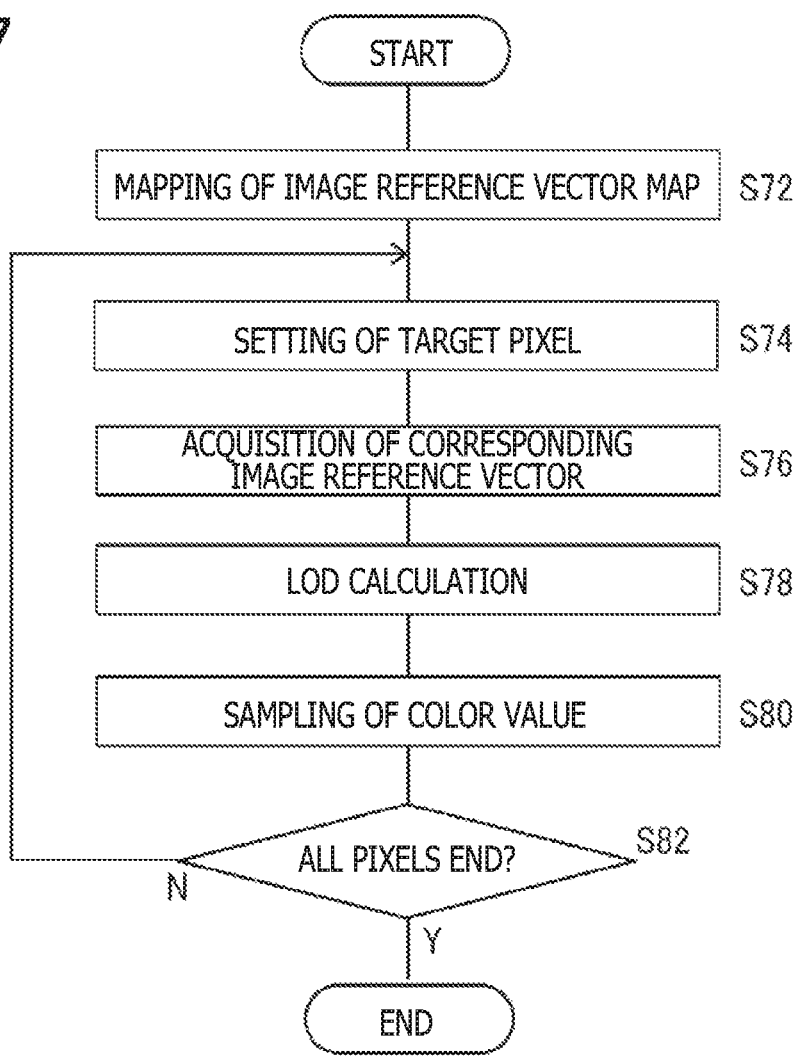
FIG. 27 is a flowchart depicting procedure in which a displayed image generating unit generates a displayed image by using an image reference vector map in S14 in FIG. 8.

Next, a method for generating the final displayed image by using an image reference vector map will be described. FIG. 27 is a flowchart depicting procedure in which the displayed image generating unit 268 generates a displayed image by using an image reference vector map in S14 in FIG. 8. First, the displayed image generating unit 268 acquires the position and posture of a view screen according to the position of the point of view and the direction of the line of sight at the timing from the view screen control unit 252 and carries out mapping of an image reference vector map on it (S72). Thereafter, a target pixel that should be rendered is set (S74).

Then, the sampling point of the image reference vector map corresponding to the target pixel is identified and the image reference vector at the position thereof is acquired (S76). Basically, the image reference vector is obtained by applying an interpolation filter to image reference vectors set for a predetermined number of pixels including the sampling point, e.g. four pixels on two rows and two columns. Next, if a mipmap is employed as the original image, the LOD that determines the mipmap level of the reference destination is calculated (S78). As this time, in addition to the LOD acquired when the image reference vector map is subjected to the mapping on the view screen, scaling carried out at the time of conversion from the original image to the image reference vector map is also taken into consideration.

Then, the color value at the position indicated by the image reference vector acquired in S76 in the original image is acquired and the target pixel is rendered (S80). In the case of the mipmap, the color value is acquired from the original image at the level corresponding to the LOD calculated in S78. Until all pixels of the displayed image are rendered (N of S82), the processing of S74 to S80 is repeated. When all pixels are rendered, the processing is ended (Y of S82). By executing the processing depicted in this diagram for each of the right and left, displayed images for the left eye and for the right eye can be generated.

Figure 28:
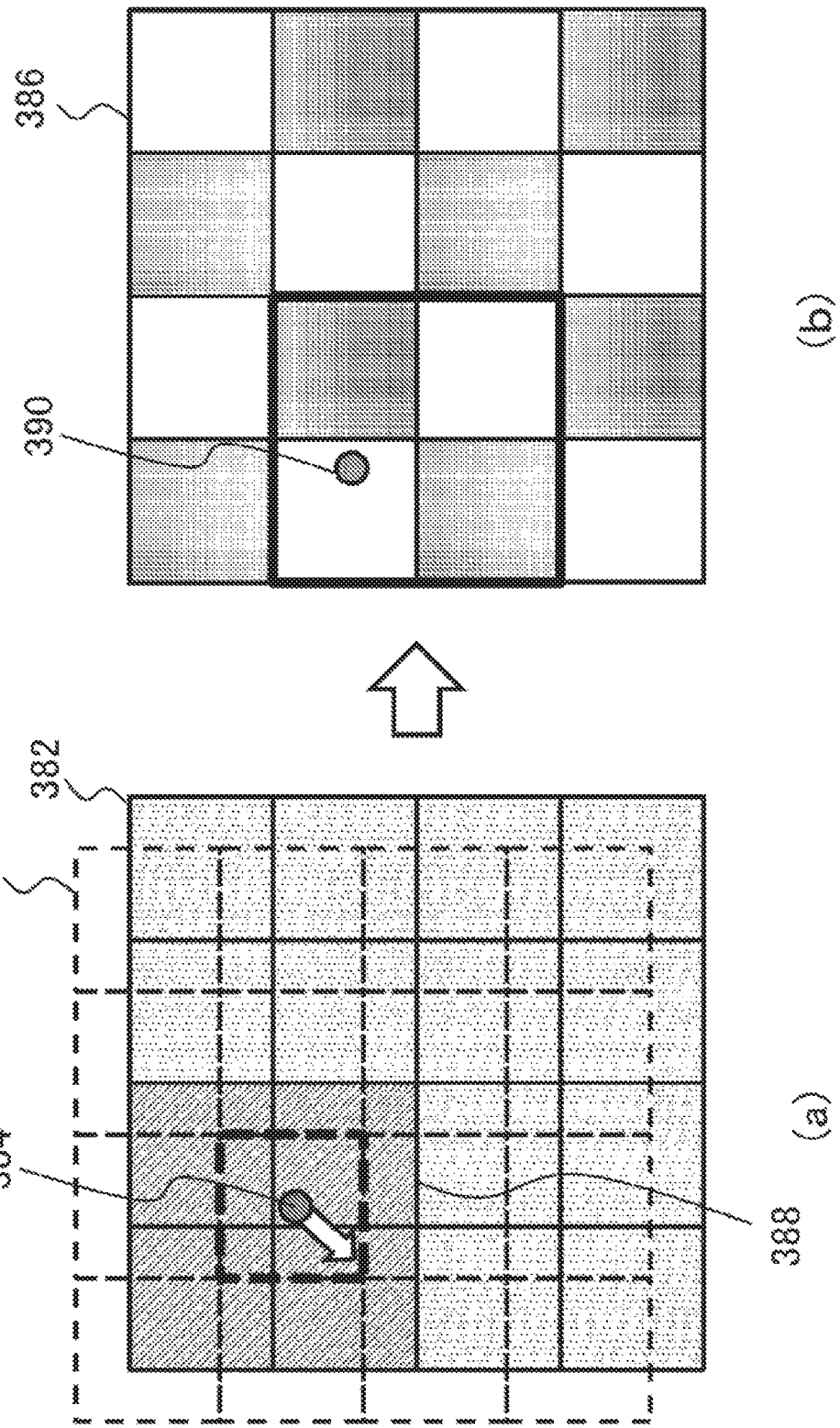
FIG. 28 is a diagram for explaining the relationship among displayed image, image reference vector map, and original image in the present embodiment.

FIG. 28 is a diagram for explaining the relationship among displayed image, image reference vector map, and original image. A pixel arrangement illustrated by dotted lines and a hatched pixel arrangement in (a) are part of a displayed image 380 and an image reference vector map 382 and are illustrated in an overlapped manner in such a manner that the correspondence of the position is illustrated. Possibly the shape of the image reference vector map 382 is distorted due to perspective transformation. However, each pixel is represented by a square in this diagram for easy understanding. A pixel arrangement in (b) is part of an original image 386.

When a pixel illustrated by a heavy-line frame is deemed as the rendering target pixel in the displayed image 380, a position in a pixel 388 on the image reference vector map 382 corresponding to the position of the center of the rendering target pixel is employed as a sampling point 384. An image reference vector illustrated by a white arrow at this sampling point 384 is decided based on the image reference vectors of four pixels on two rows and two columns that are illustrated by dark hatching and are composed of the pixel 388 including the sampling point 384 and three pixels that are adjacent to it and are closer to the sampling point 384 for example. Basically, the image reference vector can be decided by carrying out bilinear interpolation of the image reference vectors of these four pixels.

However, the interpolation is not carried out as an exception when the four image reference vectors do not have the same original image as the reference destination and when the Z-values of the four pixels are greatly different and it is suspected that the four pixels straddle a step of an object, besides, when an image reference vector unsuitable for the interpolation is mixed. When the image reference vector of the sampling point 384 is obtained in this manner, the position indicated by this image reference vector in the original image 386 is employed as a sampling point 390 of the color value. Then, the color value of the rendering target pixel of the displayed image is decided by interpolating four pixels on two rows and two columns including the sampling point 390 of the color value. Actually, the interpolation at the time is carried out by trilinear filtering in which interpolation is carried out by using mipmaps at two levels according to the reduction ratio.

Figure 29:
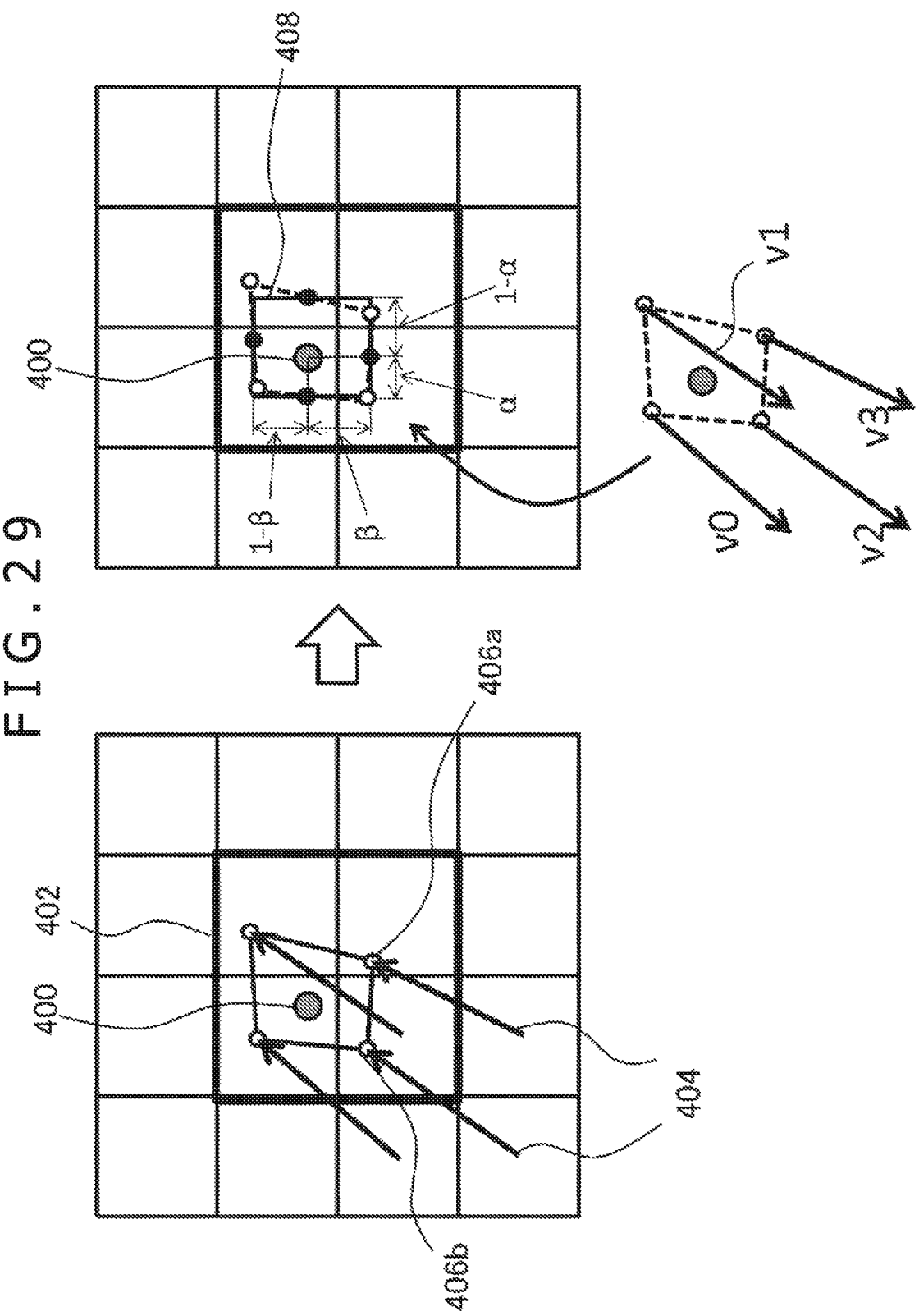
FIG. 29 is a diagram for explaining bilinear interpolation of the image reference vector in the present embodiment.

FIG. 29 is a diagram for explaining bilinear interpolation of the image reference vector. This diagram depicts a pixel arrangement including a sampling point 400 in an image reference vector map. Four pixels illustrated by a heavy-line frame in it are used to obtain the image reference vector at the sampling point 400. The image reference vector is the vector that indicates the position on the original image to which reference should be carried out at a pixel center of the map. However, originally the image reference vector is a vector obtained by moving a displacement vector obtained by regarding a pixel center of the original image as the start point in parallel in such a manner that the coordinates of the end point (tx, ty) become a pixel center of the image reference vector map (tx', ty') and reversing the direction of the resulting vector as depicted in FIG. 6.

Therefore, by inverse processing thereof, the original displacement vector is easily obtained from the image reference vector held by each pixel of the map. Specifically, it suffices to move the image reference vector in parallel in such a manner that the end point of the image reference vector becomes a pixel center of the original image and reverse the direction. Hence, in one form of the present embodiment, the original displacement vectors (for example displacement vectors 404) are obtained from the image reference vectors held by four pixels around the sampling point 400 and a coefficient of bilinear interpolation is decided based on the positional relationship between the positions of end points of the displacement vectors (for example positions 406a and 406b) and the sampling point 400. It should be noted that it is when the image reference vector is directly obtained from the original displacement vector that the relationship described here holds and, in the case of the image reference vector generated by interpolation processing of a hole for example, the original displacement vector is not correctly obtained depending on the interpolation method.

That is, if the displacement vectors 404 or the like have been obtained as the result of calculating the amount of movement of pixels according to movement of the point of view as described above, inverse displacement vectors obtained by reversing the direction thereof are used for interpolation. On the lower right side of this diagram, these inverse displacement vectors are illustrated as v0, v1, v2, and v3. Furthermore, when the coefficient is decided, the calculation is simplified by using a rectangle 408 that approximates the end points of the displacement vectors represented by white circles on the right side of this diagram. Specifically, the midpoints of the line segments coupling the end points of the displacement vectors are each obtained between the pixels lined up in the horizontal direction in the four pixels and between the pixels lined up in the vertical direction. They are represented by black circles in the diagram. Then, the rectangle 408 that passes through these midpoints and has sides in the horizontal direction and the vertical direction of the image is defined.

The ratio of internal division of the sides of the two directions of the rectangle 408 by the coordinate component to which the sampling point 400 corresponds is employed as the coefficient of the bilinear interpolation. In the example depicted in the diagram, the side of the horizontal direction is internally divided into $\alpha:1-\alpha$ and the side of the vertical direction is divided into $\beta:1-\beta$. By using this, an image reference vector Vtgt to be obtained is obtained as follows when the inverse displacement vectors of the lower left, upper left, lower right, and upper right pixels in the four pixels are defined as v0, v1, v2, and v3.

$$Vtgt=v0*(1-\alpha)*\beta+v1*\alpha*\beta+v2*(1-\alpha)*(1-\beta)+v3*\alpha*(1-\beta)$$

If vectors regarding which a different original image is employed as the reference destination due to the mutual reference or the like are mixed in the image reference vectors set for the four pixels, the interpolation of the image reference vector is not carried out as exceptional processing. Instead, color values are acquired from the original image employed as the reference destination by these image reference vectors and interpolation processing is executed for the color values. Also at this time, the interpolation according to the distance from the sampling point 400 is carried out by using the internal division ratios $\alpha$, $\beta$, and so forth of the rectangle 408 depicted in the diagram. In the case of employing a mipmap as the original image, interpolation in which the reduction ratio is also taken into consideration is carried out based on a trilinear filter. This is the same also in other cases in which the interpolation of the image reference vector is not proper, such as the case in which there is a large difference among the Z-values of the four pixels.

As described above, in a region in which an object does not exist, the image reference vector also does not exist. Also when such a pixel is mixed in the four pixels, a color value may be directly acquired and interpolation may be carried out by using the image reference vectors set for the remaining pixels. At this time, the calculation is carried out in such a manner that the color value is set to 0 regarding the pixel whose image reference vector does not exist. In order to discriminate that the image reference vector does not exist as above from that the component of the image reference vector is 0, a storage region of a flag indicating non-existence is set in data of the image reference vector.

In the bilinear interpolation depicted in FIG. 29, the original displacement vectors are once obtained from the image reference vectors of the surroundings of the sampling point 400 and the image reference vector of the sampling point 400 is obtained based on the positional relationship between the four end points thereof and the sampling point 400. This can implement high-accuracy interpolation using the relationship between the image reference vector and the displacement vectors. On the other hand, without obtaining the end points of the displacement vectors, general bilinear interpolation based on the positional relationship between the sampling point 400 and the centers of surrounding pixels may be employed. For example, if a large difference does not exist in the Z-value among these surrounding pixels or if an image reference vector that has been obtained by interpolation processing of the hole of the image reference vector as described above and with which the original displacement vector cannot be accurately restored is included as the interpolation target, it is possible to shorten the processing time and prevent the lowering of the accuracy caused due to an error in the restoration processing by carrying out the general bilinear interpolation.

Figure 30:
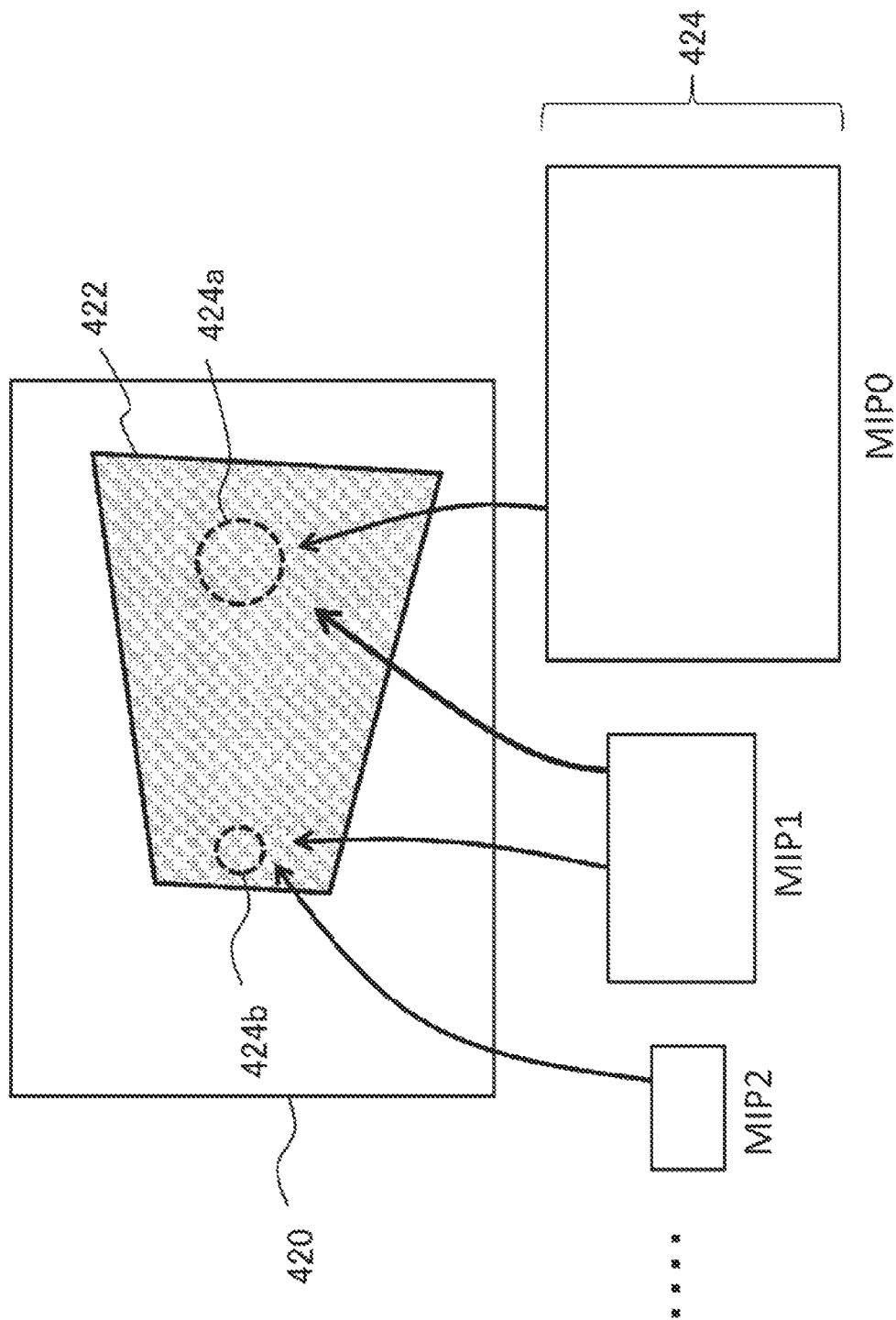
FIG. 30 is a diagram for explaining the relationship with a displayed image when mipmap texture is employed as an original image in the present embodiment.

FIG. 30 is a diagram for explaining the relationship with a displayed image when mipmap texture is employed as an original image. In the case of using the head-mounted display 100, the view screen moves in association with movement of the user and therefore arbitrary perspective transformation is applied to the image plane of the image reference vector map. As a result, the reduction ratio from the original image also changes depending on the place. In the example depicted in the diagram, in a displayed image 420 in which an image plane (map screen) 422 is mapped, the reduction ratio greatly differs between a region 424a and a region 424b.

If the original image is prepared with one resolution, aliasing occurs in the displayed image in 424b with a high reduction ratio, leading to an intense flicker due to movement of the point of view. For this reason, data of the original image is prepared as mipmap texture in which the resolution is changed in a stepwise manner. For example, original image data with a low mipmap level is used for the region 424a with a low reduction ratio and original image data with a high mipmap level is used for 424b with a high reduction ratio, and the pixel values are decided by a trilinear filter.

At this time, it is necessary to calculate the LOD that determines which level is to be employed as the level of the mipmap used. In the present embodiment, substantially two stages of conversion, conversion from the image screen to the map screen and conversion from the map screen to the view screen, are carried out and therefore both need to be considered also in the calculation of the LOD. That is, the LOD is calculated as the sum of LOD1 that represents the magnitude of the reduction ratio at the first stage and LOD2 that represents the magnitude of the reduction ratio at the second stage.

FIG. 31 is a diagram for explaining a method for calculating LOD1 at the time of conversion from an image screen to a map screen. In this conversion, the reduction ratio changes depending on the movement direction and the amount of movement of the point of view in a three-dimensional space. However, with respect to movement in the X-axis and Y-axis directions, the change in the reduction ratio is various depending on the position in the image plane. Thus, it is conceivable that, when this change is used for selection of the mipmap, the image looks unnatural in contrast. Therefore, only movement of the point of view in the Z-axis direction is considered and the overall reduction ratio of the image arising from it is reflected in LOD1.

First, the interval of pixels 440 at which an object exists and that are assumed at a position at which the distance from the image screen 76 is Zp is defined as 1. In this diagram, the size of rectangles that represent the pixels 440 is expressed in an exaggerated manner for explanation. Width OrgD of the image of these pixels on the original image is obtained as follows based on triangle similarity.

$$OrgD:Scp=1:Scp+Zp$$

Thus $$OrgD=Scp/(Scp+Zp)$$

Next, if the point of view moves by $-z\_off$ in the Z-axis direction, width NewD of the image of these pixels on the map screen 334 is obtained as follows based on triangle similarity.

$$NewD:Scp=1:Scp+Zp-z\_off$$

Thus $$NewD=Scp/(Scp+Zp-z\_off)$$

That is, LOD1 in this conversion processing is obtained as follows.

$$LOD1 = \ln2(OrgD/NewD)$$
$$= \ln2((Scp + Zp - z\_off)/(Scp + Zp))$$

Here, Zp is acquired from the Z-buffer generated when the image reference vector map is generated. LOD2 based on the conversion at the second stage is obtained similarly to general texture mapping. Specifically, the reduction ratio obtained by perspective transformation when the image reference vector map is subjected to mapping onto the view screen is calculated as the LOD. For this calculation, functions of general hardware that carries out rendering including texture mapping can be used.

After the LOD at each stage is acquired through the above, the sum thereof LOD1+LOD2 is employed as the final LOD and the mipmap level of the original image of the reference destination is decided, and the color value of the pixels is acquired by trilinear filter processing. The image reference vector map itself may be employed as the mipmap data. However, because the difference in the image reference vector between the pixels is small, sufficient functions are exerted with the method in which the vectors of four pixels around the sampling point are subjected to bilinear interpolation as described above.

Figure 32:
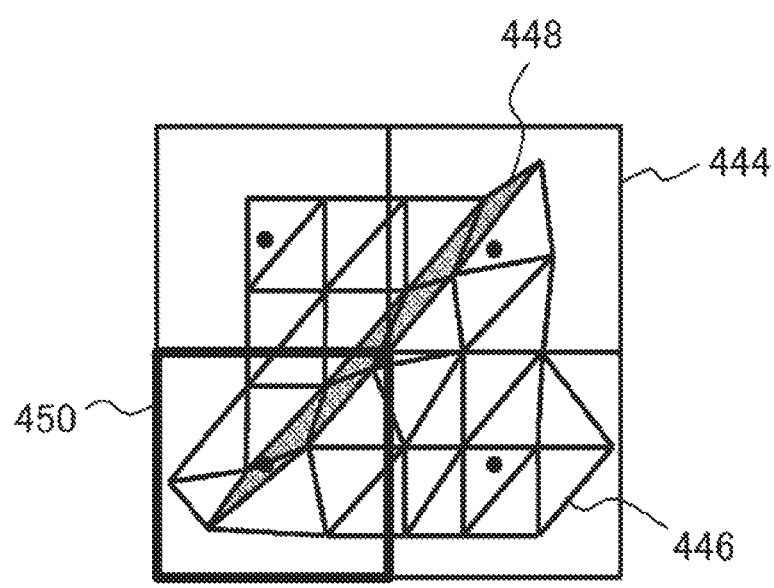
FIG. 32 is a diagram for explaining a problem in mipmapping when the method of the present embodiment is not used and mapping of an image of an object is directly carried out in a unit obtained by dividing the image into small triangles.

FIG. 32 is a diagram for explaining a problem in mip-mapping when the method of the present embodiment is not used and mapping of an image of an object is directly carried out in a unit obtained by dividing the image into small triangles. In this example, onto four pixels (for example pixel 444) on two rows and two columns represented by squares, a large number of small triangles (for example triangle 446) smaller than the pixels are mapped. According to a general method, the LOD is calculated in units of small triangle at the stage of the mapping, whereas the LOD reflected in selection of the mipmap level is in units of pixel.

In the example depicted in the diagram, due to the surface shape of an object in which a step is generated across a hatched triangle group 448, the width of this triangle group 448 is small in appearance. For this reason, the LOD of the triangles that belong to the triangle group 448 is higher than the LOD of the other triangles. If the LOD of the triangle existing at the center of a pixel is employed as the LOD used for selection of the mipmap level regarding the pixel, only regarding a pixel 450 with the center on which the triangle group 448 ranges, the LOD higher than the other pixels is employed and texture with a high reduction ratio is selected.

If the resolution of the texture subjected to the mapping becomes various due to contingent variation in the LOD as above, it is conceivable that effects of the mipmapping such as flicker suppression are not exerted. In the present embodiment, the displacement of pixels is calculated in advance according to the point of view and the whole of the image reference vector map, which is a conceptual image that represents the displacement, is subjected to mapping. Therefore, mapping on each small triangle basis is unnecessary. Therefore, contingent variation in the LOD like the above-described variation does not occur. Furthermore, the image reference vector of the pixel center is decided also in consideration of the image reference vectors of peripheral pixels and thus texture mapping with high accuracy is enabled.

Moreover, in the method of carrying out texture mapping of the image itself, it is necessary to rasterize the internal regions of small triangles and acquire texture coordinates. When the number of pixels included in one triangle decreases as depicted in the diagram, the execution efficiency of hardware greatly decreases. Furthermore, if the Z-values of the vertexes forming one small triangle are greatly different, the number of pixels of the triangle to be rendered increases and a long time is often taken for mapping of the whole image as a result. In the present embodiment, as described above, the load of processing for mapping the whole image is significantly small. Furthermore, fluctuation of the load in association with change in the position of the point of view is also small. As a result, high-quality image rendering is enabled with a lighter load. This is a very effective characteristic for VR (Virtual Reality) equipment that must carry out reflection of movement of the point of view in the display screen with low latency always.

Next, description will be made about a method in which the original image operating unit 254 of the present embodiment extends parallax data to render the peripheral edge of an image of an object with high accuracy. FIG. 33 schematically depicts change in an image when an image is moved at a sub-pixel level due to movement of the point of view. (a) depicts a pixel arrangement of an original image and light hatched pixels represent an image of an object and dark hatched pixels surrounding them represent a region in which the a value is 0 and an image is absent. In the present embodiment, a sampling point is decided with accuracy of sub-pixel and the color value is decided. However, outside the image of the object, data does not exist in the parallax value image and therefore the image reference vector that indicates it also does not exist.

If a pixel center of this original image corresponds with a pixel center of the image reference vector map, the image substantially represented by image reference vectors also becomes as depicted in (a). If the need to move pixels at a sub-pixel level as illustrated by an arrow 460 arises here, a component in the reverse direction is added to the image reference vector of each pixel as illustrated by arrows in (b) and sampling points 462a to 462c on the original image deviate from pixel centers.

As a result, based on the color value decided by interpolation with adjacent pixels in the original image, the image substantially represented by the image reference vectors becomes an image in which the displacement of the sub-pixel is reflected as depicted in (b). However, in a region (for example region 464) in which the image of the object does not exist in the original image, the image reference vector that indicates it does not exist as described above and therefore the displacement of the sub-pixel cannot be reflected. As a result, the corresponding region 466 remains in the original state.

Hence, the peripheral edge of the image in the parallax value image is extended outward by about one pixel on the buffer or the like to allow generation of image reference vectors that indicate the extended region. FIG. 34 schematically depicts image reference vector maps before and after extension of a parallax value image. (a) is a pixel arrangement of the image reference vector map when the parallax value image is not extended. A hatched region is pixels regarding which the image reference vector map is stored because an image of an object appears at the corresponding pixels of the original image. A white region is pixels regarding which the image reference vector map does not exist because the pixels correspond to the outside of the image.

(b) is a pixel arrangement of the image reference vector map when the parallax value image is extended. For pixels represented by gray, image reference vectors generated by using the extended parallax data are stored. Even when the image reference vectors are generated as above, no change is caused on the image if the a value of the previous pixels illustrated in the original image is 0. Thus, the image itself is not unnaturally extended. For the extension processing, extended filtering is carried out by using a kernel 468 or the like depicted on the upper side of (b).

FIG. 35 schematically depicts change in an image in association with movement at a sub-pixel level when a parallax value image is extended. (a) corresponds to (a) of FIG. 33 and that image reference vectors are set for pixels around an image due to the extension of parallax data is indicated by gray. This can reflect displacement at the sub-pixel level also in the surrounding pixels as depicted in (b). As a result, the color value decided through interpolation with adjacent pixels appears also in the pixels of the region 466, in which no change is caused in (b) of FIG. 33. Due to such processing, the contour of the object also comes to appear to move more smoothly in association with movement of the point of view.

Figure 36:
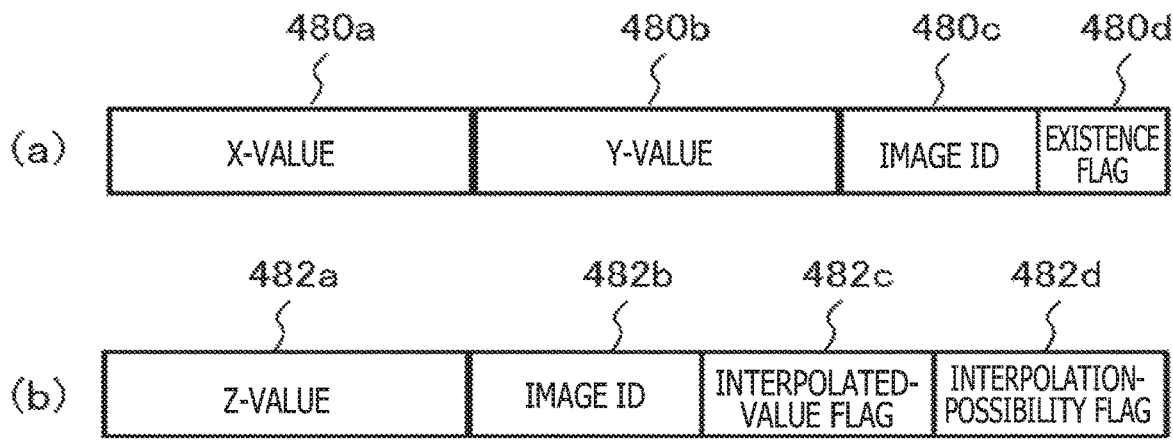
FIG. 36 is a diagram that exemplifies the structure of data held by image reference vector map and Z-buffer in units of pixel in the present embodiment.

FIG. 36 exemplifies the structure of data held by the image reference vector map and the Z-buffer in units of pixel. Data of the image reference vector map of (a) is composed of an X-value field 450*a*, a Y-value field 480*b*, an image ID (Identifier) field 480*c*, and an existence flag field 480*d*. In the X-value field 480*a* and the Y-value field 480*b*, the X-component and Y-component of the image reference vector are stored. In the image ID field 480*c*, identification information of the image for discriminating whether the reference destination is the self-image or the other original image at the time of the mutual reference or the original image from a point of view on the outside at the time of the extension reference is stored.

In the existence flag field 480*d*, a flag indicating whether or not an image reference vector exists is stored. By this flag, that an image reference vector exists and the components thereof are (0, 0) is discriminated from that an object does not exist at the relevant position and what should be set as an image reference vector is absent. Data of the Z-buffer of (b) is composed of a Z-value field 482*a*, an image ID field 482*b*, an interpolated-value flag field 482*c*, and an interpolation-possibility flag field 482*d*.

In the Z-buffer, data written latest through a Z-test or the like is stored at the time of generation of an image reference vector map, and information corresponding to vectors held by the image reference vector map is stored at the time of rendering of a displayed image. In the Z-value field 482*a*, the Z-value of the object represented by the image is stored. In the image ID field 482*b*, identification information of the image is stored similarly to the above description. The identification information is used for storing data of self-image reference with priority over data of the mutual reference and the extension reference.

In the interpolated-value flag field 482*c*, a flag indicating that the Z-value stored in the Z-value field 482*a* is data interpolated afterward by hole filling is stored. By this flag, it is indicated that the image reference vector with which the mutual reference or the extension reference is carried out can be set. In the interpolation-possibility flag field 482*d*, a flag indicating whether or not bilinear interpolation can be carried out with image reference vectors of the surroundings at the time of rendering of a displayed image is stored. For example, if the Z-value with an adjacent pixel on the map is large, the flag indicating that interpolation is impossible is stored. This can prevent the situation in which a step is large and an image reference vector unsuitable for interpolation is mixed and this step is unclearly expressed.

Next, a method in which correction of the point of view is carried out with high accuracy by using the image reference vector map will be described. In the case of implementing this form, the original image operating unit 254 depicted in FIG. 13 is incorporated at the previous stage of the lens distortion correction function in the output unit 270. As described above, the head-mounted display 100 is configured in such a manner that lenses are set in front of the right and left eyes in order to enlarge the field of view and a screen is viewed through the lenses in many cases. Thus, at the stage of display on the screen, non-linear distortion correction processing is executed for the original rendered displayed image to cancel distortion due to the lenses.

Figure 37:
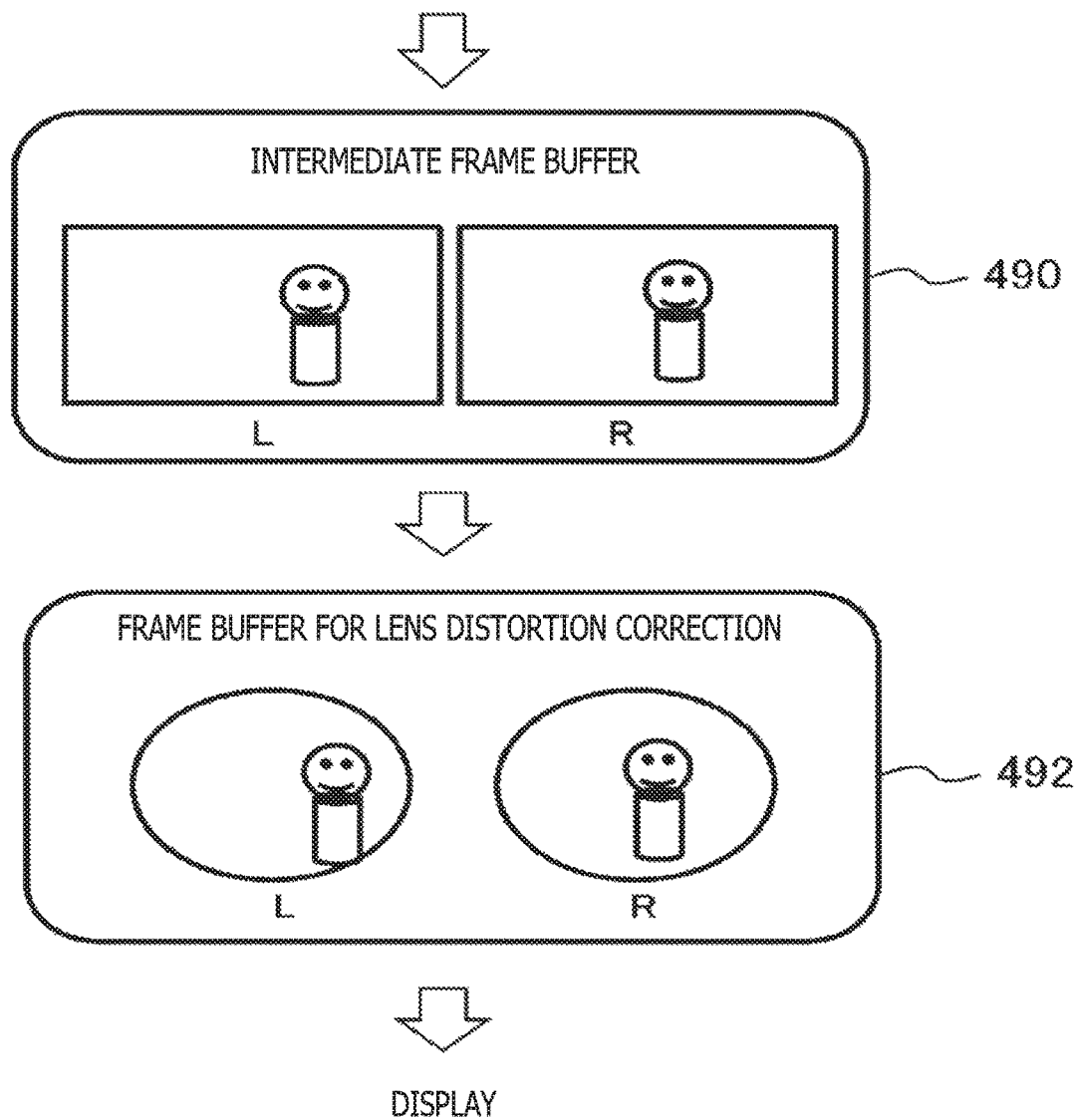
FIG. 37 is a diagram schematically depicting transition of an image including lens distortion correction processing.

FIG. 37 schematically depicts transition of an image including lens distortion correction processing. An intermediate frame buffer 490 and a frame buffer 492 for lens distortion correction both include a frame buffer for the left eye and a frame buffer for the right eye. First, to the intermediate frame buffer 490, a displayed image according to the point of view at the timing is written by the displayed image generating unit 268. The output unit 270 carries out sampling of the data of the displayed image written to the intermediate frame buffer and rearranges the data at proper positions to write the data to the frame buffer 492 for lens distortion correction. By sequentially outputting this data to the display, an image that looks normal through the lenses can be displayed.

On the other hand, the head-mounted display 100 is required to display an image according to the point of view of the user in real time. However, deviation of about several milliseconds exists between the timing when a view screen is set according to the point of view and the timing when lens distortion correction is carried out. Therefore, it is conceivable that the position or direction of the point of view moves during the deviation. In this case, when lens correction is carried out and data is output without change, possibly an image delayed relative to the actual motion of the point of view is displayed and a feeling of strangeness is given to the user.

Thus, it is conceivable that an image is caused to follow the motion of the point of view in a pseudo manner by carrying out distortion correction after the image written to the intermediate frame buffer is shifted in a certain direction by a small amount. However, with this method, it is impossible to accurately correct the motion of the point of view (movement in the X-, Y-, and Z-axis directions). As described above, pixels having different Z-values are different in the amount of change in association with the movement of the point of view and therefore accurate calculation is impossible with the shift of the image plane. For example, also when the user rotates the head, not only a turn of the direction of the line of sight but also movement of one eye relative to the other eye occurs.

Figure 38:
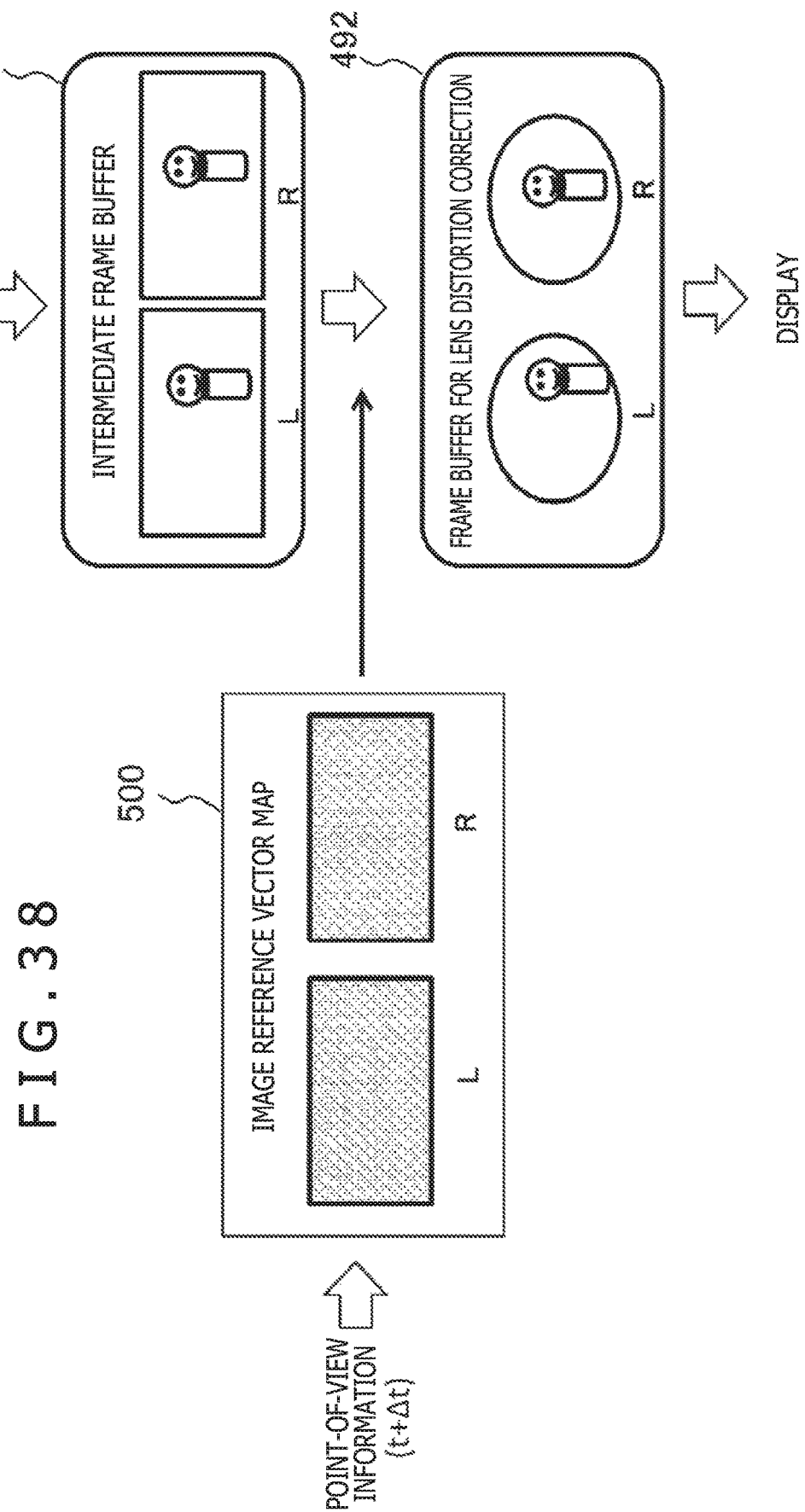
FIG. 38 is a diagram for explaining a method in which subsequent movement of the point of view is reflected in an image once rendered by using an image reference vector map in the present embodiment.

In other words, the motion of the point of view that can be reproduced by the shift of the image plane is extremely approximate and restrictive. Hence, the image reference vector map is used to allow lens distortion correction to be carried out for an image changed also in consideration of movement of the point of view. FIG. 38 is a diagram for explaining a method in which subsequent movement of the point of view is reflected in an image once rendered by using an image reference vector map. Similarly to the description with FIG. 37, a displayed image according to the point of view at a certain clock time t is written to the intermediate frame buffer 490. This displayed image may be an image using an image reference vector map or may be otherwise as long as the parallax value or the Z-value is clear.

Meanwhile, as an image reference vector map 500, one according to the point of view at a clock time t+Δt later than the clock time when the displayed image has been rendered is generated. This point of view may be a point of view based on an actual measurement result or may be a point of view predicted from previous motion of the point of view. Then, to the frame buffer 492 for lens distortion correction, data is written for which distortion correction has been carried out after the displayed image written to the intermediate frame buffer 490 is employed as the original image and a color value is sampled from the position indicated by an image reference vector in which motion of the point of view by Δt is reflected.

By doing this, the image once rendered can be displayed in the state of being accurately time-shifted and real-time image expression that follows motion of the point of view can be implemented. If the image reference vector map is used also for rendering of a displayed image that should be written to the intermediate frame buffer 490, the Z-buffer generated in the process of creating the map of the previous stage can be used for the Z-value used for generation of the image reference vector map 500.

According to the present embodiment described above, in a system that implements stereoscopic viewing by using right and left parallax images, an original image generated in advance is changed according to the motion and direction of the point of view to be turned to a displayed image. At this time, in response to movement of the point of view, the amount of displacement of each pixel is calculated in the state in which the position of an object in a virtual space is fixed and the accurate amount of correction is obtained. Depending on the case, in response to motion of the point of view in the Z-axis direction, the plane of the original image may be moved in parallel in the same direction. Due to such a configuration, a natural three-dimensional shape free from distortion even when the user greatly moves can be presented to the user.

For perspective transformation in which such movement of the point of view is reflected, the original image itself is not used and an image reference vector map that indicates difference from the position in the original image is used. Due to this, transformation operation to the original image is carried out only when finally the pixel value of the displayed image is decided. Therefore, the deterioration of the image quality from the original image is suppressed. Moreover, vertex data necessary for mapping onto the view screen is only four vertexes of the image reference vector map and therefore the load of rendering can be significantly suppressed.

Furthermore, rasterization of small triangles is omitted and interpolation is carried out on the image reference vector map. Therefore, also due to this, the load of processing is small and point-of-view conversion processing can be implemented at high speed with keeping of the accuracy. In addition, by employing mipmap data as the original image, a flicker of the screen in response to motion of the point of view can be suppressed. At this time, the LOD to decide the mipmap level is decided based on reduction due to motion of the point of view in the Z-axis direction and reduction due to perspective transformation of the image reference vector map. Therefore, the accuracy of the LOD is higher compared with general processing of carrying out mapping in units of small triangle and effects of the mipmapping are exerted more readily.

Moreover, using an original image of one eye partly for a displayed image of the other eye and using an original image from another point of view can be easily enabled. Due to this, a part that exists in a blind area at the time of original image creation can be reproduced with high accuracy and a stereoscopic image with little failure can be presented without limiting motion of the user. Furthermore, by preparing image reference vectors also at the peripheral edge part that is not an image of an object originally, displacement of pixels at a sub-pixel level can be accurately reflected also in the contour part of the image.

The present invention is described above based on the embodiments. The above-described embodiments are exemplification, and it is understood by those skilled in the art that various modification examples are possible in combinations of the respective constituent elements and the respective processing processes of them and such modification examples also fall within the scope of the present invention.

REFERENCE SIGNS LIST

100 Head-mounted display, 200 Image generating apparatus, 222 CPU, 224 GPU, 226 Main memory, 250 Position/posture acquiring unit, 252 View screen control unit, 254 Original image operating unit, 256 Original image data storing unit, 258 Original image data, 260 Parallax value image data, 262 Reference data storing unit, 264 Z-buffer, 266 Image reference vector map, 268 Displayed image generating unit, 270 Output unit

INDUSTRIAL APPLICABILITY

As described above, the present invention can be used for various kinds of information processing apparatus such as game machine, image display apparatus, image reproducing apparatus, and personal computer, an information processing system including any of them, and so forth.

The invention claimed is:

1. Image generating apparatus that generates an image enabling stereoscopic viewing of an object by using a pair of original images acquired from different points of view on right and left sides, the image generating apparatus comprising:

an original image operating unit that generates a vector map in which a reference vector, with which reference to a position before displacement in the original image from a pixel center position after the displacement is carried out, is derived for each pixel on an image plane by calculating the displacement of each pixel in the original image according to movement of the point of view of a user in such a manner that the object is fixed in a virtual space with respect to the movement of the point of view, and fills the reference vector hole of a pixel at which the reference vector is not set due to the displacement by interpolating the reference vectors of surrounding pixels;

a displayed image generating unit that decides, based on the reference vector composed from reference vectors at pixel center positions on the vector map defined on the center of respective pixel of the displayed image, a color value of the pixel by referring to color values around the referenced position on the original image; and an output unit that outputs data of the displayed image.

2. The image generating apparatus according to claim 1, wherein when carrying out interpolation regarding a pixel for which the reference vector is not set due to the displacement, the original image operating unit selects pixels used for the interpolation according to directions of the reference vectors set at surrounding pixels.

3. The image generating apparatus according to claim 1, wherein displacement vectors that represent displacements of respective pixels of the original image are able to be reproduced from the reference vector on the vector map, the displayed image generating unit derives the reference vector at a position on the vector map corresponding to the respective pixel center position of the displayed image based on end point positions of the displacement vectors.

4. The image generating apparatus according to claim 1, wherein the displayed image generating unit acquires the reference vector at the pixel center position of the displayed image, by the interpolation using the reference vectors set in a predetermined range from the corresponding position on the vector map.

5. The image generating apparatus according to claim 4, wherein the displayed image generating unit selects whether or not to carry out the interpolation by using the reference vectors set in the predetermined range based on information associated with each reference vector.

6. The image generating apparatus according to claim 1, wherein the displayed image generating unit acquires color values at pixel positions on the vector map, by using the reference vector set on the vector map referring to pixels of the input image, and decides the color value of the displayed image by interpolating the color values.

7. The image generating apparatus according to claim 1, wherein the original image includes data on a plurality of resolutions and the displayed image generating unit decides a resolution of the original image used for generation of the displayed image for each pixel based on a reduction ratio based on displacement of the respective one of pixels of the original image according to movement of the point of view and a reduction ratio based on a correspondence relationship between the image plane of the vector map and a plane of the displayed image.

8. The image generating apparatus according to claim 1, wherein the original image operating unit refers to a parallax value image obtained by representing a value of a parallax set for the original image on an image plane to set the reference vector for a corresponding pixel of the vector map, and further sets a reference vector for a corresponding pixel of the vector map by giving a pixel for which a parallax value is not set in the parallax value image a new parallax value based on parallax values of adjacent pixels.

9. The image generating apparatus according to claim 1, wherein
the original image operating unit employs a pair of displayed images rendered based on the point of view of the user as the original image and generates the vector maps made to correspond to subsequent movement of the point of view of the user, and the output unit carries out correction necessary for display for a pixel value and outputs the pixel value after acquiring the pixel value of a corresponding position from the displayed image based on the vector map.

10. An image generating method by image generating apparatus, the image generating method generating an image enabling stereoscopic viewing of an object by using a pair of original images acquired from different points of view on right and left sides, the image generating method comprising:
acquiring information relating to a point of view of a user;
generating a vector map in which a reference vector, with which reference to a position before displacement in the original image from a pixel center position after the displacement is carried out, is derived for each pixel on an image plane by calculating the displacement of each pixel in the original image according to movement of the point of view of a user in such a manner that the object is fixed in a virtual space with respect to the movement of the point of view, and fills the reference vector hole of a pixel at which the reference vector is not set due to the displacement by interpolating the reference vectors of surrounding pixels;
deciding, based on the reference vector composed from reference vectors at pixel center positions on the vector map defined on the center of respective pixel of the displayed image, a color value of the pixel by referring to color values around the referenced position on the original image; and
outputting data of the displayed image.

11. A non-transitory, computer readable storage medium containing a computer program, which when executed by a computer, causes the computer to generate an image enabling stereoscopic viewing of an object by using a pair of original images acquired from different points of view on right and left sides by carrying out actions, comprising:
acquiring information relating to a point of view of a user;
generating a vector map in which a reference vector, with which reference to a position before displacement in the original image from a pixel center position after the displacement is carried out, is derived for each pixel on an image plane by calculating the displacement of each pixel in the original image according to movement of the point of view of a user in such a manner that the object is fixed in a virtual space with respect to the movement of the point of view, and fills the reference vector hole of a pixel at which the reference vector is not set due to the displacement by interpolating the reference vectors of surrounding pixels;
deciding, based on the reference vector composed from reference vectors at pixel center positions on the vector map defined on the center of respective pixel of the displayed image, a color value of the pixel by referring to color values around the referenced position on the original image; and
outputting data of the displayed image.

* * * * *